United States Patent [19]
Hagstrom

[11] 3,941,988
[45] Mar. 2, 1976

[54] METHOD AND APPARATUS FOR NUMERICAL CONTROL

[75] Inventor: John M. Hagstrom, Elmhurst, Ill.

[73] Assignee: Danly Machine Corporation, Chicago, Ill.

[22] Filed: Apr. 30, 1975

[21] Appl. No.: 573,340

Related U.S. Application Data

[63] Continuation-in-part of Ser. No. 394,241, Sept. 4, 1973, abandoned.

[52] U.S. Cl. ............................ 235/151.11; 318/571
[51] Int. Cl.[2] .......................................... G06F 15/46
[58] Field of Search ......... 235/151.11, 92; 318/570, 318/571, 573, 592, 594

[56] References Cited
UNITED STATES PATENTS

| | | | |
|---|---|---|---|
| 3,278,727 | 11/1966 | Geis | 235/92 TF |
| 3,417,303 | 12/1968 | Reuteler | 318/570 |
| 3,617,718 | 11/1971 | Dummermuth | 235/151.11 |
| 3,657,525 | 4/1972 | Evans | 235/151.11 |
| 3,663,013 | 1/1972 | Dummermuth | 235/151.11 |
| 3,668,500 | 6/1972 | Kosem | 318/594 |
| 3,731,175 | 5/1973 | Hartung | 318/570 |

*Primary Examiner*—Felix D. Gruber
*Attorney, Agent, or Firm*—Wolfe, Hubbard, Leydig, Voit & Osann, Ltd.

[57] ABSTRACT

Method and apparatus for numerical control to produce contouring by simultaneous coordinated motions along two or more axes, characterized by the creation of desired velocity signals supplied as the primary inputs to velocity servos coupled to drive a member relatively along the respective axes. A digital computer associated with an adjustable interrupt clock which measures off successive time periods $\Delta T$, supplies a changeable velocity command number signal to each servo proportional to the distance per $\Delta T$ through which motion along the associated axis is to occur. This velocity command number is algebraically added to a theoretical position number to signal dynamically during each period $\Delta T$ the axis position at which the member should reside; and the latter number is used with a dynamically signaled actual position number to re-compute and signal during each period the position error. The position errors are used as a trimming or adjusting term in the signals applied to the respective axis servos.

When the signaled error exceeds a first threshold on any axis, the periods $\Delta T$ are lengthened to reduce all axis velocities; when it exceeds a second threshold, the system is put into a holding mode. The input signal applied to each axis servo includes a further historical adjustment term incrementally changed during any period when the error exceeds a predetermined value—all to the objective of making the axis servos (a) operate with substantially zero following error, (b) correct themselves if the position error becomes at all appreciable, or (c) stop if that error becomes intolerable.

36 Claims, 19 Drawing Figures

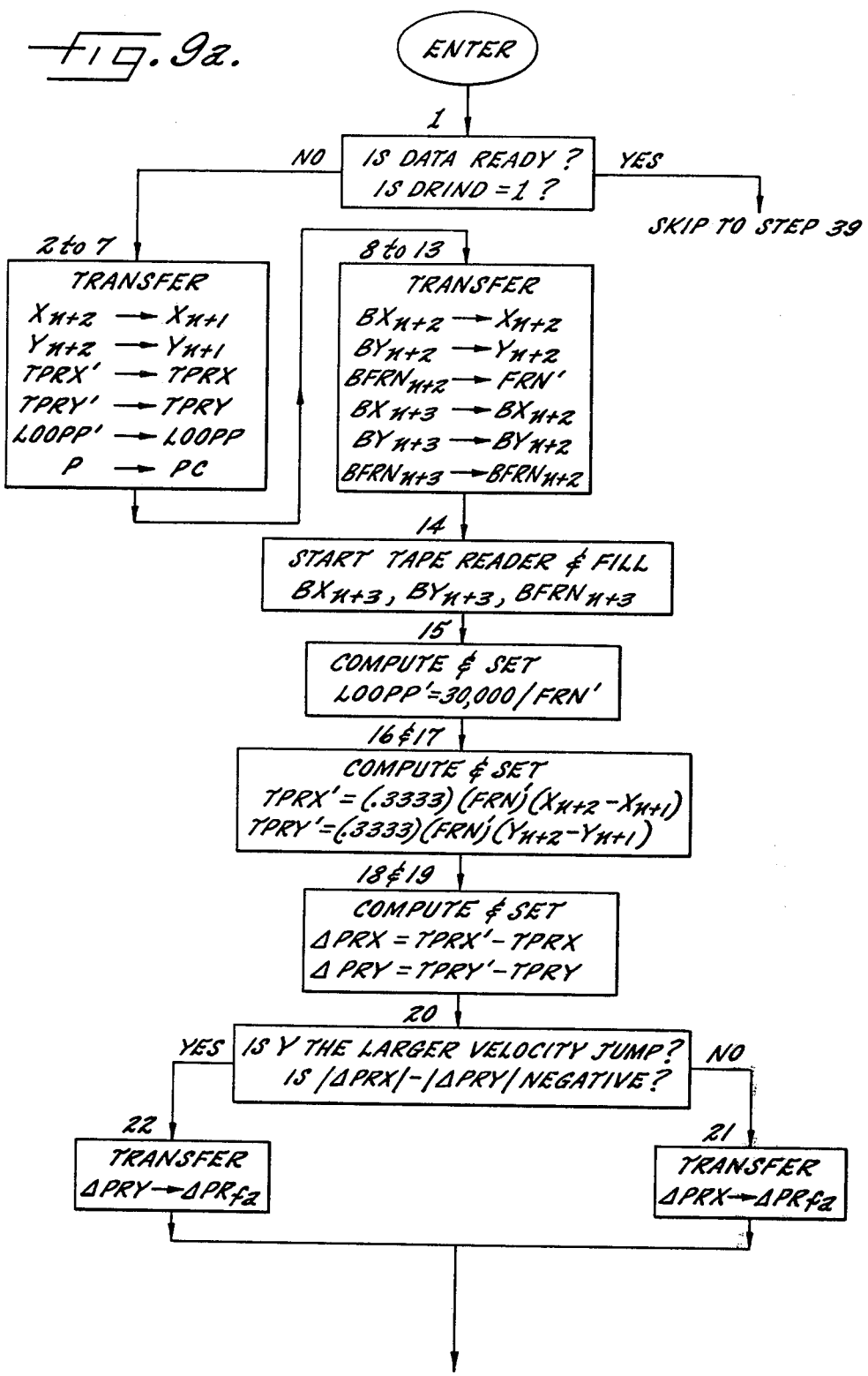

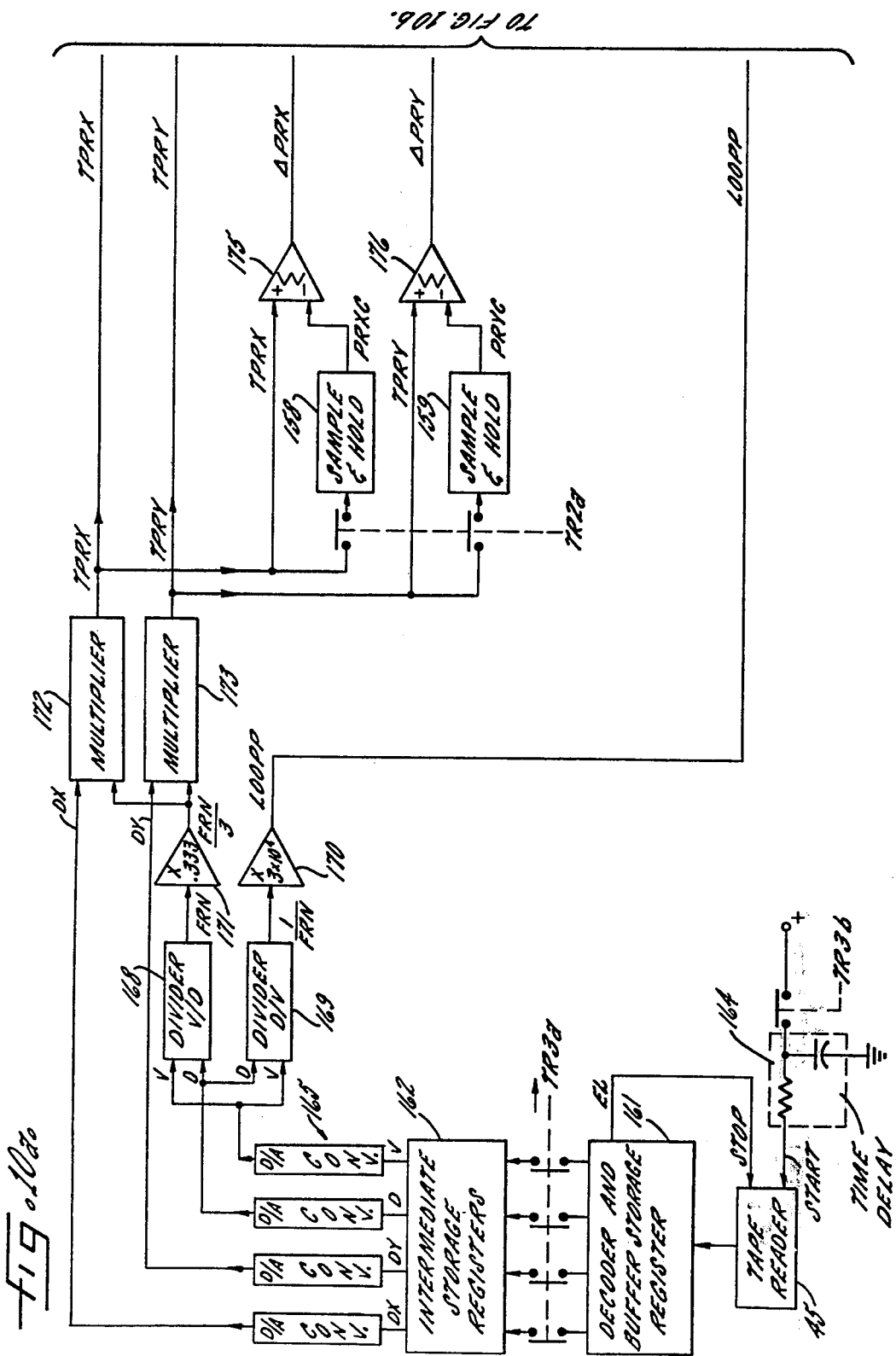

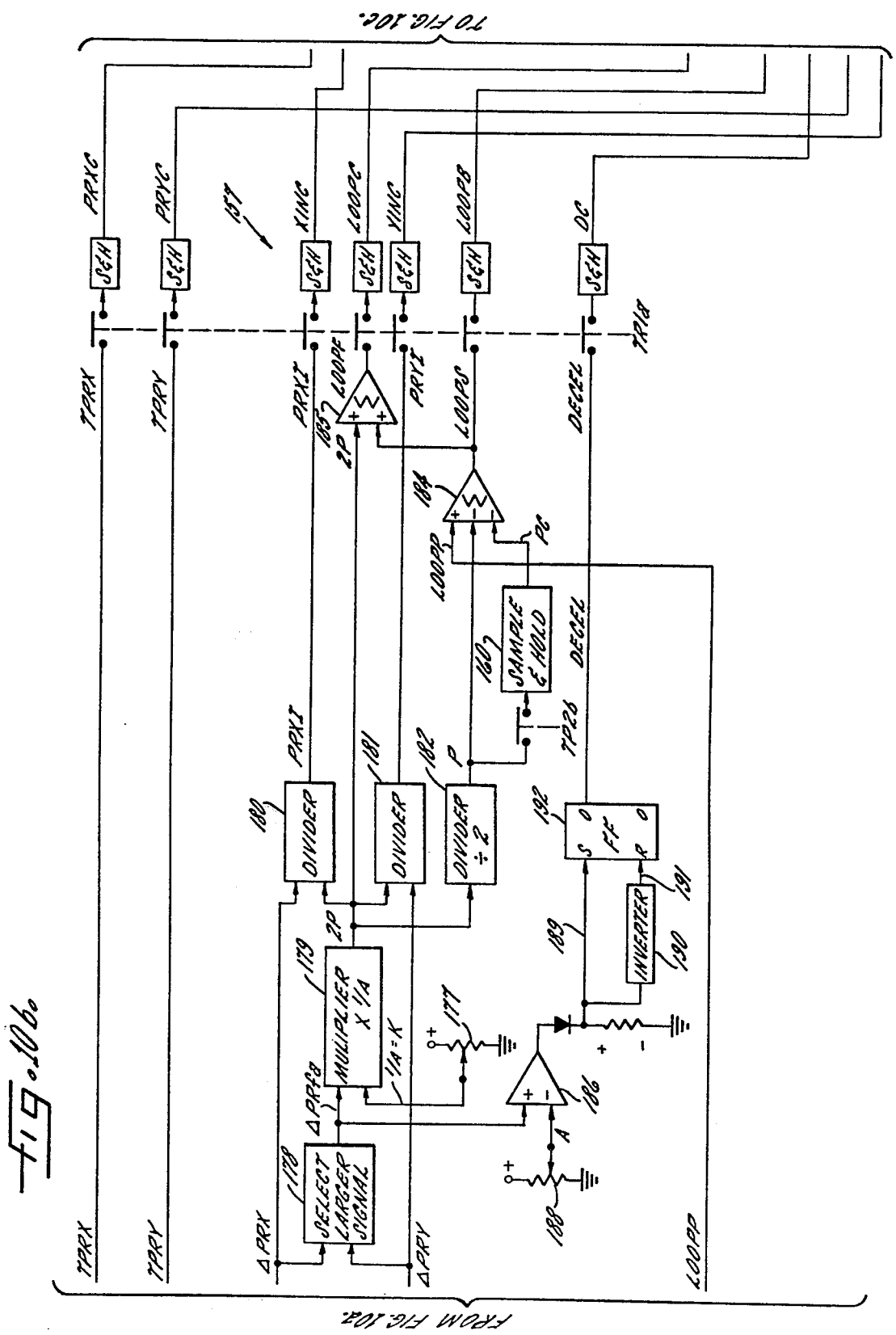

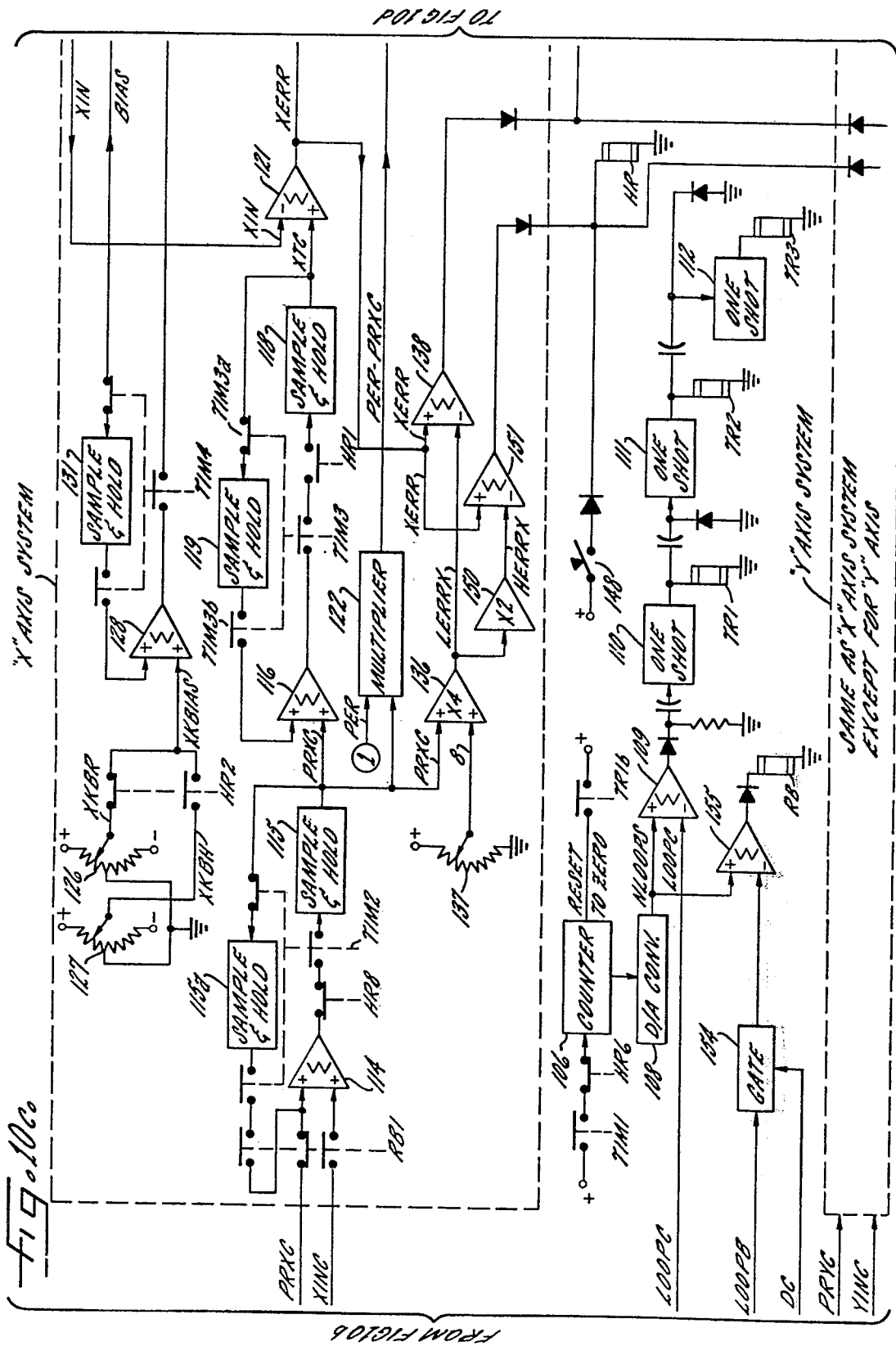

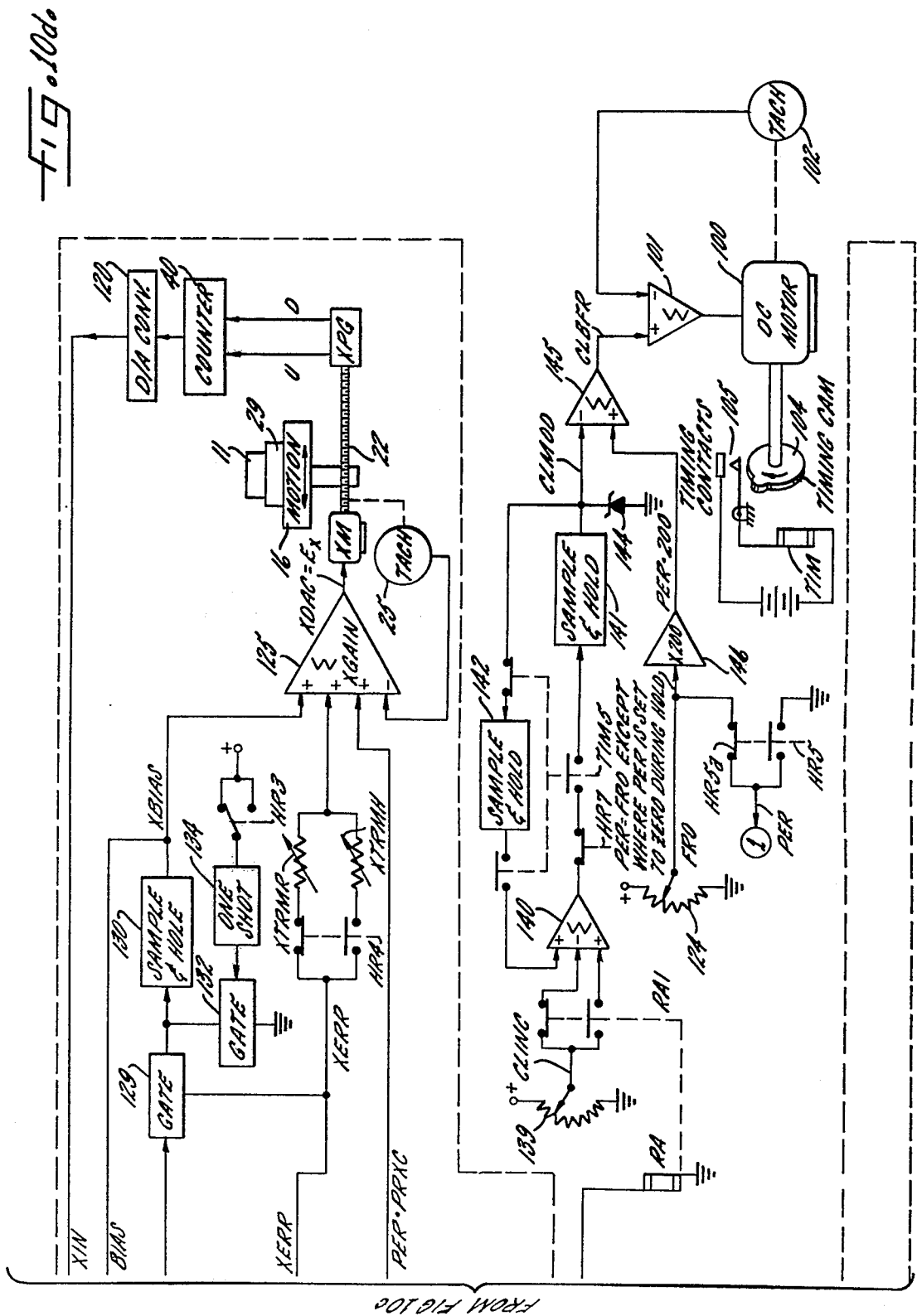

METHOD AND APPARATUS FOR NUMERICAL CONTROL

This application is a continuation-in-part of my co-pending United States application Ser. No. 394,241 filed Sept. 4, 1973 (and now abandoned).

TABLE OF CONTENTS

Abstract of Disclosure
Detailed Description
  I. An Exemplary Machine Tool
  II. The Exemplary Control Apparatus and Method
  III. The Nature of Successive Path Segments Defined by Successive Command Blocks
  IV. The Digital Computer Organization
Table I
  A. In the Current Storage Section
  B. In the Intermediate Storage Section
  C. In the Buffer Storage Section (Taken Directly from Punched Tape)
    V. The Digitally Signaled Basic Numbers to Produce Movement According to Block $B_n$
    VI. Physical Setup of the Computer and the Servo Routine Method With Variable Time Periods
Table II
  A. A Normal Iteration Cycle
  B. A Cycle Finding a Grey Error and Slowing Down the System
  C. A Cycle Following the Elimination of a Grey Error
  D. A Cycle Finding a Machine Hold
  E. A Cycle Finding a Black Error
  F. A Cycle Finding a Red Error
  G. A Cycle Finding That an Emergency Stop Signal Exists
  H. A Cycle Finding that Acceleration or Deceleration Should Begin
  I. A Cycle Finding the Path Segment $B_n$ Fully Executed; Transfer of Data to Begin Execution of Block $B_{n+1}$ as the New Block $B_n$
    VII. Deriving and Storing Signals From $B_{n+1}$ Command Data to Represent Numbers Which Will Later Be Used in the Current Storage Section
Table III
RESUME The present invention relates in general to methods and apparatus for numerical control of machine tools and the like. More particularly, the invention relates to improvements in contouring numerical control where the simultaneous relative movements of a member along plural axes are coordinates to produce successive segments of path motion at desired velocities in accordance with successive blocks of numerical command data. Although not necessarily limited thereto in all of its aspects, the invention in its preferred form is of the iterating type which repeats certain functions once during each of successive short iteration periods $\Delta T$ measured off in actual time.

It is the general aim of the invention to provide improved dynamic accuracy and performance in a numerical control system of the iteratively computing type.

More specifically, it is an object of the invention to provide for automatic acceleration and deceleration to prevent over-taxing the drive motors which are parts of velocity servos in that type of system, and by a simple and convenient procedure and apparatus for incementing a primary velocity command signal during each iteration time period $\Delta T$ at a rate per $\Delta T$ equal to a predetermined maximum acceptable acceleration, the extra time required being automatically provided.

It is another object of the invention to simplify acceleration-deceleration by executing each block of command data as if it defined a first portion of member travel at the command data velocity followed by a second portion of member travel with a ramp increase to the next block commanded data velocity, even though the block command data defines a uniform velocity of travel between two points with a step or jump in velocity at the beginning and the end.

Another object is to cause acceleration-deceleration in a numerical control system of the iteratively computing type by simply incrementally changing a primary velocity signal, with the result that a dynamically changed theoretical position signal is automatically changed by the proper amounts during each iteration, and yet to terminate such incrementing after a predetermined number of iterations.

Still another object is to accomplish automatic acceleration-deceleration without any special anticipation of when the controlled and moving member will reach the end point of the command data block being executed, but rather in a way that execution of the block is complete, and the next block is started after a certain number of iteration periods have elapsed.

It is a further object of the invention to provide for automatically stopping and "holding" the controlled member in the event that its position error should abnormally exceed a predetermined threshold value, thereby to avoid damaging or ruining an expensive workpiece, — but in a fashion such that the error is self-correcting and the "running" status is resumed when the error returns to below that threshold.

Another and related object is to enhance the error elimination and the positional accuracy of such a numerical control system when in the "holding" condition, by automatically changing the individual gain factor of a trimming error term which supplements the primary velocity signal applied to a velocity servo.

Other objects and advantages of the invention will become apparent from the following detailed description, taken in conjunction with the accompanying drawings, in which:

FIG. 1 is a diagrammatic and fragmentary elevation of an exemplary machine tool to be controlled according to the method and by the apparatus of the present invention;

FIGS. 2a and 2b when joined constitute a diagrammatic illustration of the machine tool and an exemplary apparatus physically embodying the invention and operating to carry out the methods of the invention;

Figure 2A:
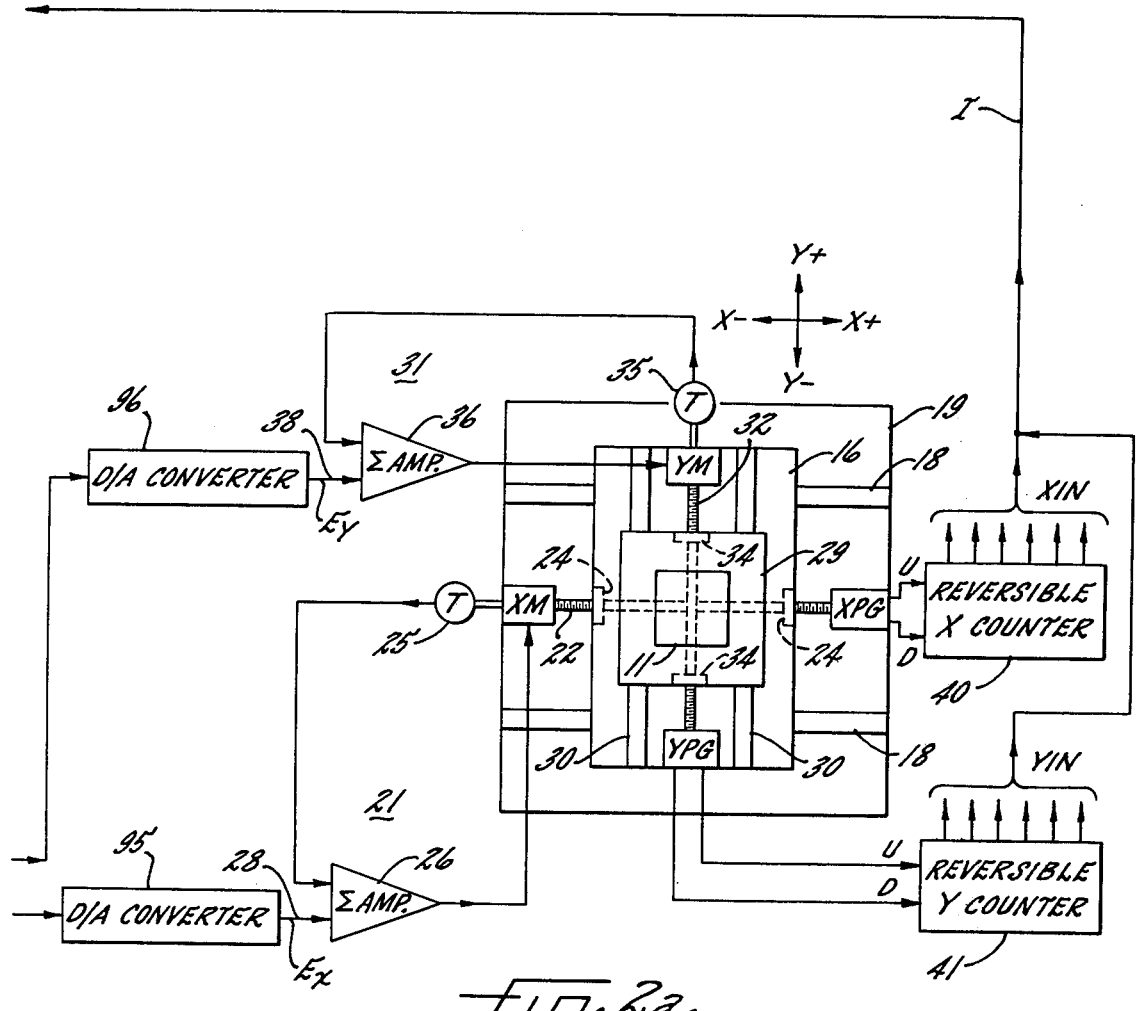
Figure 2B:
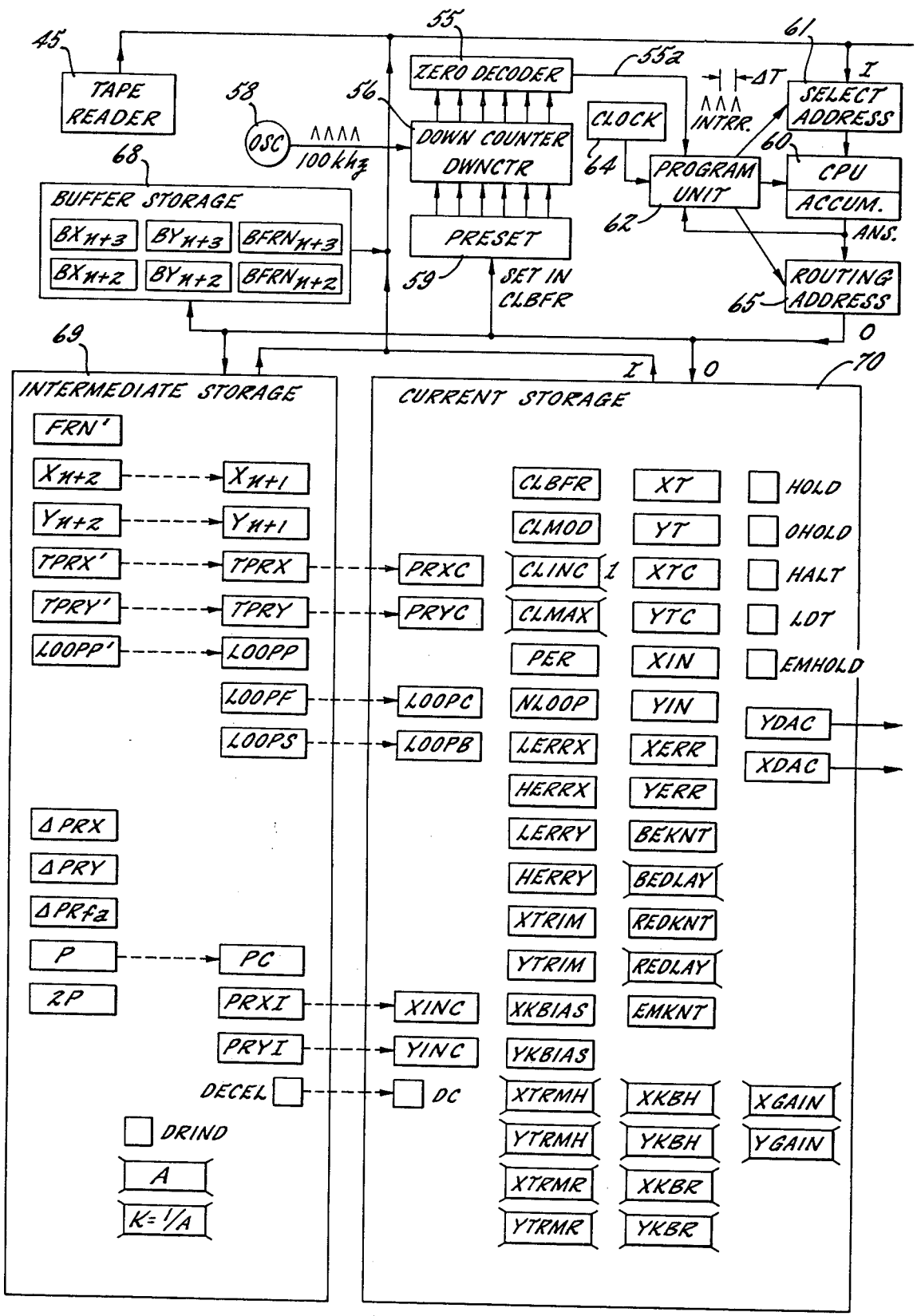
Figure 6:
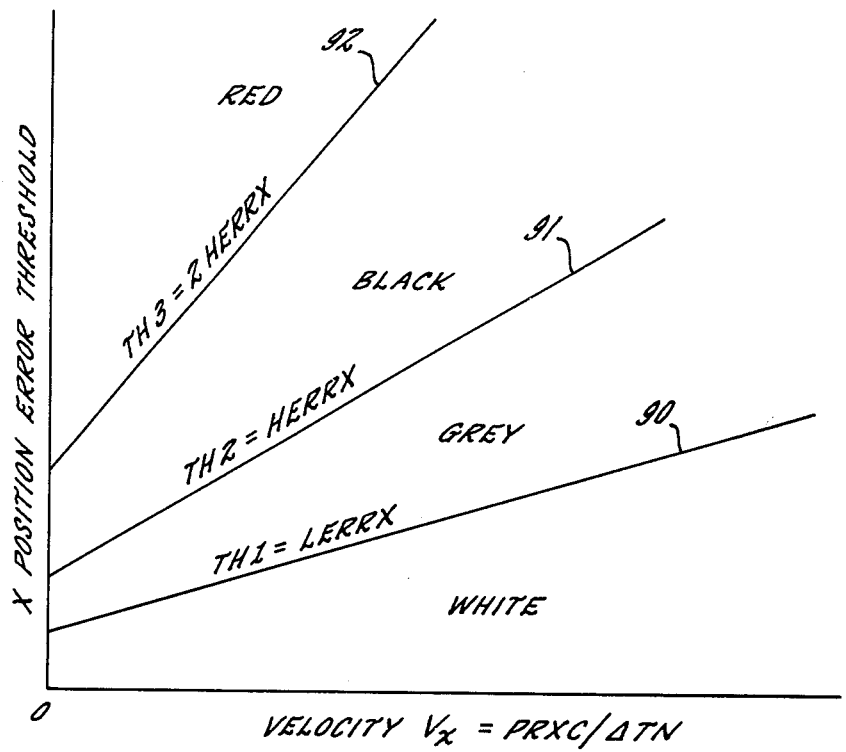
Figure 7:
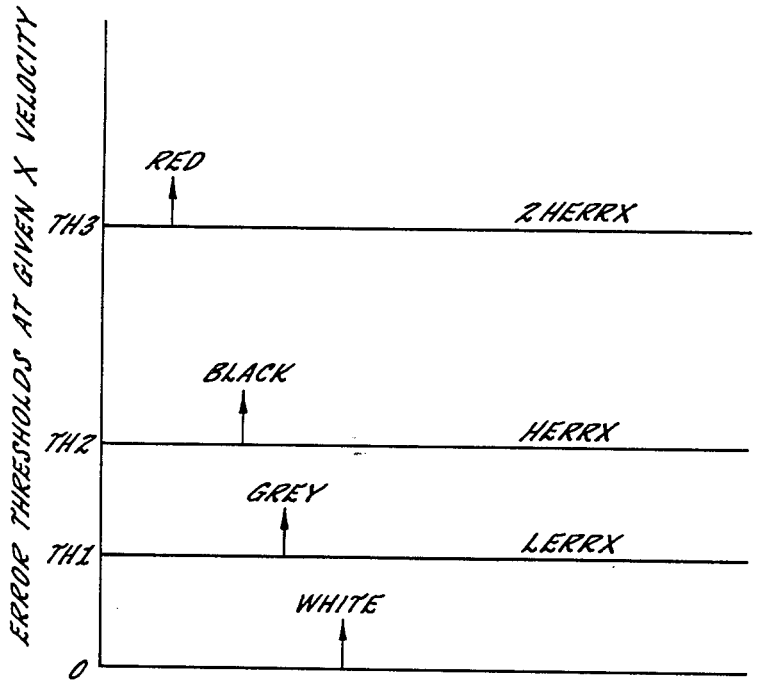
Figure 8:
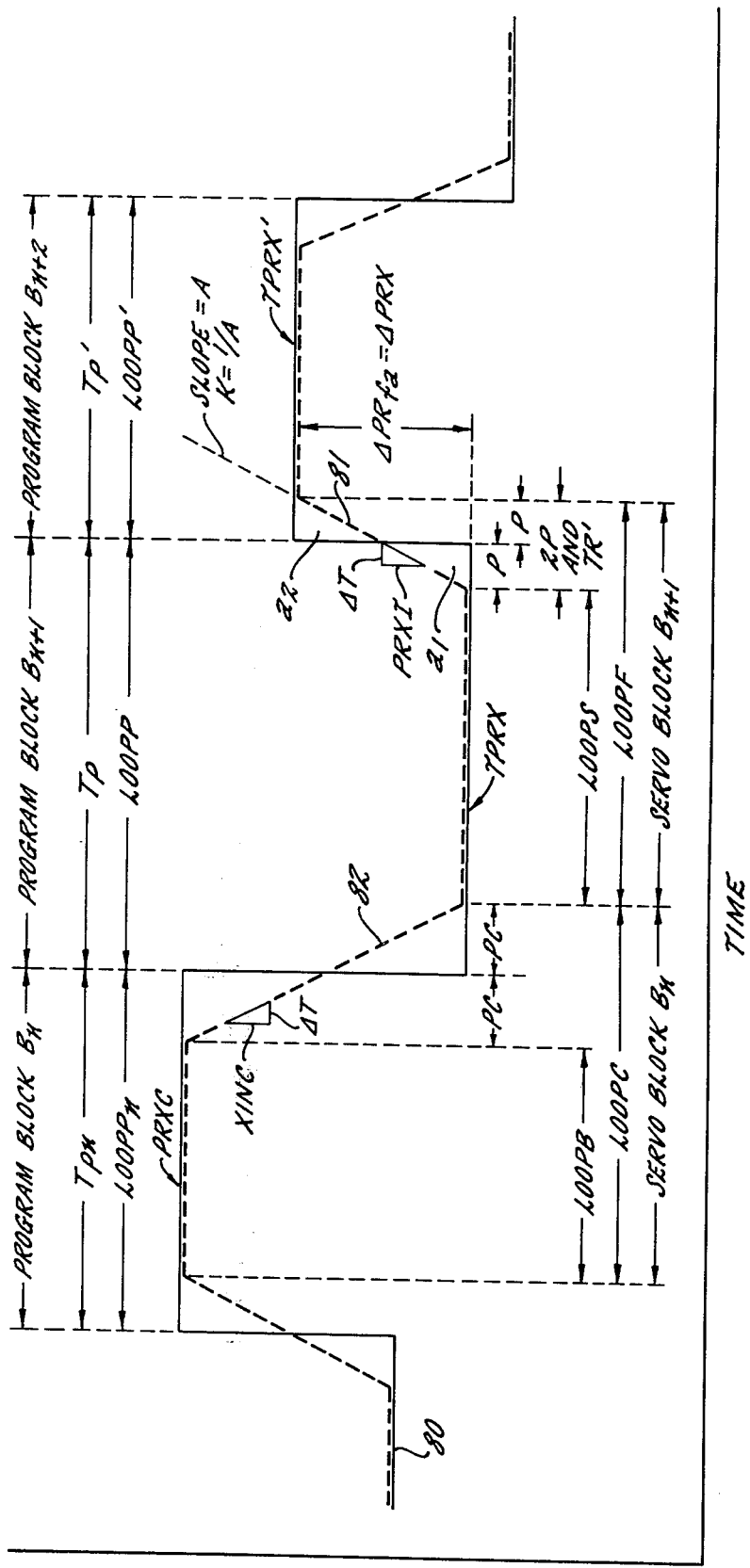
Figure 9B:
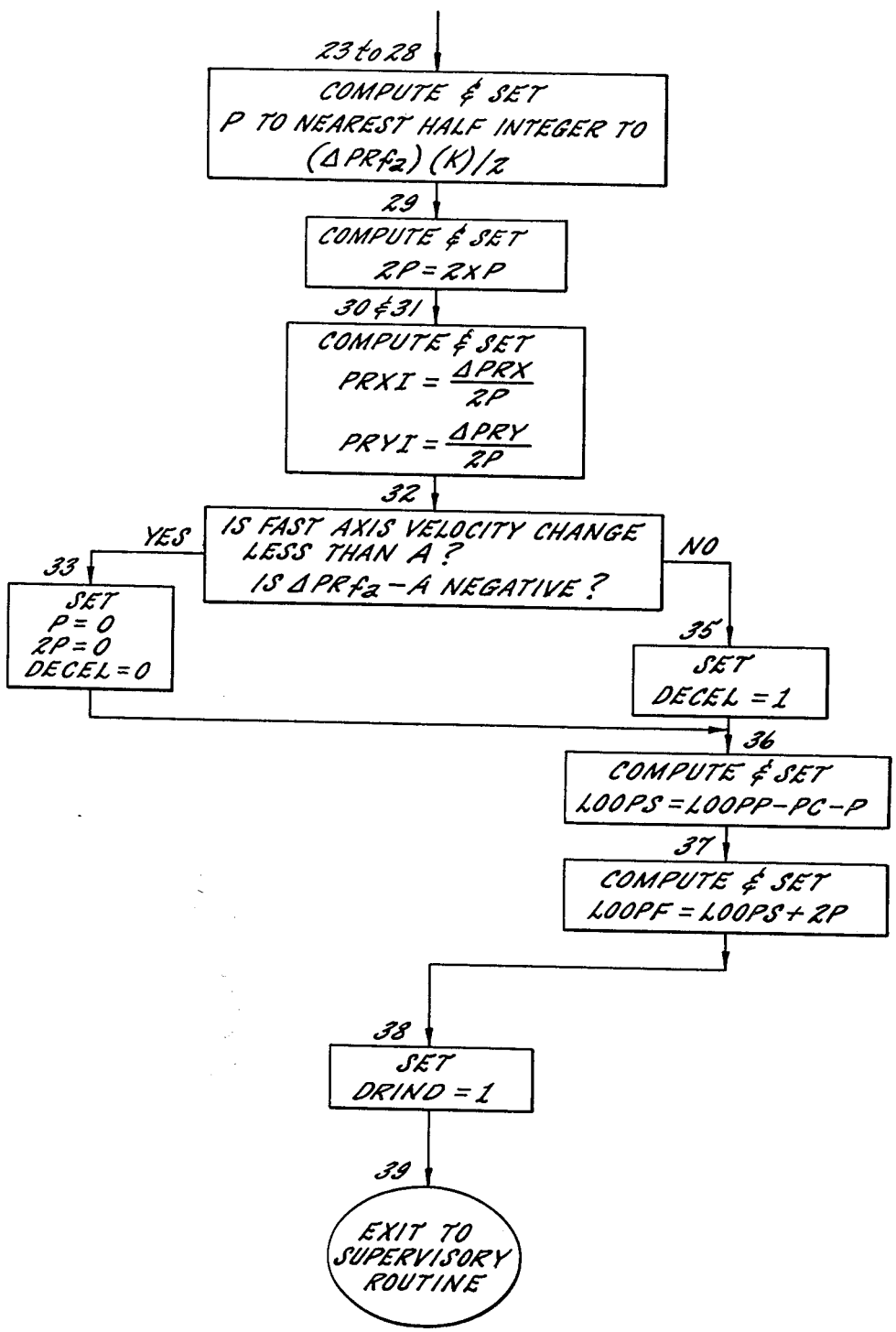

FIGS. 5a through 5e, when joined bottom-to-top in series, form a flow chart to designate fully to one skilled in the art the physical setup of gates and sequencers in the program unit of a digital computer shown in FIG. 2b, and the method steps carried out in executing a servo control routine after the computer has been so physically conditioned;

FIG. 6 is a graph illustrating position error thresholds which change as exemplary monotonic functions of the velocity at which the movable member is to travel along one axis, and showing the classification of the position error into ranges designated for convenient reference as white, grey, black and red;

FIG. 7 corresponds to FIG. 6 and shows the white, grey, black and red position error ranges when the X axis is being called upon to have motion at a given velocity;

FIG. 8 is a graphic illustration of the successive velocities along an axis as designated by typical successive blocks of command data, together with an illustration as to both (*a*) the quantities precalculated according to FIGS. 9*a* and 9*b* and (*b*) the velocities as they are physically produced for the controlled member; and FIGS. 9*a* and 9*b* when joined form a flow chart similar to FIGS. 5*a-e* but designating the physical conditioning and the operational sequences of the digital computer in processing block command data to produce certain number-representing signals in advance of the actual movement of the controlled member according to a given command data block.

FIGS. 10*a*, 10*b*, 10*c*, 10*d* when joined along the indicated junction lines form a diagrammatic illustration of a second, exemplary embodiment by which the apparatus and the methods of the present invention may be put into practice, such second embodiment being a system which is the analog counterpart of the digital system shown and explained in FIGS. 1 through 8, and such analog counterpart being routinely arrived at by any person skilled in the art from the description of FIGS. 1 through 8.

While the invention has been shown and will be described in considerable detail with reference to exemplary apparatus and specific procedural methods, there is no intention thus to limit it to such detail. On the contrary, it is intended here to cover all alternatives, equivalents and modifications which fall within the spirit and scope of the invention as defined by the appended claims.

DETAILED DESCRIPTION

I. An Exemplary Machine Tool

Figure 1:
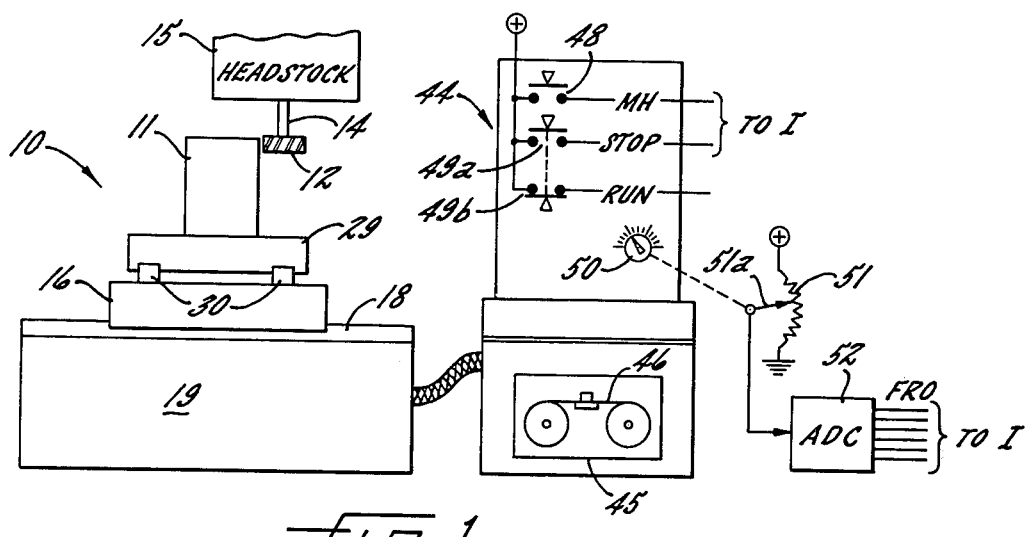

To illustrate a typical and simplified environment in which the present invention may be used, FIGS. 1 and 2*a* show a machine tool, here a milling machine 10, in diagrammatic and fragmentary form. For conciseness and simplification, the machine 10 is shown with only two axes of freedon X and Y along which a member, here a workpiece 11, is movable relative to a milling cutter 12 carried by a rotating spindle 14 extending from a headstock 15. A saddle 16 is slidably supported upon ways 18 formed on the machine base 19 and may be driven at controlled velocities to various positions, along what is here designated as the X axis, by a reversible motor XM forming a part of a velocity servo system 21. The motor is drivingly coupled to a lead screw 22 engaged with cooperating nuts 24 fixed in the saddle, and a tachometer 25 is simultaneously driven by the motor to provide a speed feedback signal in a closed loop to a summing amplifier 26 forming a part of the servo system. The servo system acts to drive the saddle in a direction (+X or −X) corresponding to the polarity of, and at a speed ($V_x$) substantially proportional to the magnitude of an input signal, e.g., a speed-designating dc. voltage $E_x$ applied to the main input terminal 28.

A similar arrangement associated with a work table 29 makes possible the simultaneous movement at controlled velocities to desired positions along a Y axis lying orthogonally in relation to the X axis. As here shown in FIGS. 1 and 2*a*, the work table 29 is slidably supported upon ways 30 formed on the upper surface of the saddle 16 and is drivable in positive or negative directions along the Y axis by a reversible motor YM forming a part of a velocity servo system 31. That motor is drivingly coupled to a lead screw 32 engaged with nuts 34 fixed in the table. A tachometer 35 driven by the motor in synchronism with the lead screw provides a speed feedback signal in a closed loop to a summing amplifier 36 which forms a part of the Y axis velocity servo system. When the servo system is excited or energized by a speed signal applied to its main input terminal 38, for example, a dc. voltage $E_y$ of controllable polarity and magnitude, the motor YM drives the table 29 in a direction corresponding to the input signal polarity and at a velocity proportional to the magnitude of the input signal.

Since the workpiece 11 is supported upon the table 29, that workpiece is a member which can be moved along either of the axes X or Y, or simultaneously along both, at controlled velocities and at any desired angle or vector direction in the X, Y plane. By so moving the workpiece 11 relative to the rotating milling cutter 12 through successive path segments of designated lengths lying at designated angles, any desired shape or contour may be machined (in this instance, in a horizontal plane) on the workpiece 11. It will be understood by those skilled in the art, however, that relative motion of the workpiece 11 and the cutter 12 is all that is required, and in many instances the work-supporting table 29 may be arranged for movement along one axis while the headstock and its cutter 12 are arranged for movement along another axis. Moreover, while only two axes of controlled motions are here illustrated for purposes of explanation, it will be understood that a greater of number of axes may be simultaneously controlled by routine duplication and extension of the method and apparatus to be described below.

In order to create digital electrical signals numerically representing the dynamically changeable actual position of the member 11 along the X axis, any suitable transducer may be employed. As here shown, a pulse generator XPG is driven by the lead screw 22 and supplies its output signals to a reversible multi-stage counter 40. The pulse generator is of a type well known in the art and produces one pulse for each predetermined unit of distance (e.g., 0.0001 inch) through which the saddle 16 is moved. When motion is in a positive or negative direction along the X axis, such pulses are routed respectively to the U or D input terminals of the counter 40 to make the latter count upwardly or downwardly. By initializing the counter to zero when the workpiece 11 is at the origin of the X, Y axes, the number held by the counter 40 and signaled on its plural output lines in a selected notation (e.g., binary or binary coded decimal) always "keeps track" of and represents the actual X position of the workpiece 11. That changeable, electrically-signaled number which dynamically represents the actual X position is here designated XIN.

In an identical arrangement, a pulse generator YPG driven by the lead screw 32 supplies its signals to a reversible counter 41 which thus produces on its plural output terminals electrical signals digitally and numerically representing the dynamically changeable, instantaneous actual position of the table 29 and the workpiece 11 relative to the origin of the Y axis. The actual-position number represented on the output terminals of the counter 41 is here designated YIN.

II. The Exemplary Control Apparatus And Method

In accordance with the present invention, there is associated with the machine tool a contouring controller physically contained in a console 44 shown roughly by FIG. 1, with the controller being illustrated in greater detail and in diagrammatic block fashion by FIG. 2b. The controller includes a tape reader 45 for producing successive sets of digital electric signals corresponding to the successive sets or blocks of command data represented on a record medium, e.g., a punched tape 46 or the like. Such tape reader, punched tape and the arrangement of data blocks thereon are well known to those skilled in the art and it would be superfluous to describe their details here. It will suffice to note simply that there is one data block for each segment making up a total path to be traveled by the workpiece 11 relative to the cutter 12, those blocks appearing successively or in sequence lengthwise of the punched tape, and each block numerically designating in one fashion or another the end point coordinates at $X_c$, $Y_c$ of the segment (or the X and Y axis departures for the segment) and the desired velocity or path feed rate at which motion along that segment is to be produced. The data for the successive command blocks may be prepared by a technician known as the part programmer, directly or with the aid of a general purpose computer which is set up to handle, for example, APT or SPLIT language. The punched indicia on the tape may be in the well known EIA format or any other which may be chosen. The successive blocks of data on the punched tape will here often be referred to as the "program" because they are prepared by a programming technician who decides upon the particular path segments and feed rates which are to be used in order to machine the workpiece to a desired shape.

For later reference, it will be appropriate to note here that the console 44 may include various instrumentalities or switches for use by the machine operator, such as manual data input keys or switches, jog controls and the like (not shown). Only a few such instrumentalities are illustrated in FIG. 1. The first is a machine "hold" push-button switch 48 which, when pressed and held down, couples a positive voltage source to an output line in order to create a binary "1" level for a "machine hold" signal MH. This switch may be held down to place the machine in a holding condition, as hereinafter described; but the switch 48 is merely representative of other switches which may be connected in parallel to make the MH signal have a binary "1" value when some abnormal condition arises. For example, parallel sensing switches may be added to make the MH signal a "1" when lube pressure in the headstock, or when cutter coolant flow, falls below a predetermined safe level.

Secondly, a two pole, single throw stop-run toggle switch is shown in FIG. 1, its normally open contacts 49a and its normally closed contacts 49b leading from a positive voltage source to produce binary "1" values for single bit signals here designated STOP and RUN on respective output conductors when that switch is set in its actuated or deactuated positions. This stop-run switch and its contacts 49a, 49b will be thrown by the operator to the stop position whenever he perceives any emergency condition requiring immediate shutdown of the machine.

Lastly, FIG. 1 diagrammatically illustrates means for creating digital electrical signals numerically representing an adjustable feed rate override number FRO. As will be made clear below, the machine operator may manually adjust the number FRO to cause the programmed path velocity or feed rate called for by command data from the punched tape 46 to be increased or decreased by a selected percentage. A hand knob 50 (FIG. 1) rotationally adjustable by the machine operator and associated with an indicia scale is physically connected to change the position of the wiper 51a associated with a potentiometer 51 so that a dc. voltage proportional to the selected feed rate override percentage appears on that wiper. The latter dc. voltage is supplied as the input to an analog-to-digital converter 52 having multiple output lines which therefore receive binary voltages representing (in binary or BCD format) a number FRO which is adjustable and selected by the machine operator. Typically, by turning the knob 50 to different positions the operator may set the signaled number FRO to have any value between 0.00 and 1.25, thereby designating that the feed rate to be produced at the machine tool is to be any selected percentage from 0 percent to 125 percent of the value called for by the command data program represented on the punched tape.

In the preferred embodiment of the invention, the control apparatus includes a digital computer contained within the console 44 and diagrammatically shown in FIG. 2b. That computer may take any one of several different specific forms known to those skilled in the art and available in the United States market, a suitable example being the Model PDP-8 offered for sale by Digital Electronics Corporation. The computer is physically changed or conditioned by setting up gates and sequencers, through reading-in or insertion of a master program to be described, so that it iteratively performs specific operational steps. To avoid overburdening and making the present disclosure lack the conciseness required by statute, the extremely voluminous specific circuits of the computer, and the gates and sequencers therein, are not here illustrated or described; but these details will be fully understood by those skilled in the art from the master program and the operational steps set out below.

Before describing the digital computer and its physical conditioning by a master program, one special portion of the present method and apparatus will be treated. In keeping with an important aspect of the invention, successive periods ΔT are measured off in actual time, with such periods normally having durations ΔTN but being adjustable in length. As here illustrated, each time period is marked off by the appearance of an interrupt pulse on the output line 55a of a zero decoder 55 which receives output signals from a down counter 56. The latter continuously receives pulses at a predetermined frequency (e.g., 100 Khz.) from a continuously running oscillator 58. The counter is preset periodically (and very shortly after each interrupt pulse appears) with a number CLBFR represented by digital electrical signals routed through presetting gates 59. If it is assumed merely for example that the number CLBFR normally has a value of 200, then immediately after being preset the counter contains and signals that number reduced by one after each of the oscillator pulses is received. Assuming by way of example that the oscillator frequency is 100 Khz., the counter will reach and hold zero in 200/100,000 = 0.002 seconds, whereupon the zero decoder 55 produces one of the interrupt pulses on its output line 55a. If the number CLBFR is again preset into the counter a very short time (e.g., 200 microseconds) after that interrupt pulse appears (as described below), the next interrupt pulse will occur 0.002 seconds later. Although the "normal" value of CLBFR and the frequency of the oscillator 58 may be given different values by design choice to make the normal duration $\Delta TN$ between successive interrupt pulses have some different design value, it will be assumed by way of example in the following description that the periods $\Delta T$ have a normal duration $\Delta TN$ equal to 0.002 or 2 milliseconds. Moreover, it will be appreciated that if the presetting number CLBFR is increased or decreased, the period $\Delta T$ between the successive interrupt pulses will be lengthened or shortened. In the above example, if and after the number CLBFR is changed to 400, then the successive periods $\Delta T$ will be 0.004 seconds.

Figure 3:
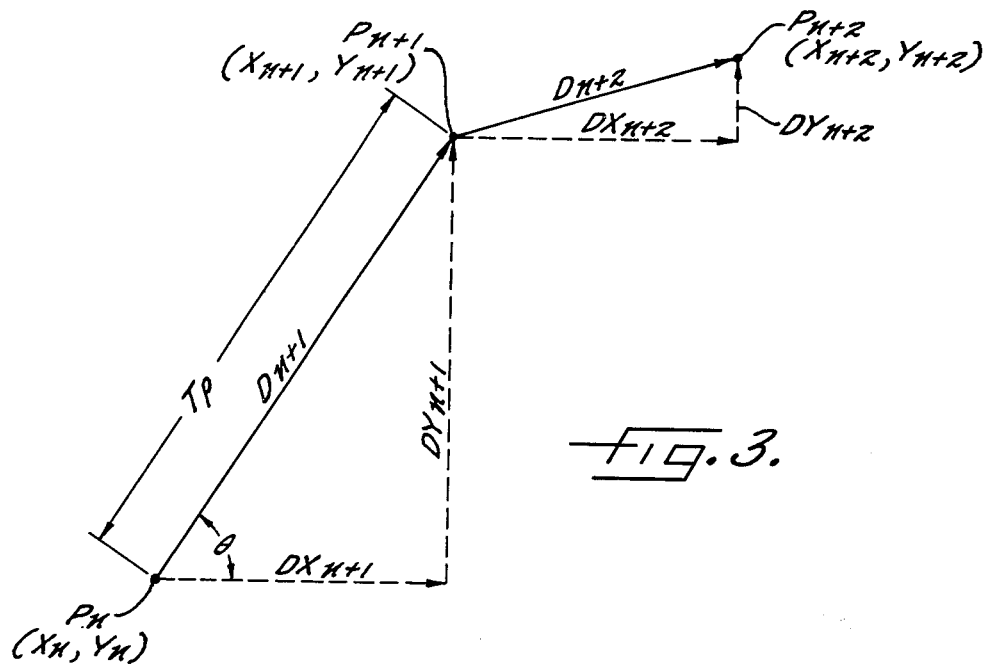
FIG. 3 is a simple vector diagram showing two successive path segments, and their X and Y axis components, through which a controlled member is to be physically moved according to two successive typical blocks of numerical command data.
Figure 4:
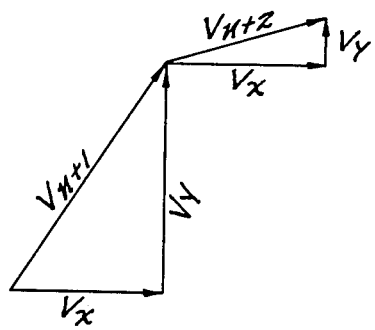
FIG. 4 is a diagram showing the corresponding velocity vectors for the two segments represented in FIG. 3.

III. The Nature of Successive Path Segments Defined By Successive Command Blocks Referring next to FIGS. 3 and 4, two typical segments of a complete program path are there represented by vectors, the segments $D_{n+1}$ and $D_{n+2}$ corresponding to successive data blocks on the punched tape 46. In the nomenclature for convenience in the present description, three successive blocks of data on the punched tape are designated $B_n$, $B_{n+1}$, $B_{n+2}$. It is assumed that the controlled member (workpiece 11) is currently being moved according to command data of the block $B_n$, whereas the block $B_{n+1}$ is next to be used and the block $B_{n+2}$ is third in the succession. When the execution of block $B_n$ is complete, data derived from the block $B_{n+1}$ is transferred and then treated as that for the new block $B_n$, the data for block $B_{n+2}$ is transferred and treated as being for block $B_{n+1}$, and the succeeding block on the punched tape becomes designated as the new block $B_{n+2}$. In FIGS. 3 and 4, it is assumed that the controlled member is currently being moved toward the end point $P_n$ having coordinates $X_n$, $Y_n$ along a path segment $P_n$ (not shown).

As shown in FIGS. 3 and 4, the path segment for block $B_{n+1}$ is a distance vector $D_{n+1}$ lying at some desired angle $\theta$ in the X, Y plane, and it is to be traveled by the controlled member at a velocity $V_{n+1}$ which is the vector sum of the axis component velocities $V_x$ and $V_y$. In essence, the command data for block $B_{n+1}$ (like that for other blocks) numerically designates the length of the axis components $DX_{n+1}$ and $DY_{n+1}$ whose vector sum is the path segment length $D_{n+1}$ lying at an angle $\theta$ which is $\tan^{-1} DY/DX$. Thus, the angle of the path segment is specified by DX and DY. The actual data numbers in the block $B_{n+1}$ on the punched tape may directly represent the values of the component distances DX and DY; or alternatively they may represent the ending coordinates $X_{n+1}$, $Y_{n+1}$ for the block segment, in which case DX and DY are indirectly designated, since $$DX_{n+1} = X_{n+1} - X_n \quad (1)$$

$$DY_{n+1} = Y_{n+1} - Y_n \quad (2)$$

Each block of data on the tape directly or indirectly designates numerically the path velocity or feed rate selected by the programming technician, although the arrangement may be such that a block of data not containing a designated velocity merely signifies that the last-specified velocity is to be employed. Again using block $B_{n+1}$ as an example, if the command data velocity number is in dimensions of inches per minute, then the path velocity vector magnitude $V_{n+1}$ may readily be converted into a "feed rate number" $FRN_{n+1}$, such that:

$$FRN_{n+1} = \frac{V_{n+1}}{D_{n+1}} = \frac{V_{n+1}}{\sqrt{DX_{n+1}^2 + DY_{n+1}^2}}$$

Given V and D for any block, the time required to move along a block path segment, as programmed is:

$$T_p = \frac{D}{V} = \frac{1}{FRN}$$

This will be apparent from FIGS. 3 and 4 where the path distance $D_{n+1}$ is to be traveled at a velocity $V_{n+1}$ in a total time interval $T_p$. From this, one may find the axis velocities $V_x$ and $V_y$ which are the vector components of the path velocity V, because:

$$V_x = \frac{DX}{T_p} \quad (5)$$

$$V_y = \frac{DY}{T_p} \quad (6)$$

In summary, each block of numerical command data on the punched tape 46 directly or indirectly designates both the axis distance components DX and DY, the path segment length D, the path velocity V and the axis component velocities $V_x$ and $V_y$. Such designation will here be assumed as accomplished by each block of the punched tape 46 containing three numbers, that is, the ending coordinates $X_{n+1}$ and $Y_{n+1}$ for a path segment designed in a block $B_{n+1}$, together with a feed rate number $FRN_{n+1}$ for the feed rate or path velocity selected by the programming technician.

It is important that the controlled member have precisely the velocities $V_x$ and $V_y$ along the X and Y axes, since otherwise there will be errors or departures from the segment vector D, and this will result in work inaccuracies or even workpiece spoilage.

When the end point $P_{n+1}$ for the block $B_{n+1}$ (FIG. 3) is reached by the member 11, the axis velocities $V_x$ and $V_y$ must change, either because a different path velocity or feed rate number is applicable for the next block $B_{n+2}$ or because the path segment $D_{n+2}$ lies at a different angle. Thus, as illustrated by way of example in FIG. 4, the X axis velocity $V_x$ forming a component of the path velocity $V_{n+2}$ is greater than that for the preceding block, whereas by contrast the Y axis velocity component $V_y$ for the path velocity $V_{n+2}$ is greatly less than that for the preceding block. Thus, there can and will be abrupt and large step changes in the axis velocities $V_x$ and $V_y$ at the transitions between successive segments if attempts are made to execute successive blocks of command data exactly as they are set down by the programming technician.

IV. The Digital Computer Organization

Referring again to FIGS. 2a and 2b, the principal components or portions of the digital computer will be seen to include a central processing unit 60 (familiar to those skilled in the art and commonly called CPU) which, in general terms, contains a multi-digit algebraic adder-subtractor capable also by repeated additions or substractions of multiplying and dividing. Input numbers represented by multi-bits, each of which can have a "1" or a "0" value, are fed to the CPU via a multi-conductor input trunk I through an address selector 61 controlled by a program unit 62 to determine the storage locations from which the input numbers are called. Instructions as to the nature of the arithmetic or other operation to be performed in the CPU are fed to the latter from the program unit 60 to designate that a received number is to be added or subtracted to the number existing in the accumulator, or the received number is to be multiplied or divided by the number existing in the accumulator which forms a part of the CPU. The result from any arithmetic operation or manipulation performed by the CPU appears in the accumulator and is signaled on a multi-conductor output trunk as the "answer" ANS. These operations are timed by a clock 64 working through the program unit 62 such that, for example, one arithmetic operation is carried out in two microseconds or less and a given computation sequence, such as the multiplication of two numbers, is completed within some multiple of that clock rate. When the answer ANS has been formed and signaled, the program unit then controls an address router 65 to send the signals representing the answer over an output trunk O to some designated storage location, or alternatively the answer is used directly by the program unit to determine the next control instruction sent to the address selector and the CPU.

A major portion of the computer is formed by addressable storage devices which receive and hold in readiness for recall changeable numbers represented in binary or BCD digital form, each number being designated by an address word which signifies the particular storage register or register portion in which that number is held. For convenience, the several number storage registers or word locations are here classified into groups designated as buffer storage 68, intermediate storage 69, and current storage 70. The buffer storage section contains numbers signaled by the tape reader and transferred through the CPU via the output trunk O to the appropriate registers therein. Generally speaking, the buffer storage section receives and holds command data numbers comprising the segment end point coordinates and the feed rate numbers for blocks designated as $B_{n+2}$ and $B_{n+3}$. The intermediate storage section 69, on the other hand, contains registers holding numbers which are directly or indirectly related to the command data blocks $B_{n+2}$ and $B_{n+1}$, each register being addressable under the control of the program unit to receive number-representing digital signals from, or to send them to, the CPU via the output trunk O or the input trunk I. Finally, the current storage section 70 also contains several word-addressable registers which hold changeable numbers pertaining to the data block $B_n$ which is being currently employed to directly control the instantaneous velocities and positions of the member 11 along the X and Y axes. These registers also may send signals to or receive signals from the CPU via the trunk I and the address selector 61 or via the address router 65 and the output trunk O, all under the control of the program unit 62.

Each of the number-storing registers (or register portions) shown in FIG. 2b as a rectangle is designated by its word address, and for purposes of discussion the changeable value numbers may here be called by those letter addresses so adopted. When one speaks of the number PRXC, for example, reference is made to the digital, multi-bit, bi-valued electrical signals which appear on the multi-conductor trunk I when the register labeled PRXC is interrogated by the address selector 61 controlled by the program unit 62. For ease of distinguishment, those numbers which represent preselected constants, but which do not change during actual contouring operations of the system are contained in registers shown in FIG. 2b as rectangles having diagonal lines at their corners. Each of these constants is readily changeable or adjustable by entry of the new value desired into the indicated storage location via the conventional keyboard terminal (not shown) associated with the computer. These constants may be changed, for example, when the control apparatus is disassociated from one machine tool having certain characteristics of inertia and the like and then reconnected with a different machine tool having differing characteristics.

Finally, some of the "numbers" held in addressable storage locations are merely one bit signals capable of representing a binary "1" or a "0" symbolizing "on" or "off." In some instances these signals may be transmitted over the input or output trunks I or O via the single bit conductor which normally represents the sign of a multi-digit number, but for ease of discussion in the present instance it shall be considered simply that these one bit-numbers, when having binary values of "1" or "0", represent a single digit decimal number having a value of one or zero. The storage locations for these one bit "indicator numbers" are shown by smaller squares in FIG. 2b and their functions will become apparent as the present description proceeds.

Before describing the sequential steps of operations performed and thus detailing more explicitly for those skilled in the art the apparatus here shown as an exemplary embodiment, it will be helpful to list and generally define in the following Table I the various word addresses and the nature of the corresponding numbers stored at each location. The letters employed in the word addresses and to designate storage registers or locations are very rough acronyms which will quickly find response in the mind of the reader, and these letters may of course be differently and arbitrarily chosen in actual commercial practice.

TABLE I

WORD SYMBOLS FOR DIGITALLY REPRESENTED NUMBERS AND THEIR STORAGE LOCATIONS

A. In the Current Storage Section

| | | |
|---|---|---|
| PRXC | — | The X velocity number representing distance units (in .0001") per period $\Delta TN$. |
| PRYC | — | Same as PRXC, but for Y axis |

TABLE I-continued
WORD SYMBOLS FOR DIGITALLY REPRESENTED NUMBERS AND THEIR STORAGE LOCATIONS

| | |
|---|---|
| LOOPC | — The number of iterations $\Delta T$ (sometimes called "loops") required to execute the motions called for by block $B_n$. |
| LOOPB | — The number of iterations $\Delta T$ to elapse at the programmed velocity for block $B_n$ before acceleration or velocity changing begins toward the programmed velocity for block $B_{n+1}$. |
| XINC | — The amount by which the X velocity number PRXC should be changed during each period $\Delta T$ to produce desired acceleration near the end of block $B_n$. |
| YINC | — Ditto, except for Y axis. |
| DC | — A one-bit signal which when "1" designates that acceleration/deceleration action is required at the terminal portion of the segment for block $B_n$. |
| CLBFR | — A "clock buffer" number which is periodically preset into down counter 56 to establish the duration of the successive periods $\Delta T$. |
| CLMOD | — A modifying number which can increase the number CLBFR above its normal value of 200. |
| CLINC | — A predetermined constant used to incrementally increase or decrease CLMOD. |
| CLMAX | — A predetermined constant representing the maximum value which CLMOD can reach, to impose an upper limit on CLBFR. Typically, this constant may be 3800. |
| PER | — A number designating a feed rate override percentage, normally equal to FRO which depends on setting of dial 50. |
| NLOOP | — A number which dynamically represents the quantity of periods $\Delta T$ elapsed during the actual execution of block $B_n$. |
| LERRX | — A number representing a first predetermined or threshold value of the X axis position error. |
| HERRX | — A number like LERRX but representing a second and higher threshold value. |
| LERRY | — Like LERRX, except for Y axis. |
| HERRY | — Like HERRX, except for Y axis. |
| XTRIM | — The active gain factor applied as a multiplier to the X error number to create a trim adjustment in the X servo input signal. |
| YTRIM | — Ditto, except for Y axis. |
| XKBIAS | — A number by which the historical number XBIAS is incremented during each period $\Delta T$ under certain conditions, to modify the X servo input signal. |
| YKBIAS | — Ditto, except for Y axis. |
| XTRMH | — A constant to be used as the value of XTRIM when the X axis is holding or has zero velocity. |
| YTRMH | — Ditto, except for Y axis. |
| XTRMR | — Like XTRMH except used when the X axis is running at a finite velocity. |
| YTRMR | — ditto, except for Y axis. |
| XT | — The theoretical X axis position determined during one iteration period and applicable during the next. |
| YT | — Ditto, except for Y axis. |
| XTC | — The theoretical X axis position determined during the previous $\Delta T$ and applicable during the current $\Delta T$. |
| YTC | — Ditto, except for Y axis. |
| XERR | — The instantaneous position error existing on the X axis. |
| YERR | — Ditto, except for Y axis. |
| BEKNT | — A number representing a black error count, used to create a delay in the response to any axis exceeding the second error threshold. |
| BEDLAY | — A constant used to preset BEKNT and establish the duration of the delay. |
| REDKNT | — A number representing a red error count, used to create a delay in the response to any axis exceeding a third error threshold. |
| REDLAY | — A constant to preset REDLAY and establish the duration of the delay. |
| EMKNT | — A number representing an emergency count, used to create a delay in the response to an emergency stop condition. |
| XKBH | — A constant used for the value of the bias incrementing number when the X axis is holding with zero velocity. |
| YKBH | — Ditto, except for Y axis. |
| XKBR | — A constant used for the value of the bias incrementing number XKBIAS when the X axis is running. |
| YKBR | — Ditto, except for Y axis. |
| XGAIN | — A gain factor used in producing the X axis servo input signal. |
| YGAIN | — Ditto, except for Y axis. |
| HOLD | — A one-bit indicator designating that all axis velocities should be brought to zero. |
| OHOLD | — A one-bit indicator designating that HOLD was on during the previous iteration period $\Delta T$. |
| HALT | — A one-bit indicator designating that red error stop is required. |
| LDT | — A one-bit indicator calling for lengthening of $\Delta T$ periods. |
| EMHOLD | — A one-bit indicator designating that an emergency stop is required. |
| FRO | — A number from the machine console representing the operator-selected feed rate override. |
| MH | — A one-bit indicator signal from the console indicating a hold is called for from the machine. |
| STOP | — A one-bit indicator from the console signifying that operator or some other source has called for an emergency stop. |

TABLE I-continued
WORD SYMBOLS FOR DIGITALLY REPRESENTED NUMBERS AND THEIR STORAGE LOCATIONS

| | |
|---|---|
| XIN | — the instantaneous actual position of the member along the X axis, signaled by sensing the member. |
| YIN | — Ditto, except for Y axis. |
| B. In the Intermediate Storage Section | |
| $X_{n+1}$ | — End point X coordinate for block $B_{n+1}$ |
| $Y_{n+1}$ | — End point Y coordinate for block $B_{n+1}$ |
| TPRX | — The temporary X axis velocity number for block $B_{n+1}$ (to become PRXC when $B_{n+1}$ becomes the new $B_n$). |
| TPRY | — Ditto, except for Y axis. |
| LOOPP | — The number of loops or periods $\Delta T$ required to execute block $B_{n+1}$ as programmed. |
| LOOPF | — Like LOOPC except it is for block $B_{n+1}$. |
| LOOPS | — Like LOOPB except it is for block $B_{n+1}$. |
| PC | — One-half the number of loops or periods $\Delta T$ required to change the velocity (for the axis programmed to undergo the largest step change) from the $B_n$ programmed value to the $B_{n+1}$ programmed value. |
| PRXI | — Corresponds to XINC but is applicable to block $B_{n+1}$. |
| PRYI | — Corresponds to YINC but is applicable to block $B_{n+1}$. |
| DECEL | — A one bit indicator like DC, but applies to block $B_{n+1}$. |
| FRN' | — The feed rate number for block $B_{n+2}$. |
| $X_{n+2}$ | — Like $X_{n+1}$ but for $B_{n+2}$. |
| $Y_{n+2}$ | — Like $Y_{n+1}$ but for $B_{n+2}$. |
| TPRX' | — Like TPRX but for $B_{n+2}$. |
| TPRY' | — Like TPRY but for $B_{n+2}$. |
| LOOPP' | — Like LOOPP but for $B_{n+2}$. |
| $\Delta PRX$ | — The change in X axis velocity in going from $B_{n+1}$ to $B_{n+2}$ as represented by tape command data. |
| $\Delta PRY$ | — Ditto, except for Y axis. |
| P | — Like PC, except for the transition between $B_{n+1}$ and $B_{n+2}$. |
| 2P | — Twice the value of P. |
| DRIND | — A one-bit "data ready" indicator. |
| A | — A costant selected to represent the maximum acceleration along an axis. |
| K | — A constant equal to the reciprocal of A. |
| C. In the Buffer Storage Section (Taken Directly from Punched Tape) | |
| $BX_{n+2}$ | — The ending X coordinate for $B_{n+2}$. |
| $BY_{n+2}$ | — The ending Y coordinate for $B_{n+2}$. |
| $BX_{n+3}$ | — The ending X coordinate for $B_{n+3}$. |
| $BY_{n+3}$ | — The ending Y coordinate for $B_{n+3}$. |
| $BFRN_{n+2}$ | — The feed rate no. V/D for $B_{n+2}$. |
| $BFRN_{n+3}$ | — The feed rate no. V/D for $B_{n+3}$. |

V. The Digitally Signaled Basic Numbers To Produce Movement According to Block $B_n$ To provide an insight into the operations of the system illustrated in FIGS. 2a and 2b, attention is again directed to the block $B_{n+1}$ shown as space vectors in FIG. 3 and velocity vectors in FIG. 4. The punched tape command data for this block include the end point coordinates $X_{n+1}$, $Y_{n+1}$ and the feed rate number $FRN_{n+1}$. The starting coordinates $X_n$ and $Y_n$ are, of course, available as part of the tape data for the preceding block $B_n$.

Because $FRN_{n+1}$ is obtained directly from the punched tape (or can be determined from the path velocity $V_{n+1}$ if that velocity number is instead carried on the programmed tape), the time $T_p$ to travel the segment $D_{n+1}$ may be determined from Equations (3) and (4), supra. Recognizing, however, that the number FRN is placed on the punched tape with dimensions expressed as the reciprocal of minutes, Equation (4) may be rewritten:

$$T_p = \frac{D}{V} \times 60 = \frac{60}{FRN} \text{ seconds} \quad (7)$$

But if it is assumed merely for example that the periods $\Delta T$ between interrupt pulses are normally made to have a duration $\Delta TN$ chosen as 0.002 seconds, then the number LOOPP of periods $\Delta T$ to elapse during the time period $T_p$ is expressable:

$$LOOPP = \frac{T_p}{\Delta TN} = \frac{60}{FRN} \times \frac{1}{\Delta TN} = \frac{60}{FRN(.002)} = \frac{30000}{FRN} \quad (8)$$

As noted by Equations (5) and (6), the requisite axis velocity components, if the time $T_p$ is required to execute the departures DX and DY (FIG. 3), are equal simply to those departures divided by $T_p$. But the departures are expressable in terms of coordinates according to Equations (1) and (2) which will involve dimensions expressed in inches as they appear on the punched tape. If the axis component distances are, for better resolution and ease of handling, expressed with one unit equal to one ten-thousandths of an inch, i.e., 0.0001 inch, and each such unit is called a "pip", then the axis velocities $V_x$ and $Y_y$ (here conveniently designated TPRX and TPRY) called for by any block of command data become:

$$V_x = TPRX = \frac{DX}{T_p} \text{ inches/min} \quad (9)$$

$$TPRX = \frac{(X_{n+1} - X_n)(10,000)}{30,000/FRN} = (.3333)(FRN)(X_{n+1} - X_n) \quad (10)$$

where TPRX is dimensionally pips per $\Delta TN$ and similarly $$TPRY = (0.3333)(FRN)(Y_{n+1} - Y_n) \tag{11}$$

Referring now to FIG. 8, the solid line 80 represents an axis velocity (merely assumed to be for the X axis) as it would be produced if successive command blocks $B_n$, $B_{n+1}$ and $B_{n+2}$ were physically executed exactly according to the tape program data. From this, it will be seen that the jump or velocity transition $\Delta PRX$ at the end of the programmed block $B_{n+1}$ is numerically representable as:

$$\Delta PRX = TPRX_{n+2} - TPRX_{n+1} \tag{12}$$

and if $TPRX_{n+2}$ is called $TPRX'$, then $$\Delta PRX = TPRX' - TPRX \tag{13}$$

Similarly, for the Y axis, the programmed velocity jump is $$\Delta PRY = TPRY' - TPRY \tag{14}$$

But the "jumps" in programmed axis velocity may not be the same in magnitude, and indeed at least one of the axis velocity jumps will probably exceed the acceleration capabilities of the corresponding servo system 21 or 31. Thus, it is desirable to determine which one of the velocity jumps is the largest, in order that the acceleration therefor can be limited to a value which is substantially the maximum acceleration which the servo drives are fully capable of producing. Thus, $\Delta PRX$ and $\Delta PRY$ may be compared and the largest one selected and designated $\Delta PRfa$. $\Delta PRfa$ is so labed in FIG. 8 with the assumption that $\Delta PRX$ is greater than $\Delta PRY$.

For the inertia of the loads represented by the saddle 16 and table 29, and the maximum available torque and horsepower from the servomotors XM and YM, the maximum obtainable acceleration may be determined as a number A having dimensions in pips per $\Delta TN$ per $\Delta TN$. Given such acceleration number A (which is placed in the intermediate storage as a constant, together with its reciprocal K, see FIG. 2b), the number of loops or periods $\Delta T$ required to change the velocity from TPRX to TPRX' can be found from the relation:

$$TR = \frac{\Delta PRfa}{A} = (\Delta PRfa)(K) \tag{15}$$

The number TR simply represents the quantity of time periods $\Delta T$ required for the velocity to change along the dashed line 81 in FIG. 8 if the velocity uniformly changes at a rate A which corresponds to the slop of the line 81. Thus it will be apparent that the quantity TR depends both upon the magnitude of the velocity jump from TPRX to TPRX' and the predetermined maximum acceleration value A.

Because the velocity TPRX will actually be changed in small steps during each of several successive periods $\Delta T$ (rather than strictly along the straight line 81 as hereinafter explained, it is desirable to make the effective value of the number TR equal to the nearest higher odd integer. This results in the increase $a_1$ in the area under the curve 81 being equal to the decrease $a_2$ in the area under the curve (relative to the solid line representing programmed velocity), so that the time-position relation is essentially unchanged one $\Delta T$ after the velocity reaches the TPRX' level. Therefore, the number TR is simply "rounded up" to the next higher value TR' which is an odd integer. For example, if TR is 23.45 TR' is set to a value of 25; and if TR Is 27.15, TR' is given a value of 29. This has the innocuous effect of reducing the physical acceleration ultimately produced to a value slightly lower than A.

Given TR' as so determined, it is here designated as a number 2P to signify the number of loops required for the velocity transition from TPRX to TPRX'. One-half of that quantity (namely, P) is required for half of the velocity transition. Since TR' and 2P are always odd integers, it follows that P will always be a number ending with the digit 5 in its tenths digit place. Therefore, the steps for obtaining numerical values of P and 2P are:

a. Compute TR from Equation (15).
b. If all of its digits to the right of the decimal point are not zero, then add one to produce a number TR + 1, and set all digits to the right of the decimal point equal to zero, thus obtaining a provisional value of 2P.
c. Divide that last number by two to obtain a provisional value for the number P.
d. If the tenths digit place for that provisional value of P is not the integer 5, add 0.5 to obtain a value for P.
e. Multiply P by two to obtain 2P (which is tantamount to TR'). Example:
  a. If TR = $(\Delta PRfa)(K)$ = 23.63,
b. Make the number 23.63 + 1 = 24.63 and drop the last two digits to obtain 24.0.
c. Divide by two to obtain 12.0.
d. Since the tenths digit place of 12.0 is not 5, add 0.5 to obtain 12.5.
e. Multiply by two to obtain 25.0. Thus P = 12.5 and 2P = 25.

Having so obtained the number of loops 2P which will elapse while the velocity is changing along the maximum tolerable acceleration line 81 (FIG. 8), the increments or "velocity change per $\Delta T$" necessary for all axis velocities to correspondingly change from the block $B_{n+1}$ to the block $B_{n+2}$ values may be determined. The relationships are:

$$PRXI = \frac{\Delta PRX}{2P} \tag{16}$$

$$PRYI = \frac{\Delta PRY}{2P} \tag{17}$$

where PRXI and PRYI are changes per $\Delta T$ in axis velocities expressable as pips per $\Delta T$. The largest increment number will be approximately equal to A, but because the programmed velocity step changes for the other axes will be different, the other axes increment numbers may be greatly different from the largest one.

As indicated above, if the velocity TPRX were held during the entire block time $T_p$ as programmed, a quantity LOOPP of loops would elapse. However, to provide for acceleration/deceleration, the servo control system of FIGS. 2a and 2b treats each each block as made up of a first portion traveled by the controlled member at the program-designated velocity (with $V_x$ and $V_y$ equal respectively to TPRX and TPRY) followed by a second portion during which all of the axis velocities are periodically incremented or decremented. In other words, a "servo block" as labeled in the lower portion of FIG. 8 is offset in time from the theoretical programmed blocks as labeled in the upper portion of FIG. 8. Two numbers or quantities are important in this respect, i.e., those time intervals which are labeled LOOPS and LOOPF in FIG. 8. Merely from inspection, it will be seen that:

$$\text{LOOPS} = \text{LOOPP} - \text{PC} - \text{P} \qquad (18)$$

$$\text{LOOPF} = \text{LOOPS} + 2\text{P} \qquad (19)$$

where LOOPS and LOOPF are in dimensions of quantities of periods $\Delta T$, and PC is the value for block $B_n$ which corresponds to P for block $B_{n+1}$. It is to be observed that if servo block $n_+1$ begins at that instant when the X axis velocity reaches the level of TPRX (after decreasing along the sloped line 82) and ends at that instant in time when the velocity reaches the level TPRX' (after increasing along the sloped line 81, then the number LOOPF represents the total number of iteration periods $\Delta T$ which will be required for the servo block $n_+1$ to be physically executed. Similarly, the quantity LOOPS shown in FIG. 8 designates the number of iteration periods $\Delta T$ which will elapse while the X axis velocity is remaining steady at the value TPRX. Finally, the quantity P as labeled in FIG. 8 represents the number of iteration periods which will be required for the velocity to change through one-half of the difference between TPRX and TPRX', i.e., the velocities as respectively required by the program blocks $B_{n+1}$ and $B_{n+2}$.

In the foregoing discussion, reference has been made principally to block $B_{n+1}$ and its axis velocity illustrated in FIG. 8. It has been shown that for the block $B_{n+1}$ the values of TPRX, TPRY, PRXI, PRYI, LOOPS and LOOPF are expressed by Equations (10), (11), (16), (17), (18) and (19). These numerical values as so designated will, however, become the corresponding values for the new block $B_n$ when the old block $B_n$ has been completed, and at such time they are transferred into the current storage section 70 in FIG. 2b. Thus, TPRX becomes PRXC TPRY becomes PRYC LOOPS becomes LOOPB LOOPF becomes LOOPC PRXI becomes XINC PRYI becomes YINC Having received these numbers as applicable to the new current block $B_n$, the current storage section 70 together with the program unit 62 and the digital computer carries out the necessary operations to energize the servo systems 21 and 31 so that the member 11 moves along the path segment $D_n$ at the path velocity defined by $FRN_n$. The manner in which the digital signals are originally produced and stored — to represent the current numbers PRXC, PRYC, LOOPB, LOOPC, XINC and YINC in the active storage section 70 — will be treated more fully below. At that time, the one-bit deceleration indicator DECEL (for $B_{n+1}$) and DC (for $B_n$) will be explained, the signal DC being assumed for the time being to have a "1" value.

VI. Physical Setup of the Computer and the Servo Routine Method With Variable Time Periods With the assumption that the numbers listed in the preceding paragraph have just been transferred into the corresponding storage registers of section 70, and the number NLOOP has been set to zero, the organization and operation of the system in FIGS. 2a, 2b may now be understood with reference to the flow chart in FIGS. 5a and 5e. The latter figures, taken with Table II below, fully disclose to one skilled in the art a "master program" which is entered into the programming unit 62 via the typewriter or keyboard terminal (not shown) associated with the computer. This master program is here called a "servo routine" which is iteratively performed once during each period $\Delta T$ in response to each of the interrupt pulses appearing on line 55a (FIG. 2b). The gates, logic condition sensors, and sequencers within the program unit 62 are physically modified by the inserted program, as those skilled in the art understand, and thus these circuits need not be shown or described in detail.

The master program flow chart in FIGS. 5a-5e includes some blocks representing multiple computer steps, merely for clarity and brevity. The program steps are defined more specifically, however, in the following supplemental table:

TABLE II

PROGRAM STEPS FOR CONTINUOUS CONTROL OF SERVO SYSTEMS

Enter in response to each $\Delta T$ interrupt pulse.
| | |
|---|---|
| 001. | Transfer CLBFR into DWNCTR |
| | (Clear accum, read in CLBFR, store ANS in DWNCTR) |
| 002. | Transfer HOLD into OHOLD |
| | (Both HOLD and OHOLD are thereafter 1 or 0) |
| 003. | Clear accum, read in BEKNT |
| | In ANS is zero, skip to step 035a |
| | If ANS not zero, proceed to step 004 |
| 004. | Transfer MH into HOLD |
| 005. | Transfer FRO into PER |
| 006. | Clear accum, read in LOOPC and NLOOP to compute LOOPC − NLOOP |
| | If ANS ≥ 1, skip to 023 |
| | If ANS <1, proceed |
| 007. | Clear accum, read in DRIND |
| | If ANS = 0, skip to 026 |
| | If ANS = 1, proceed |
| 008. | Transfer LOOPF in LOOPC |
| 009a. | Transfer TPRX into PRXC |
| 009b. | Transfer TPRY into PRYC |
| 010. | Clear accum |
| | Store zero ANS in NLOOP |

TABLE II-continued
PROGRAM STEPS FOR CONTINUOUS CONTROL OF SERVO SYSTEMS

|        | Store zero ANS in DRIND |
|--------|--|
| 011a.  | Clear accum, read in PRXC and constants, compute 4 (PRXC + 8)<br>Store ANS in LERRX |
| 011b.  | Read in constant 2 and multiply to obtain 8 (PRXC + 8) |
| 011c.  | Clear accum, read in PRYC and constants, compute 4 (PRYC + 8)<br>Store ANS in LERRY |
| 011d.  | Read in constant 2 and multiply to obtain 8 (PRYC + 8)<br>Store ANS in HERRY |
| 012a.  | Transfer REDLAY into REDKNT |
| 012b.  | Transfer DECEL into DC |
| 013.   | If ANS is zero, skip to 015<br>If ANS is 1, proceed |
| 014a.  | Transfer LOOPS into LOOPB |
| 014b.  | Transfer PRXI into XINC |
| 014c.  | Transfer PRYI into YINC |
| 015.   | Clear accum, read in HOLD<br>If ANS is 1, skip to 017a<br>If ANS is 0, proceed |
| 016.   | Clear accum, read in PRXC<br>If ANS is not zero, skip to 018a<br>If ANS is zero, proceed |
| 017a.  | Transfer XTRMH into XTRIM |
| 017b.  | Transfer XKBH into XKBIAS<br>skip to 019 |
| 018a.  | Transfer XTRMR into XTRIM |
| 018b.  | Transfer XKBR into XKBIAS |
| 019.   | Clear accum, read in HOLD<br>If ANS is 1, skip to 021a<br>If ANS is 0, proceed |
| 020.   | Clear accum, read in PRYC<br>If ANS is not 0, skip to 022a<br>If ANS is 0, proceed |
| 021a.  | Transfer YTRMH into YTRIM |
| 021b.  | Transfer YKBH into YKBIAS<br>skip to 24 |
| 022a.  | Transfer YTRMR into YTRIM |
| 022b.  | Transfer YKBR into YKBIAS<br>Skip to 024 |
| 023.   | Clear accum, read in EMHOLD<br>If ANS is 1, skip to 026<br>If ANS is 0, proceed |
| 024.   | Clear accum, read in PER and constant .05, compute PER − .05<br>If ANS is negative, skip to 026<br>If ANS is positive, proceed |
| 025.   | Clear accum, read in PER and constant 200, compute 200÷PER<br>Store ANS in CLBFR<br>Skip to 027 |
| 026.   | Set HOLD =1<br>(Clear accum, read in constant 1, store ANS in HOLD) |
| 026a.  | Clear PER (Set PER = 0) |
| 0.27   | Clear accum, read in HOLD and OHOLD to signal (HOLD − OHOLD)<br>If ANS is zero, skip to 030<br>If ANS is not zero, proceed |
| 028.   | Transfer HOLD into OHOLD |
| 029.   | Clear accum<br>Store zero ANS in XBIAS and YBIAS<br>Return to step 015 |
| 030.   | Clear accum, read in HOLD<br>If ANS is 1, skip to 035a<br>If ANS is 0, proceed |
| 031.   | Clear accum, read in DC<br>If ANS is 0, skip to 034<br>If ANS is 1, proceed |
| 032.   | Clear accum, read in NLOOP and LOOPB, compute NLOOP − LOOPB<br>If ANS is negative, skip to 034<br>If ANS is not negative, proceed |
| 033a.  | Clear accum, read in PRXC and XINC, compute PRXC + XINC<br>Store ANS in PRXC |
| 033b.  | Clear accum, read in PRYC and YINC, compute PRYC + YINC<br>Store ANS in PRYC |
| 034a.  | Clear accum, read in XTC and PRXC, compute XTC + PRXC<br>Store ANS in XT |
| 034b.  | Clear accum, read in YTC and PRYC, compute YTC + PRXC<br>Store ANS in YT |
| 035.   | Clear accum, read in NLOOP and constant 1, compute NLOOP + 1<br>Store ANS in NLOOP<br>Skip to 036 |
| 035a.  | Clear PER (set PER = 0) |
| 036a.  | Clear accum, read in XTC and XIN, compute XTC − XIN<br>Store ANS in XERR |
| 036b.  | Clear accum, read in YTC and YIN, compute YTC − YIN<br>Store ANS in YERR |
| 037.   | Clear accum, read in LERRX and \|XERR\|, compute LERRX − \|XERR\|<br>If ANS is not negative, skip to 043<br>If ANS is negative, proceed |
| 038.   | Clear accum, read in HERRX and \|ERRX\|, compute HERRX − \|XERR\|<br>If ANS is negative, skip to 059<br>If ANS is not negative, proceed |
| 039.   | Clear accum, read in XERR |

TABLE II-continued

PROGRAM STEPS FOR CONTINUOUS CONTROL OF SERVO SYSTEMS

|   |   |
|---|---|
|   | If ANS is not positive, skip to 041<br>If ANS is positive, proceed |
| 040. | Clear accum, read in PRXC<br>If ANS is not positive, skip to 043<br>If ANS is positive, skip to 042 |
| 041. | Clear accum, read in PRXC<br>If ANS is positive, skip to 043<br>If ANS is not positive, proceed |
| 042. | Set LDT = 1 (clear accum, Read in 1, store ANS in LDT) |
| 043. | Clear accum, read in ERRY and $|YERR|$, compute LERRY $-$ $|YERR|$<br>If ANS is not negative, skip to 049<br>If ANS is negative, proceed |
| 044. | Clear accum, read in HERRY and $|YERR|$, compute HERRY $-$ $|YERR|$<br>If ANS is negative, skip to 059<br>If ANS is not negative, proceed |
| 045. | Clear accum, read in YERR<br>If ANS is not positive, skip to 047<br>If ANS is positive, proceed |
| 046. | Clear accum, read in PRYC<br>If ANS is not positive, skip to 049<br>If ANS is positive, skip to 048 |
| 047. | Clear accum, read in PRYC<br>If ANS is positive, skip to 049<br>If ANS is not positive, proceed |
| 048. | Set LDT = 1 |
| 049. | Clear accum, read in LDT<br>If ANS is zero, skip to 052<br>If ANS is 1, proceed |
| 050. | Clear accum, read in CLMOD and CLINC, compute CLMOD + CLINC<br>Store ANS in CLMOD |
| 051. | Clear accum, read in CLMAX and CLMOD, compute CLMAX $-$ CLMOD<br>If ANS is negative, skip to 056<br>If ANS is not negative, skip to 054 |
| 052. | Clear accum, read in CLMOD<br>If ANS is zero, skip to 057<br>If ANS is not zero, proceed |
| 053. | Read in CLINC, compute CLMOD $-$ CLINC<br>Store ANS in CLMOD |
| 054. | Clear accum, read in CLBFR and CLMOD, compute CLBFR + CLMOD<br>Store ANS in CLBFR |
| 055. | Read in CLMAX and constant 200, compute CLFR $-$ CLMAX $-$ 200<br>If ANS is negative, skip to 057<br>If ANS is not negative, proceed |
| 056. | Clear accum, read in CLMAX and constant 200, compute CLMAX + 200<br>Store ANS in CLBFR |
| 057. | Set LDT = 0 |
| 058. | Transfer BEDLAY into BEKNT<br>Skip to 066 |
| 059. | Clear accum, read in constant 2, HERRX and $|XERR|$, compute 2 (HERRX) $-$ $|XERR|$<br>If ANS is negative, skip to 064<br>If ANS is not negative, proceed |
| 060. | Clear accum, read in const. 2, HERRY and $|YERR|$, compute 2 (HERRY) $-$ $|YERR|$<br>If ANS is negative, skip to 064<br>If ANS is not negative, proceed |
| 061. | Clear accum, read in HOLD<br>If ANS is 1, skip to 066<br>If ANS is 0, proceed |
| 062. | Clear accum, read in BEKNT and constant 1, compute BEKNT $-$ 1<br>Store ANS in BEKNT |
| 063. | If ANS is zero, return to step 026<br>If ANS is not zero, skip to 066 |
| 064. | Clear accum, read in REDKNT and constant 1, compute REDKNT $-$ 1<br>Store ANS in REDKNT |
| 065. | If ANS is zero, skip to 069<br>If ANS is not zero, proceed |
| 066. | Clear accum, read in EMHOLD<br>If ANS is 1, skip to 073<br>If ANS is 0, proceed |
| 067. | Clear accum, read in STOP<br>If ANS is 0, skip to 080<br>If ANS is 1, proceed |
| 068. | Clear accum, read in constant 50<br>Store ANS in EMKNT<br>Skip to 072 |
| 069. | Set EMKNT = 1 |
| 070. | Set HALT = 1<br>Skip to 072 |
| 072. | Set EMHOLD = 1<br>Return to step 026 |
| 073. | Clear accum, read in EMKNT<br>If ANS is 0, skip to 076<br>If ANS is not, proceed |
| 074. | Clear accum, read in EMKNT and constant 1, compute EMKNT $-$ 1.<br>Store ANS in EMKNT |
| 075. | if ANS is zero, skip to 087<br>If ANS is not zero, skip to 080 |
| 076. | Clear accum, read in HALT<br>If ANS is 1, skip to 087 |

TABLE II-continued

PROGRAM STEPS FOR CONTINUOUS CONTROL OF SERVO SYSTEMS

| | |
|---|---|
| | If ANS is 0, proceed |
| 077. | Clear accum, read in STOP |
| | If ANS is 1, skip to 087 |
| | If ANS is 0, proceed |
| 078. | Set EMHOLD = 0 |
| 079. | turn on servo power relay |
| 080. | Clear accum, read in XERR |
| | If ANS is zero, skip to 082 |
| | If ANS is not zero, proceed |
| 081. | Clear accum read in XBIAS and XKNIAS using sign of ERRX for sign of XKBIAS, compute XBIAS + XKBIAS |
| | Store ANS in XBIAS |
| 082. | Clear accum, read in XGAIN, PER, PRXC, XTRIM, XERR, and XBIAS, Compute XGAIN [PER · PRXC + XTRIM · XERR + XBIAS] |
| | Store ANS in XDAC |
| 083. | Clear accum, read in YERR |
| | If ANS is not zero, proceed |
| | If ANS is zero, skip to 085 |
| 084. | Clear accum, read in YBIAS and YKBIAS using sign of ERRY for sign of YBIAS, compute YBIAS + YKBIAS |
| | Store ANS in YBIAS |
| 085. | Clear accum, read in YGAIN, PER, PRYC, YTRIM, YERR, and YBIAS, Compute YGAIN [PER · PRYC + YTRIM · YERR + YBIAS] |
| | Store ANS in YDAC |
| 086a. | Transfer XT into XTC |
| 086b. | Transfer YT into YTC |
| | Skip to 088 |
| 087. | turn off servo power relay |
| 088. | Exit |

A. A Normal Iteration Cycle

By referring to FIGS. 5a-5e and Table II, a narrative sequence of the successive operational steps will become fully understandable, and such a narrative for a "normal" cycle will first be presented. In response to an interrupt pulse (on line 55a, FIG. 2b), the number CLBFR is sent over the output trunk O to preset the down counter 56, thereby starting the measuring off of a period ΔT which will end when the next interrupt pulse appears. The specific substeps which make up step 001 are (a) clearing of the accumulator in the CPU to hold zero, (b) calling and reading into the accumulator via trunk 1 the number then in the CLBFR storage register, and (c) routing that number (then constituting the answer ANS) over the output trunk O to the presetting gates 59, i.e., to the address DWNCTR. This is a simple "transfer" sequence, and the sub-steps for similar transfers will not be repeated hereinafter. It is to be noted that the number called from storage for transfer does not change in its original storage register as a consequence, but the previous number at the transferree address register is eradicated when the new number is "written" therein.

At step 002, the signal HOLD (as it existed at the end of the previous iteration period ΔT) is transferred to OHOLD. Thus, OHOLD represents "old hold", i.e., the status of the HOLD signal at the end of the previous cycle.

Step 003 is performed to determine if a "black error hold" condition exists (as explained below). For a normal cycle the number BEKNT will not be zero, so the transfer operations of steps 004 and 005 will next be performed. Thus, if the switch 48 (FIG. 1) is at that instant closed or opened to make MH a "1" or "0", HOLD will be correspondingly made 1 or 0. For a normal cycle, it is assumed that MH is zero. Whatever value of FRO has been selected by the operator's adjustment of dial 50 (FIG. 1) will be taken over the input trunk I and transferred into the PER register.

At step 006, it is determined whether or not the required number of loops (i.e., cycles or ΔT's) have elapsed since the execution of the current block $B_n$ began. As noted below, the number NLOOP is incremented by one during each period ΔT, and when the latter becomes equal to LOOPC (see FIG. 8) the servo block $B_n$ is completed. In a normal cycle at step 006, NLOOP will be less than LOOPC, so that the program unit skips to step 023. Because the EMHOLD signal (whose purpose is noted below) is zero during a normal cycle, the system proceeds from step 023 to step 024 where it is determined whether or not the presently effective feed rate override number is less than five percent. If that determination is affirmative, then the system treats the feed rate override numbers as being effectively zero, and the system is put into a holding condition so as to avoid extremely slow and almost imperceptible axis velocities. In a normal cycle, the interrogation at step 024, performed by determining whether (PER - 0.05) is negative, will result in a "no" result, so that the program unit proceeds to step 025.

At step 025 the clock buffer number CLBFR is initially set to a value equal to 200/PER and thus to a value which makes the durations of periods ΔT have the "normal" value of 0.002 seconds increased or decreased according to the effective feed rate override number (PER having been previously set to equal FRO). Thus, at step 025 CLBFR will become 200 if PER is 1.0, but CLBFR will become 400 if PER is 0.50. In the latter instance, subsequent periods ΔT will be made 0.004 seconds rather than the normal durations of 0.002 seconds. If a "slowdown" change of the ΔT durations has been or is in effect, this number CLBFR will be changed to a different value later in the iteration sequence, as hereinafter described, and then will be used to preset the down-counter 56 at step 001 of the next cycle. It may be assumed in the present narrative for a normal cycle that FRO is equal to 1.00 and step 025 results in CLBFR being set to a value of 200.

The system then skips to step 027 where the HOLD and OHOLD signals are compared to determine if they are alike or unlike, i.e., if their difference is zero or ±1. If alike, this indicates that there has been no change in the status of the HOLD signal from the previous cycle to the present cycle, and if unlike the opposite is indicated. In the present "normal" cycle the operations at step 027 will produce a "no" answer because HOLD and OHOLD are both O, so the system skips to step 030.

At step 030, the HOLD signal is sensed. In a normal cycle such signal is zero. The system proceeds to step 031 where it is determined whether or not the block $B_n$ is one which requires acceleration or deceleration at its terminal portion (see FIG. 8). Assuming that the signal DC is 1, the system proceeds to step 032 where a determination is made as to whether or not that point in time and travel has been reached at which the velocity should begin changing along a slope, such as the slop represented by line 82 in FIG. 8. The operation at step 032 determines whether the quantity NLOOP-LOOPB is negative, a no response indicating that deceleration or acceleration should begin, and a yes response indicating that it should not yet begin because the progress of the block is somewhere along the horizontal line labeled PRXC in FIG. 8. Thus, in a normal cycle the system skips from step 032 to step 034.

It will be recalled that the signaled numbers XT and YT represent the dynamically changeable values of the instantaneous theoretical axis positions. If movement along the X and Y axes is supposed to occur at a rate or velocity of PRXC and PYRC per period $\Delta T$, then the theoretical positions along the X and Y axes progressively change by the incremental distances of PRXC and PYRC per $\Delta T$. In order to dynamically change the numerically signaled theoretical positions XT and YT, the digital computer increments those number-representing signals during each cycle such that:

$$XT_i = XTC_{i-1} + PRXC \tag{20}$$

$$YT_i = YTC_{i-1} + PRYC \tag{21}$$

Figure 5A:
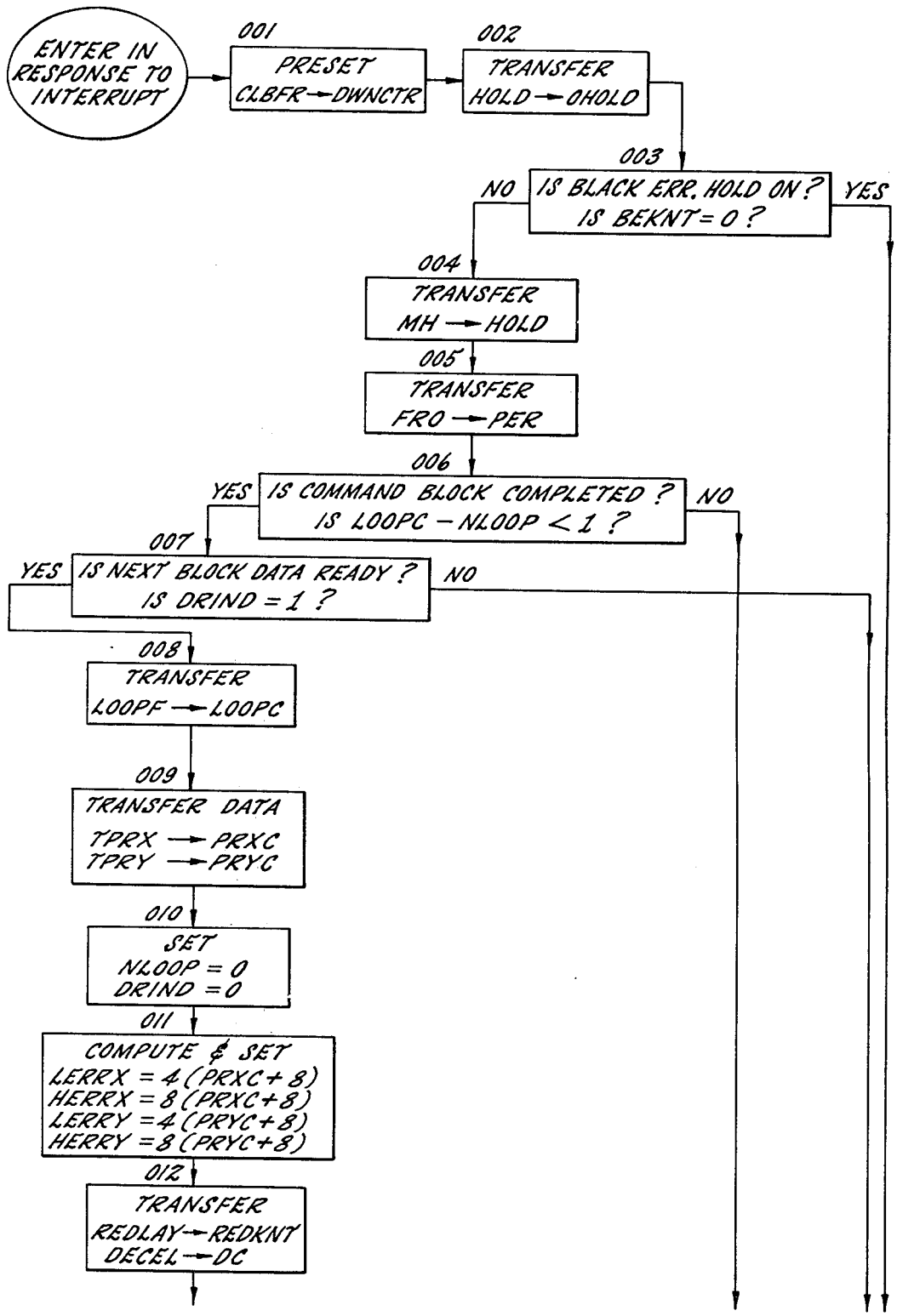
Figure 5B:
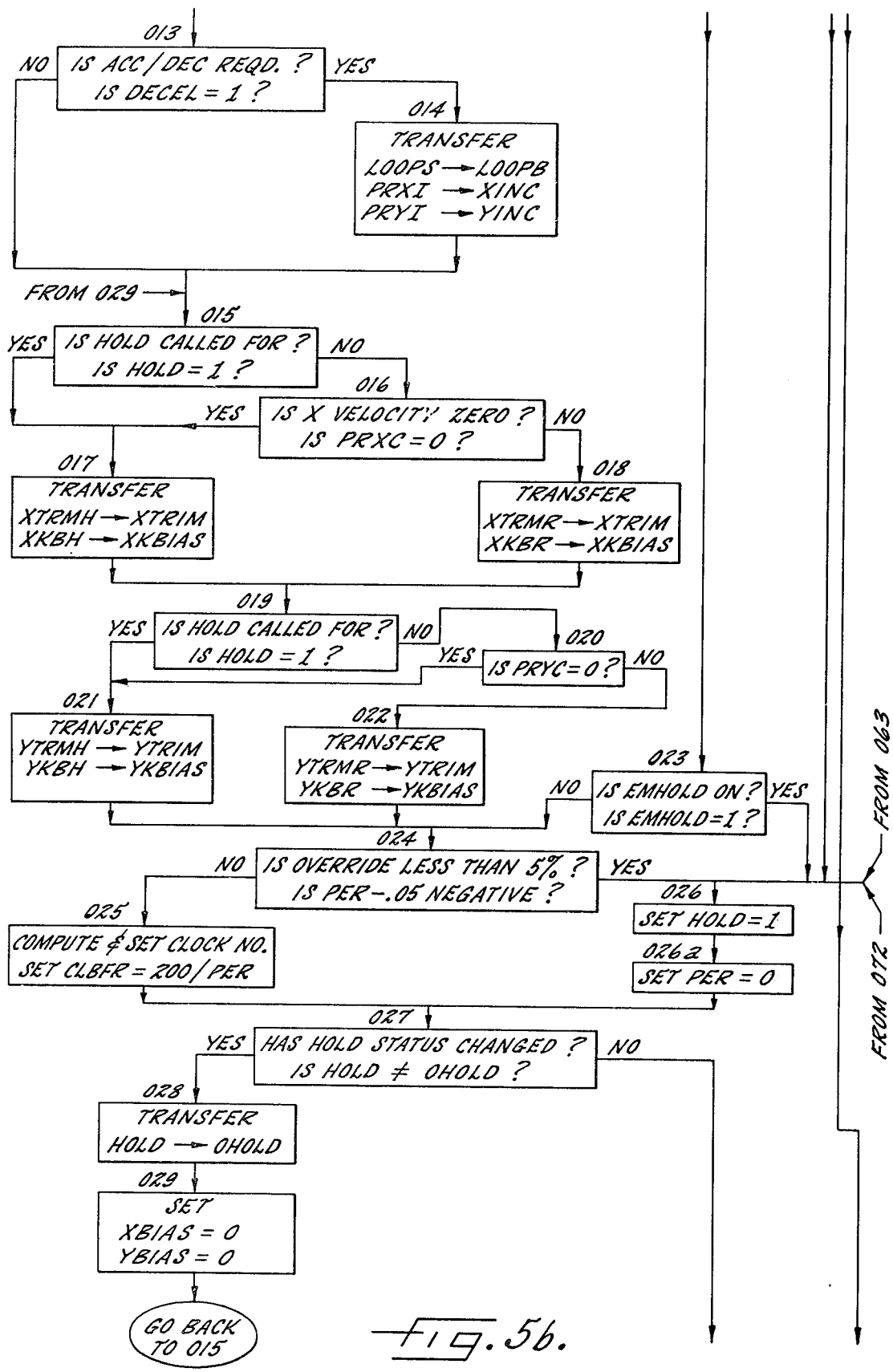
Figure 5C:
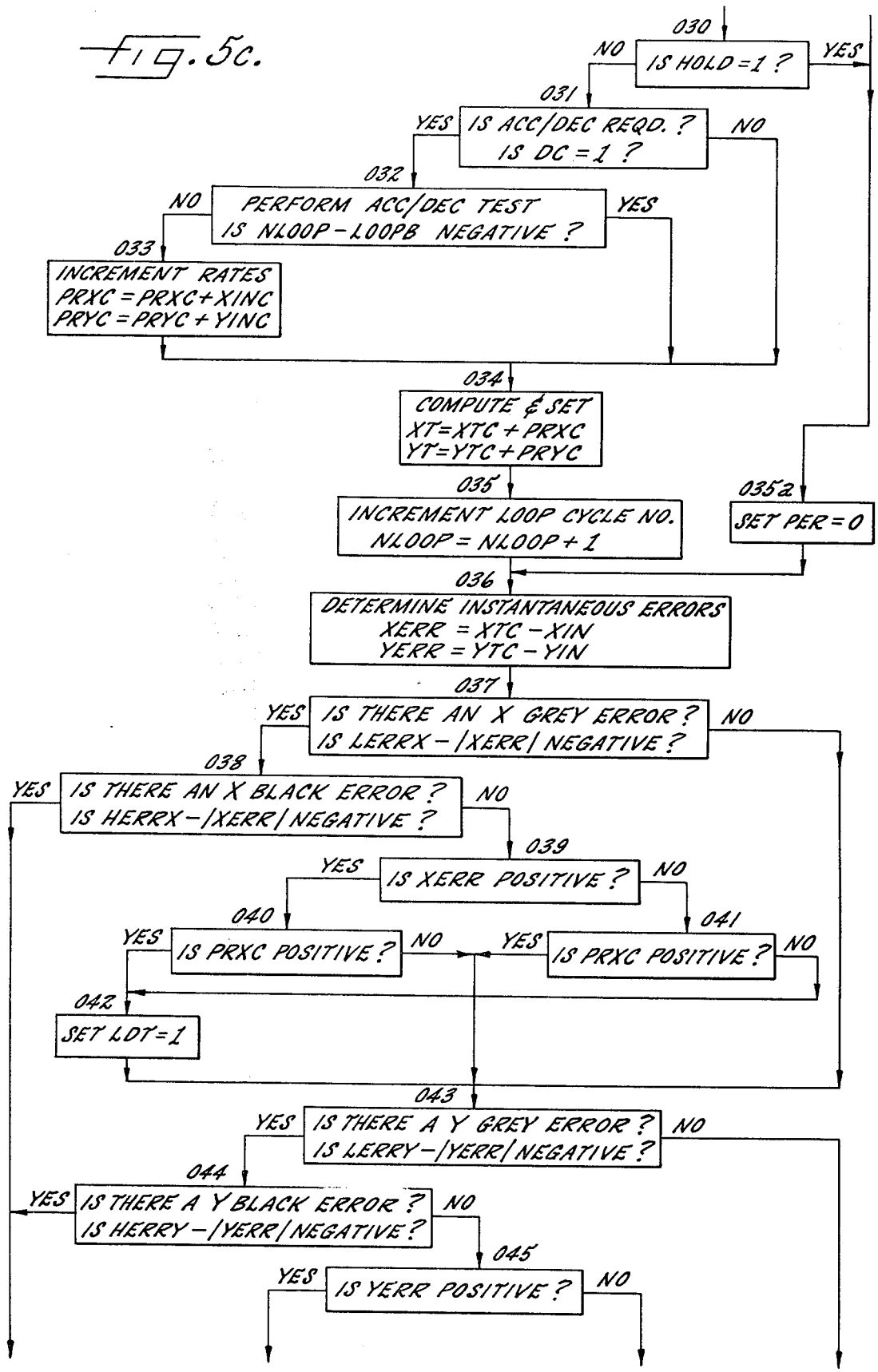

These incrementing additions and the formation of new values for XT and YT are carried out diring step 034 as shown in FIG. 5c and Table II. The numbers XT and YT are the theoretical positions which should be reached at an instant in time at the end of the period $\Delta T$ currently being measured off, whereas the numbers XTC and YTC are the theoretical positions computed during the previous iteration cycle and currently accurate while the current cycle is being measured off. Thus, at step 034 there is a dynamic updating of the theoretical positions XT and YT, and these signaled numbers will be used for the values of XTC and YTC during the next-following period $\Delta T$. XT and XTC represent the same variable number, but XT is computed during $\Delta T_i$ and used during $\Delta T_{i+1}$ to set XTC, whereas XTC is computed as XT during $\Delta T_{i-1}$ and used during $\Delta T_i$ as the current theoretical position. The same is true of YT and YTC except they apply to the Y axis.

The system next proceeds to step 035 where the number NLOOP is updated to signify that one more period $\Delta T$ has elapsed. This addition step involves taking the presently existing value of NLOOP, adding one thereto, and storing the result as the new value of NLOOP, viz.

$$NLOOP_i = NLOOP_{i-1} + 1 \tag{21a}$$

Thus, at all times the number NLOOP represents the quantity of periods $\Delta T$ which have elapsed since the execution of servo block $B_n$ began (assuming that no "holding" has occurred).

At step 036, the instantaneous values of the axis position errors are determined and numerically signaled. For this purpose, the current theoretical X axis position XTC is fed to the CPU, and the current actual position XIN is fed subtractively (from counter 40 in FIG. 2a) to the CPU so as to compute the instantaneous position error XERR once during each cycle $\Delta T$. For the two axes, the operations at step 036 are:

$$XERR_i = XTC_i - XIN_i \tag{22}$$

$$YERR_i = YTC_i - YIN_i \tag{23}$$

It will be seen, therefore, that in the practice of the present invention, means are provided to represent by digital electric signals within the computer a number XTC to designate the desired instantaneous position of a member movable along the X axis, and to add a velocity-representing number PRXC to form a new value of XTC once during each time period. From the dynamically changing instantaneous theoretical position XTC and from the dynamically signaled actual position XIN, the instantaneous position error is computed and electrically signaled by digital signals once during each time period $\Delta T$. These two repeating operations occur at steps 034 and 036 when the controlled member is being moved according to a command data block $B_n$. Corresponding operations are performed for the Y axis.

At steps 037 through 049, operations are performed in order to determine whether or not the presently-existing position error on any axis either (a) is lagging and exceeds a first threshold value or (b) exceeds a second threshold value which is greater than the first. Although it is within the purview of the invention to employ preselected constants for these threshold values, in the preferred embodiment the two threshold values are dependent upon and monotonically related to the existing axis velocities, i.e., to the values of the axis velocity numbers PRXC and PRYC as the latter are derived from the command data for block $B_n$. More specifically, and in a fashion to be explained below, when a new block of data is transferred from intermediate storage to current storage, the values of first and second error thresholds are computed from the values of the velocity numbers PRXC and PRYC and then stored as "low error" and "high error" threshold numbers. Although different monotonic functions of the velocity numbers may be used, the present system functions to compute and store signals representing the first and second X axis error thresholds LERRX and HERRX as follows:

$$LERRX = 4(PRXC + 8) \tag{24}$$

$$HERRX = 8(PRXC + 8) = 2 \, LERRX \tag{25}$$

Similarly, low and high position error thresholds for the Y axis are computed and stored in the registers LERRX and HERRX, as follows:

$$LERRY = 4(PRYC + 8) \tag{26}$$

$$HERRY = 8(PRYC + 8) = 2 \, LERRY \tag{27}$$

Referring to FIG. 6 which deals with position errors along the X axis, it will be seen that the value of the first error threshold TH1 (i.e., the number LFRRX) is represented by the line 90 and is progressively greater for increasing values of the velocity number PRXC applicable to the block $B_n$. Likewise, the second and greater error threshold TH2 represented by the stored number HERRX is represented by a line 91 which has, in the present example, a value which is alway stwice that of the first error threshold. The line 91 represents a threshold TH2 which increases as a monotonic function of the velocity number PRXC applicable to the current command data block $B_n$. Finally, there is shown in FIG. 6 a line 92 which represents a third position error threshold TH3 that takes on values which are a monotonic function of the velocity number PRXC of the currently executed block $B_n$. Again, merely as an example, the third error threshold TH3 is always twice the second error threshold, and thus its value is shown in FIG. 6 as representable by a number 2HERRX.

Merely for convenience of discussion, it may be assumed that so long as the position error along the X axis is less than threshold TH1, the error is a "white error." This signifies that the following error is negligible or so small as to be tolerable and acceptable in the operation of the machine tool and the machining of the workpiece. When the position error exceeds the first threshold but is not greater than the second threshold, it is called a "grey error" and this signifies that some corrective action should and will be taken automatically in the operation of the system to reduce the following error. Furthermore, when the following error exceeds the threshold TH2 but does not exceed the third threshold TH3, this is designated to be a "black error" which will result in unacceptable inaccuracies or possible spoilage of the workpiece. As noted below, the occurrence of a position error along any axis in the "black" range results in the system being put into a holding status until the error is reduced back to less than the second threshold TH2. Finally, whenever the following error exceeds the third threshold TH3, it is designated as a "red error," being of such magnitude and seriousness that the machine should be shut down until the cause has been found and corrected by the machine operator.

FIG. 7 illustrates the relationships of the white, grey, black and red error ranges, and the thresholds which separate them, for a given value of the velocity number PRXC. From this, it will be readily understood that when the error number ERRX or ERRY exceeds the value LERRX or LERRY, there is a grey error condition in the X or Y axis. If the error number ERRX or ERRY exceeds the second threshold HERRX or HERRY, there is a black error condition in the X or Y axis; and similarly, a red error condition exists in the X or Y axis when the number ERRX or ERRY exceeds the value of 2HERRX or 2HERRY.

Returning again to FIG. 5c and Table II, the operations performed at steps 037 through 042 determine whether or not the instantaneous X axis error XERR (a) exceeds the grey error threshold, or (b) exceeds both the grey and black error thresholds. In addition, if the grey error threshold only is exceeded, a determination is made as to whether the position error is lagging or leading, and only in the lagging case is the indicator signal LDT set to 1. These operations will be discussed more fully below, and it is assumed in the present description of a normal cycle that the determination made at step 037 indicates that the X axis following error is less than the first threshold LERRY, so that the system skips to step 043.

Steps 043 through 048 are identical to 037 through 042, except that the former relate to the determination of whether the existing Y axis position error exceeds the first threshold or the second threshold. Assuming for a normal cycle that neither such error threshold is exceeded, the system skips from step 043 to step 049. Thus, it is here assumed that the LDT indicator remains at zero as the system enters step 049.

Figure 5D:
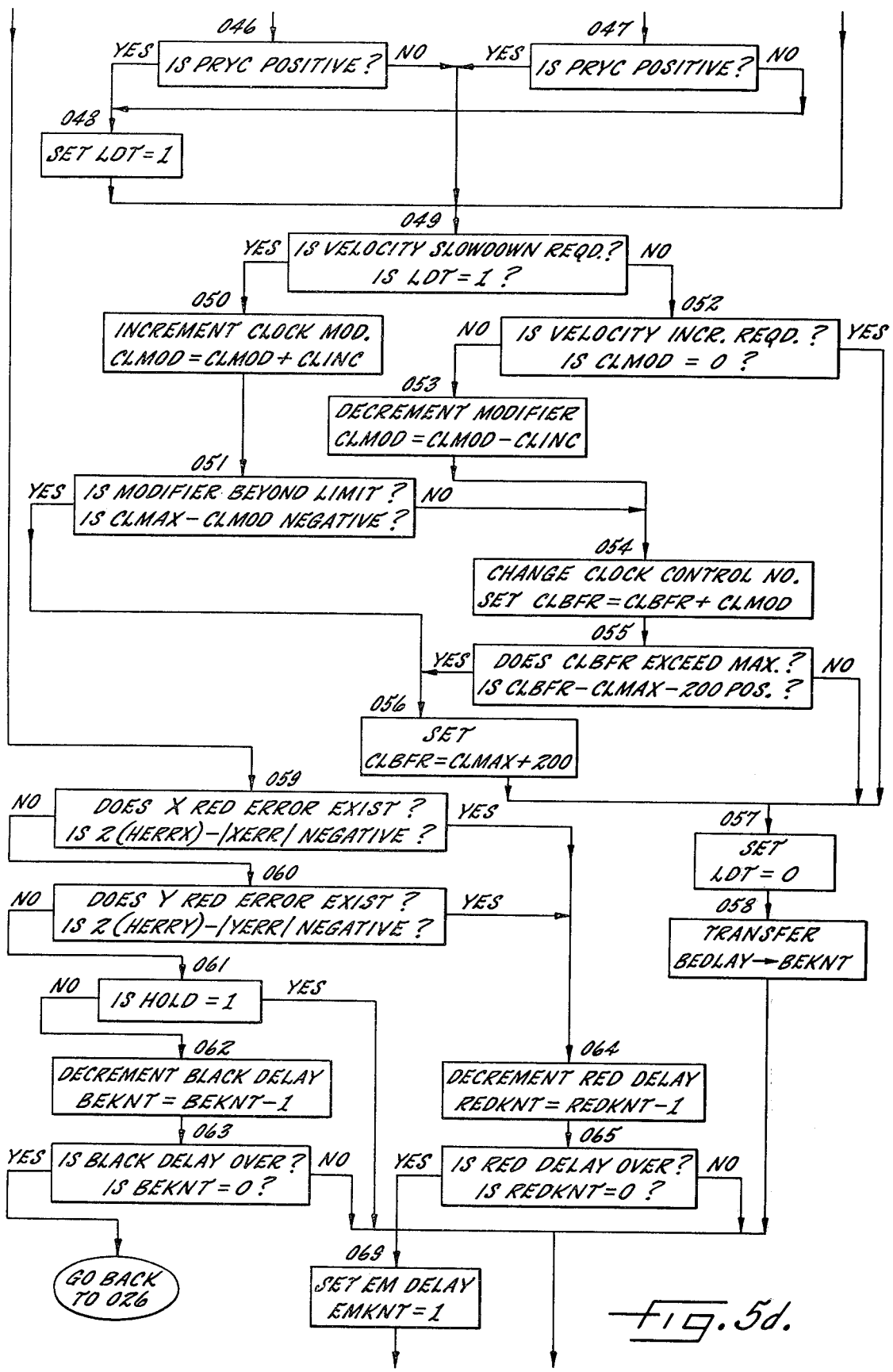

Those steps designated in FIG. 5d and Table II as 049 through 057 relate to changing of the clock buffer number CLBFR so that when the next iteration period begins the durations of the subsequent periods ΔT will be increased or decreased from that of the present iteration period. Because in a "normal" cycle the clock number CLBFR is not to be changed, at step 049 the value of the single bit signal LDT is sensed and found to be zero so that the system skips to step 052 where it senses the value of a clock modifier number CLMOD. Assuming that the modifier number is found to be zero at step 052, then the system skips to step 057 where the value of zero is transferred into the one-bit indicator LDT (in this instance, leaving the latter unchanged). Therefore, in a normal cycle of operation no modification of the clock buffer number CLBFR occurs.

At step 058, a preselected constant BEDLAY (e.g., 75) is transferred from its storage register to the "black error count" register BEKNT. This operation is insignificant in a normal cycle, but it confirms that under normal circumstances the number BEKNT has some preselected value, such as 75, and therefore is not zero. It will be recalled that this results in the progression from step 003 to 004 as shown in FIG. 5a.

From step 058, the system skips to step 066 (FIG. 5e) during which the determination is made as to whether the EMHOLD signal is on. In a normal cycle the EMHOLD signal will be zero, and the system therefore proceeds to step 067 where it determines whether or not the STOP signal is on. In a normal cycle, STOP will be zero, and thus the system will skip to step 080.

In accordance with one feature of the present invention, the energizing voltages $E_x$ and $E_y$ applied as inputs to the velocity servo systems 21 and 31 (FIG. 2a) are formed as the summation of three terms multiplied by a gain constant. Taking the X axis as an example, the energizing voltage $E_x$ is produced by a digital-to-analog converter 95 (the corresponding Y axis converter being 96) which receives digital, multi-bit electrical signals numerically representing a changeable speed number XDAC signaled on the output lines of a storage register XDAC. The number XDAC is recomputed during each iteration cycle and includes a first term $G_1$ . PRXC proportional to the then-existing value of the velocity number, plus a second term which is increased or decreased during those periods when the X axis position error exceeds or is less than a preselected value. This term is designated as a number XBIAS, and the incrementing of that term makes it generally represent the time integral of errors which have existed during several or many preceding periods ΔT. Therefore, the X axis speed command number XDAC, which is formed primarily from the velocity number PRXC, is gradually adjusted with time so as to make the actual velocity along the X axis keep the controlled member running with substantially zero following error.

are alike or unlike, i.e., if their difference is zero or ±1. If alike, this indicates that there has been no change in the status of the HOLD signal from the previous cycle to the present cycle, and if unlike the opposite is indicated. In the present "normal" cycle the operations at step 027 will produce a "no" answer because HOLD and OHOLD are both O, so the system skips to step 030.

At step 030, the HOLD signal is sensed. In a normal cycle such signal is zero. The system proceeds to step 031 where it is determined whether or not the block $B_n$ is one which requires acceleration or deceleration at its terminal portion (see FIG. 8). Assuming that the signal DC is 1, the system proceeds to step 032 where a determination is made as to whether or not that point in time and travel has been reached at which the velocity should begin changing along a slope, such as the slop represented by line 82 in FIG. 8. The operation at step 032 determines whether the quantity NLOOP-LOOPB is negative, a no response indicating that deceleration or acceleration should begin, and a yes response indicating that it should not yet begin because the progress of the block is somewhere along the horizontal line labeled PRXC in FIG. 8. Thus, in a normal cycle the system skips from step 032 to step 034.

It will be recalled that the signaled numbers XT and YT represent the dynamically changeable values of the instantaneous theoretical axis positions. If movement along the X and Y axes is supposed to occur at a rate or velocity of PRXC and PYRC per period $\Delta T$, then the theoretical positions along the X and Y axes progressively change by the incremental distances of PRXC and PYRC per $\Delta T$. In order to dynamically change the numerically signaled theoretical positions XT and YT, the digital computer increments those number-representing signals during each cycle such that:

$$XT_i = XTC_{i-1} + PRXC \tag{20}$$

$$YT_i = YTC_{i-1} + PRYC \tag{21}$$

These incrementing additions and the formation of new values for XT and YT are carried out diring step 034 as shown in FIG. 5c and Table II. The numbers XT and YT are the theoretical positions which should be reached at an instant in time at the end of the period $\Delta T$ currently being measured off, whereas the numbers XTC and YTC are the theoretical positions computed during the previous iteration cycle and currently accurate while the current cycle is being measured off. Thus, at step 034 there is a dynamic updating of the theoretical positions XT and YT, and these signaled numbers will be used for the values of XTC and YTC during the next-following period $\Delta T$. XT and XTC represent the same variable number, but XT is computed during $\Delta T_i$ and used during $\Delta T_{i+1}$ to set XTC, whereas XTC is computed as XT during $\Delta T_{i-1}$ and used during $\Delta T_i$ as the current theoretical position. The same is true of YT and YTC except they apply to the Y axis.

The system next proceeds to step 035 where the number NLOOP is updated to signify that one more period $\Delta T$ has elapsed. This addition step involves taking the presently existing value of NLOOP, adding one thereto, and storing the result as the new value of NLOOP, viz.

$$NLOOP_i = NLOOP_{i-1} + 1 \tag{21a}$$

Thus, at all times the number NLOOP represents the quantity of periods $\Delta T$ which have elapsed since the execution of servo block $B_n$ began (assuming that no "holding" has occurred).

At step 036, the instantaneous values of the axis position errors are determined and numerically signaled. For this purpose, the current theoretical X axis position XTC is fed to the CPU, and the current actual position XIN is fed subtractively (from counter 40 in FIG. 2a) to the CPU so as to compute the instantaneous position error XERR once during each cycle $\Delta T$. For the two axes, the operations at step 036 are:

$$XERR_i = XTC_i - XIN_i \tag{22}$$

$$YERR_i = YTC_i - YIN_i \tag{23}$$

It will be seen, therefore, that in the practice of the present invention, means are provided to represent by digital electric signals within the computer a number XTC to designate the desired instantaneous position of a member movable along the X axis, and to add a velocity-representing number PRXC to form a new value of XTC once during each time period. From the dynamically changing instantaneous theoretical position XTC and from the dynamically signaled actual position XIN, the instantaneous position error is computed and electrically signaled by digital signals once during each time period $\Delta T$. These two repeating operations occur at steps 034 and 036 when the controlled member is being moved according to a command data block $B_n$. Corresponding operations are performed for the Y axis.

At steps 037 through 049, operations are performed in order to determine whether or not the presently-existing position error on any axis either (a) is lagging and exceeds a first threshold value or (b) exceeds a second threshold value which is greater than the first. Although it is within the purview of the invention to employ preselected constants for these threshold values, in the preferred embodiment the two threshold values are dependent upon and monotonically related to the existing axis velocities, i.e., to the values of the axis velocity numbers PRXC and PRYC as the latter are derived from the command data for block $B_n$. More specifically, and in a fashion to be explained below, when a new block of data is transferred from intermediate storage to current storage, the values of first and second error thresholds are computed from the values of the velocity numbers PRXC and PRYC and then stored as "low error" and "high error" threshold numbers. Although different monotonic functions of the velocity numbers may be used, the present system functions to compute and store signals representing the first and second X axis error thresholds LERRX and HERRX as follows:

$$LERRX = 4(PRXC + 8) \tag{24}$$

$$HERRX = 8(PRXC + 8) = 2 \text{ LERRX} \tag{25}$$

Similarly, low and high position error thresholds for the Y axis are computed and stored in the registers LERRX and HERRX, as follows:

$$LERRY = 4(PRYC + 8) \tag{26}$$

$$HERRY = 8(PRYC + 8) = 2 \text{ LERRY} \tag{27}$$

Referring to FIG. 6 which deals with position errors along the X axis, it will be seen that the value of the first error threshold TH1 (i.e., the number LFRRX) is represented by the line 90 and is progressively greater for increasing values of the velocity number PRXC applicable to the block $B_n$. Likewise, the second and greater error threshold TH2 represented by the stored number HERRX is represented by a line 91 which has, in the present example, a value which is alwaystwice that of the first error threshold. The line 91 represents a threshold TH2 which increases as a monotonic function of the velocity number PRXC applicable to the current command data block $B_n$. Finally, there is shown in FIG. 6 a line 92 which represents a third position error threshold TH3 that takes on values which are a monotonic function of the velocity number PRXC of the currently executed block $B_n$. Again, merely as an example, the third error threshold TH3 is always twice the second error threshold, and thus its value is shown in FIG. 6 as representable by a number 2HERRX.

Merely for convenience of discussion, it may be assumed that so long as the position error along the X axis is less than threshold TH1, the error is a "white error." This signifies that the following error is negligible or so small as to be tolerable and acceptable in the operation of the machine tool and the machining of the workpiece. When the position error exceeds the first threshold but is not greater than the second threshold, it is called a "grey error" and this signifies that some corrective action should and will be taken automatically in the operation of the system to reduce the following error. Furthermore, when the following error exceeds the threshold TH2 but does not exceed the third threshold TH3, this is designated to be a "black error" which will result in unacceptable inaccuracies or possible spoilage of the workpiece. As noted below, the occurrence of a position error along any axis in the "black" range results in the system being put into a holding status until the error is reduced back to less than the second threshold TH2. Finally, whenever the following error exceeds the third threshold TH3, it is designated as a "red error," being of such magnitude and seriousness that the machine should be shut down until the cause has been found and corrected by the machine operator.

FIG. 7 illustrates the relationships of the white, grey, black and red error ranges, and the thresholds which separate them, for a given value of the velocity number PRXC. From this, it will be readily understood that when the error number ERRX or ERRY exceeds the value LERRX or LERRY, there is a grey error condition in the X or Y axis. If the error number ERRX or ERRY exceeds the second threshold HERRX or HERRY, there is a black error condition in the X or Y axis; and similarly, a red error condition exists in the X or Y axis when the number ERRX or ERRY exceeds the value of 2HERRX or 2HERRY.

Returning again to FIG. 5c and Table II, the operations performed at steps 037 through 042 determine whether or not the instantaneous X axis error XERR (a) exceeds the grey error threshold, or (b) exceeds both the grey and black error thresholds. In addition, if the grey error threshold only is exceeded, a determination is made as to whether the position error is lagging or leading, and only in the lagging case is the indicator signal LDT set to 1. These operations will be discussed more fully below, and it is assumed in the present description of a normal cycle that the determination made at step 037 indicates that the X axis following error is less than the first threshold LERRY, so that the system skips to step 043.

Steps 043 through 048 are identical to 037 through 042, except that the former relate to the determination of whether the existing Y axis position error exceeds the first threshold or the second threshold. Assuming for a normal cycle that neither such error threshold is exceeded, the system skips from step 043 to step 049. Thus, it is here assumed that the LDT indicator remains at zero as the system enters step 049.

Those steps designated in FIG. 5d and Table II as 049 through 057 relate to changing of the clock buffer number CLBFR so that when the next iteration period begins the durations of the subsequent periods ΔT will be increased or decreased from that of the present iteration period. Because in a "normal" cycle the clock number CLBFR is not to be changed, at step 049 the value of the single bit signal LDT is sensed and found to be zero so that the system skips to step 052 where it senses the value of a clock modifier number CLMOD. Assuming that the modifier number is found to be zero at step 052, then the system skips to step 057 where the value of zero is transferred into the one-bit indicator LDT (in this instance, leaving the latter unchanged). Therefore, in a normal cycle of operation no modification of the clock buffer number CLBFR occurs.

At step 058, a preselected constant BEDLAY (e.g., 75) is transferred from its storage register to the "black error count" register BEKNT. This operation is insignificant in a normal cycle, but it confirms that under normal circumstances the number BEKNT has some preselected value, such as 75, and therefore is not zero. It will be recalled that this results in the progression from step 003 to 004 as shown in FIG. 5a.

From step 058, the system skips to step 066 (FIG. 5e) during which the determination is made as to whether the EMHOLD signal is on. In a normal cycle the EMHOLD signal will be zero, and the system therefore proceeds to step 067 where it determines whether or not the STOP signal is on. In a normal cycle, STOP will be zero, and thus the system will skip to step 080.

In accordance with one feature of the present invention, the energizing voltages $E_x$ and $E_y$ applied as inputs to the velocity servo systems 21 and 31 (FIG. 2a) are formed as the summation of three terms multiplied by a gain constant. Taking the X axis as an example, the energizing voltage $E_x$ is produced by a digital-to-analog converter 95 (the corresponding Y axis converter being 96) which receives digital, multi-bit electrical signals numerically representing a changeable speed number XDAC signaled on the output lines of a storage register XDAC. The number XDAC is recomputed during each iteration cycle and includes a first term $G_1$ . PRXC proportional to the then-existing value of the velocity number, plus a second term which is increased or decreased during those periods when the X axis position error exceeds or is less than a preselected value. This term is designated as a number XBIAS, and the incrementing of that term makes it generally represent the time integral of errors which have existed during several or many preceding periods ΔT. Therefore, the X axis speed command number XDAC, which is formed primarily from the velocity number PRXC, is gradually adjusted with time so as to make the actual velocity along the X axis keep the controlled member running with substantially zero following error.

More specifically, in the present exemplary embodiment, at step 080 (FIG. 5e) a determination is made as to whether the existing X axis error XERR exceeds a predetermined value, here selected by way of example to be zero. That is, the number XERR is read from its storage register into the cleared accumulator of the CPU and if the answer ANS is then zero, the system skips to step 082. On the other hand, if the answer is not zero, the system proceeds to step 081 at which the existing historical term XBIAS is incremented by a predetermined amount XKBIAS. Thus, if the existing X axis error is not zero, the new value of XBIAS becomes:

$$XBIAS_i = XBIAS_{i-1} \pm XKBIAS \qquad (28)$$

The incrementing constant is stored as a changeable number XKBIAS, and it is used at step 081 and in Equation (28) with the same sign as that existing for the error number XERR. Therefore, the historical term XBIAS is increased or decreased by a predetermined small amount XKBIAS during any iteration cycle when the X axis following error is not zero but is respectively positive or negative.

Proceeding next to step 082 (FIG. 5e and Table II) the system next computes and updates to a new value the signals which represent the speed command number XDAC for the servo system 21. The number XDAC is formed according to the relation:

$$XDAC = XGAIN\,[PER.\,PRXC + XTRIM.\,XERR + XBIAS] \qquad (29)$$

The actual computer operations to create a new value of XDAC may involve several sub-steps within the computer, but they have been shown here in the interest of simplicity as involving only the single step 082. Those skilled in the art will readily know how to modify the computer to make it perform the single step 082 by a plurality of steps involving successive multiplications and additions in plural steps, if that is required.

It will be seen that the number XDAC contains three terms. The first is the product of the feed rate override number PER and the velocity number PRXC. The number PER may be viewed as an individual gain factor $G_1$ on the velocity command PRXC, thereby bringing into effect the dialed-in feed rate override percentage. The term PER . PRXC is the primary component which forms the number XDAC, and if the servo system 21 is adjusted and operating entirely correctly, then the analog counterpart $E_x$ of XDAC will be a dc. voltage which precisely makes the controlled member 11 move with the programmed X axis velocity as PRXC modified by the existing feed rate override number PER.

However, it may happen that for unforeseen reasons (e.g., changeable loads exerted by the cutter contacting the workpiece) the X axis velocity permits a perceptible position error to arise. To "trim" and adjust the X servo system so that the voltage $E_x$ is increased or decreased to eliminate a lagging or leading following error, the term XTRIM . XERR is included in Equation (29) and used during step 082. The number XTRIM may be viewed as an individual gain factor $G_2$ for the instantaneously signaled position error XERR, and their product will become a positive or negative number in the XDAC equation whenever the error is other than zero. As the following error XERR increases either positively or negatively, the number XDAC is increased or decreased relative to the value it would have solely from the term PER . PAXC, and this the analog counterpart $E_x$ is increased or decreased so that the X velocity of the controlled member 11 is increased or decreased to reduce the error XERR.

If the error XERR is fully reducedd to zero, however, the term XTRIM . XERR ceases to contribute to the value of the number XDAC, and in order to provide a permanent adjustment to reach and maintain zero position error, the term XBIAS is included within the summation of Equation (29) and the operations performed at step 082. If a following error does arise and the term XTRIM . XERR results in an increase of XDAC to speed up the X velocity higher than the PER . PRXC value, the number would be restored toward zero, but the number XBIAS will incrementally increase in magnitude with successive $\Delta T$'s so that when the term XTRIM . XERR is zero the summation of PER . PRXC and XBIAS makes the value of XDAC and the analog voltage $E_x$ drive the controlled member 11 at an X axis velocity which results in substantially zero following error.

It will be recognized that the number XGAIN is simply a gain factor or proportionally applied to the three-term summation of Equation (29) by step 082, this overall gain factor being chosen as a constant according to the characteristics of the particular servo system 21 which is being controlled by the number XDAC as a result of receiving the latter's analog countepart $E_x$ as its input voltage. It will be recalled that during each iteration cycle the numbers PER, PRXC, XERR and XBIAS may all individually change, and that the speed number XDAC is recomputed and updated to a new value during each iteration or cycle $\Delta T$. Therefore, the speed number XDAC is dynamically adjusted automatically in order to keep or restore the X velocity of the controlled member at or to a value which will make the following error essentially zero.

Figure 5E:
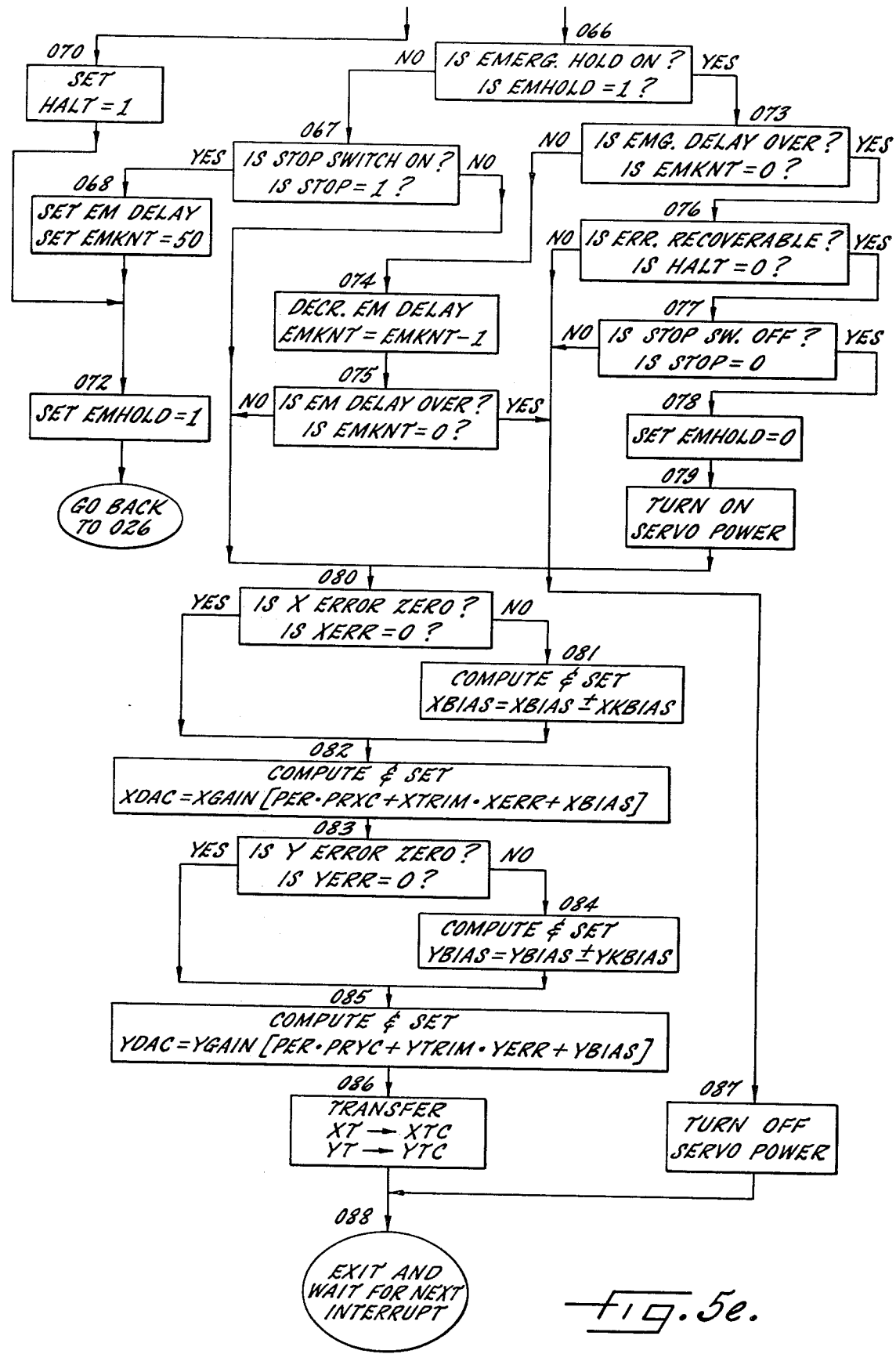

Steps 083, 084 and 085 as shown in FIG. 5e and Table II are identical to steps 080, 081, 082, except that the former apply to the Y axis. Thus, it may here simply be noted that the operation performed at step 084 conforms to the updating equation:

$$YBIAS_i = YBIAS_{i-1} \pm YKBIAS \qquad (30)$$

and the computations performed at step 085 are carried out according to:

$$YDAC = YGAIN[PER.\,PYRC + YTRIM.\,YERR + YBIAS] \qquad (31)$$

Therefore, by the time the system has progressed through step 085 in a normal cycle, both of the speed numbers XDAC and YDAC have been recomputed and updated, and the analog input voltages $E_x$ $E_y$ for the servos 21 and 31 have been adjusted in value, to make the X and Y axis velocities have the coordinated values which are required to move the controlled element 11 along the path segment $D_n$ and at the path velocity designated by the number $FRN_n$ in the command data block $B_n$.

Pausing at this point for summary and review, it may be noted that the present system includes means for measuring off successive periods $\Delta T$ in actual time, each period enduring between two successive interrupt pulses on line 55a in FIG. 2b as produced by the down counter 56, the osc. 58, the zero decoder 55 and the computer circuits for presetting the number CLBFR into the counter immediately after each new period begins. The number CLBFR normally will have a value of 200 (if the feed rate override number is 100 percent) and the normal duration ΔTN of such periods will be, for example, 2 milliseconds.

There are also provided means to derive from command data signals digitally representing velocity numbers PRXC and PRYC expressing the necessary axis velocities $V_x$ and $V_y$ in units of distance per ΔTN. These signals form the principal component or term from which the speed numbers XDAC and YDAC are created at steps 082 and 084 during each period ΔT, and are modified by the override number PER used as a gain factor in the term PER . PRXC or PER . PRYC.

In addition, however, there are here employed means for creating and progressively changing during each period ΔT numbers XTC and YTC which represent the dynamically moving theoretical positions at which the controlled member shoud reside from period to period — such numbers being updated by the PRXC and PRYC amounts during each iteration. Taking also the instantaneous actual position number signals XIN and YIN, means compute and signal during each period ΔT the then existing but changeable position errors XERR and YERR.

Means are also provided to signal historical adjustment numbers XBIAS and YBIAS, together with means responsive to the corresponding axis error XERR or YERR for incrementally changing those numbers by predetermined amounts XKBIAS or YKBIAS during any period ΔT that the axis error exceeds some predetermined value (in the present example, zero). The adjustment numbers XBIAS and YBIAS are added to the PER . PRXC and PER . PRYC terms to form the numbers XDAC and YDAC and the latters' analog counterparts $E_x$ and $E_y$. In this way, as long-term errors arise, they are removed to restore the existing position errors to zero even though a speed number XDAC or YDAC greater than XGAIN . PER . PRXC or YGAIN . PER . YDAC is required to produce the actual velocities which result in zero following errors. Also preferably employed are means to create and signal short-term adjustment numbers XTRIM . XERR and YTRIM . YERR, together with means to include the latter in the operation of the summing means for carrying out the steps designated at 082 and 085. As position errors arise, these latter terms produce adjustments in XDAC and YDAC, and thus in $E_x$ and $E_y$ which tend to restore the errors quickly to zero.

All of these means, and the operations which they produce, act during the successive short intervals ΔT, and thus remain dynamically up-to-date and accurate.

Reverting to FIG. 5e, at step 086, the present values of the theoretical position numbers XT and YT are simply transferred into the "current" registers where they become the new values of numbers XTC and YTC. These new values are thus ready for use during step 036 of the following cycle, having been computed by the incrementing operations performed at step 034 of the present cycle.

At step 088, the servo routine is completed and the program unit 62 may divert the computer to computations involving other operations until the next interrupt pulse appears and the next period ΔT begins. The entire single "normal" cycle which has here been described may involve only a total of some 200 microseconds, and thus when the system exits from the servo routine at step 088 there remains well over 1.5 milliseconds before the next interrupt pulse will appear, assuming that the interrupt pulses are now spaced apart by the durations of 2 milliseconds because the clock buffer number CLBFR has a value of 200. In any event, when the servo routine has completed one cycle at step 088, there remains in terms of computer time a rather large interval before the next interrupt pulse will appear. When that next interrupt pulse arrives, however, the servo routine will be reinitiated beginning with step 001 (FIG. 5a) and the operations described above will again be repeated if conditions are such that the next cycle is "normal". The cycles will iterate normally 500 times per second if ΔT is 2 milliseconds.

B. A CYCLE FINDING A GREY ERROR AND SLOWING DOWN THE SYSTEM

In accordance with one aspect of the invention, means are provided and steps are carried out to incrementally increase the durations of the succeeding period ΔT in response to the position error along any axis lagging and exceeding the first predetermined threshold value. This will become apparent from the following description of a cycle in which a grey position error is found for at least one axis.

In response to an interrupt pulse, the cycle begins at step 001 and progresses as the above-described normal cycle down to step 037 (FIG. 5c and Table II). At this point, if the subtraction LERRX -|XERR| produces a negative answer, it is known that the X axis position error exceeds the threshold value of LERRX, and the program unit causes the system to proceed to step 038 (rather than skipping to step 043). At step 038, a similar comparison of HERRX and XERR will produce a positive answer, so the system goes on to step 0039 having found that a grey error exists along the X axis because the dynamically signaled error number XERR exceeds in magnitude the threshold LERRX.

Steps 039, 040 and 041 are performed in order to determine whether or not this grey X axis error is lagging or leading. In a four quadrant axis system, and depending upon the direction in which the controlled member is displaced from the theoretical position, the position error may be either positive or negative in any quadrant. On the other hand, while residing in any of the four quadrants, the controlled member may be driven in either a positive or negative direction along either the X or Y axis. It is only when the member is lagging behind the theoretical instantaneous position that corrective action in response to a grey error is desired. A moment's reflection will confirm if the sign of the X position error XERR is the same as the sign of the X axis velocity position number, then the error is in a lagging rather than a leading sense. On the other hand, if those signs are unlike, the error is a leading error. Accordingly, at step 039, a determination is made as to whether the sign of XERR is positive or negative. If positive, the system proceeds to step 040; and if negative, the system skips to step 041. In both such steps a determination is made as to whether the velocity number PRXC is positive. In step 040 if the sign of PRXC is found positive, then both XERR and PRXC are positive, and the system skips to step 042 where the indicator signal LDT is set to a value of one. Alternatively, if the system has skipped from step 039 to step 041 (indicating that XERR is negative), and if it finds at step 041 that PRXC is negative, the signs of the two numbers are alike, and the system proceeds to step 042 so that the signal LDT is also set to a one. Thus, if a lagging grey error is detected, the LDT signal becomes a one. On the other hand, if step 040 is performed and finds that PRXC is negative (after XERR has been found positive), the signs are unlike and the system skips to step 043, leaving LDT at its original value of zero. Similarly, if the system goes from step 039 to step 041 and finds PRXC positive, the signs of PRXC and XERR are unlike, and the system skips to step 043. In the case of unlike signs, LDT remains 0.

The steps 043 through 048 are identical to the steps 037 through 042, except that the former apply to the Y axis and utilize the numbers LERRY and YERR. Thus, when steps 043 through 048 are carried out, the system will skip to step 049 if no Y axis lagging grey error is found; but the system will arrive at step 049 having set LDT to one step 048 if a lagging Y axis grey error is found. In summary, therefore, as the system progresses from step 037 to step 049, finds no black error for the X or Y axis at steps 038 and 044, and finds a lagging grey error on either the X or Y axis, then the system will arrive at the beginning of step 049 with the signal LDT having a value of one.

In keeping with one feature of the system, corrective action occurs to lengthen the ΔT time periods whenever the signal LDT appears as a one during any iteration cycle, unless the periods have already been lengthened to a predetermined maximum value. Thus, at step 049 the signal LDT is sensed and in the present example it will be found to be 1, so that the system proceeds to step 050. Operationally, a clock modifier number CLMOD is called from its storage register, a predetermined incrementing constant CLINC is called from its storage and added, and the new sum is stored in the CLMOD register. This operation is thus representable by the following equation which is implemented when a grey lagging error is found on either axis:

$$CLMOD_i = CLMOD_{i-1} + CLINC \qquad (32)$$

If it is assumed that the constant CLINC is chosen, for example, to be 1.0, then Equation (32) becomes:

$$CLMOD_i = CLMOD_{i-1} + 1 \qquad (33)$$

From this it will be seen that so long as a lagging grey error exists on either axis the number CLMOD (which initially starts at zero) is increased by one during each of the successive cycles which transpire. Thus over a period of two hundred successive ΔT's, the number CLMOD might progressively increase from zero to two hundred.

After incrementing CLMOD at step 050, the system proceeds to step 051 to determine whether or not the number CLMOD has been increased up to a predetermined maximum limit value. This limit value (for example 3800) is stored as a constant CLMAX, and during step 051 CLMOD is subtracted from CLMAX. If the resulting answer is negative, it is known that CLMOD has reached its upper limit value, so the system skips to step 056. On the other hand, if the result is positive, the system skips to step 054. It is at this point during the cycle that the presently existing value of the clock buffer number CLBFR is changed. More specifically, CLBFR is called from its register, the then-existing value of CLMOD is added to it, and the sum is restored in the register CLBFR as a new value. Thus, merely as an example, if at the beginning of the present cycle being described CLMOD had a value of zero and CLBFR had a value of two hundred, CLMOD would be increased to one at step 050, and CLBFR would be increased to 201 at step 054. Such incrementing is representable by the equations:

$$CLBFR_i = CLBFR_{i(025)} + CLMOD_i = \left(\frac{200}{PER}\right)_i + CLMOD_{i-1} + CLINC \qquad (34)$$

Proceeding from step 054 to 055, a determination is made as to whether or not CLBFR has reached a predetermined permissible upper limit (here chosen for example as 4000). Thus the sum CLBFR - CLMAX - 200 is computed in the CPU and if the answer is positive, it is known that CLBFR has just been set to a value higher than the arbitrary limit of 4000. In this case the system proceeds to step 056; otherwise, it skips to step 057.

As shown by step 056 in FIG. 5d and Table II the number CLBFR is set to the predetermined maximum value which is equal to the sum CLMAX + 200 as a consequence of steps 051 or 055 finding that either CLMOD or CLBFR has reached the upper permissible limit. Thus, in the present example here given, CLBFR will be set to 4000, and the next succeeding period ΔT (after the down counter 56 has been preset to the number 4000) will have the maximum duration of 40 milliseconds.

Thus, after incrementally increasing CLBFR or setting it to its maximum permissible value, the system executes step 057 to restore LDT to zero, thus assuring that each iteration cycle is always entered with LDT at zero. From that point on, the subsequent steps (ending at 088) are executed in exactly the same fashion previously described for a normal cycle. When the next cycle is begun, the down counter 55 is preset during step 001 to the value $CLBFR_{i-1}$, i.e., to a lower value than during the preceding step.

As here described (treating for the moment the X axis and ignoring the XBIAS term and its effect), there are means for creating a changeable speed number XDAC, and converting it to analog form $E_x$, which changes according to the expression XGAIN [PER . PRXC + XTRIM . XERR], as signals numerically representing those five last-designated numbers change. The error number XERR is recomputed and signaled as a new value once during each successive period ΔT such that $XERR_i$ is equal to $XTC_{i-1} + PRXC_i - XIN_i$. Means respond to the XERR signal and a signaled threshold LERRX such that when the former exceeds the latter and is lagging in any period ΔT, the subsequent durations of the periods ΔT are increased. This results in PER . PRXC remaining the same but a slowing in the rate of change of the theoretical position $XTC_{i-1} + PRXC_i$, so that the velocity servo means responsive to the analog signal $E_x$ can drive the controlled member to catch up and reduce the position error.

The advantages of the incremental increasing of CLBFR during any cycle when a lagging grey error is found on either axis are quite significant. It will be recalled that during each of the successively measured off time periods ΔT the theoretical position XTC is incrementally changed by the amount of the then-existing velocity number (PRXC, PRYC, as applicable).

Thus, the theoretical position progresses from one point to the next at a rate of PRXC per ΔT or PRYC per ΔT along the X or Y axis, respectively. If the controlled member is lagging the theoretical position by more than the first error threshold (LERRX or LERRY), the progressive increase in the number CLBFR results in the progressive lengthening of the periods ΔTN from their normal durations of two milliseconds up to as much as 40 milliseconds. Therefore, the rate of advance of the theoretical position number XTC or YTC is reduced, and when the instantaneous error numbers XERR and YERR are computed during step 036 of each cycle, it will be found that the position errors have been lessened because the rate of advance of the theoretical position XTC or YTC has been slowed. In consequence, the term XTRIM.XERR in the equation employed at step 82 (or the corresponding Y axis equation employed at step 085) will become smaller but the velocity number PRXC (or the counterpart Y axis number PRYC) will remain unchanged. Therefore, more time is available for the X and Y axis motions of the controlled member to "keep up" with the theoretically desired advancing positions, and the X and Y axis servo systems 21 and 31 continue to receive analog input signals $E_x$ and $E_y$ which are based principally upon the term PER . PRXC or the term PER . PRYC. In net effect, because a grey error causes a lengthening of the successive periods ΔT which are measured off, the commanded velocity (in rate of change of theoretical position) is reduced for all axes from that which is designated by programmed data to a lower value at which the servos can faithfully run; but the velocity numbers PRXC and PRYC are not reduced and the servos will thus receive almost the same input voltages $E_x$ and $E_y$ so as to catch up to the more slowly advancing theoretical positions. A lagging grey error on any axis will ultimately result in a slowdown of the actual velocity along that axis as the error is reduced, but simultaneously the velocity along the other axis or axes will be correspondingly reduced so that the X and Y axis velocities remain coordinated and the member continues faithfully along the path segment but at a slower path velocity.

In summary, it may be said that the detection of a lagging grey error on either axis will result in increasing the number CLBFR and lengthening of the subsequent periods ΔT so as to make the theoretical position advance at a lower velocity than that actually programmed, but at which the servo drives of the system can keep or reduce the following error to substantially zero. Of course, once the corrective action here described has so lengthened the periods ΔT being measured off that the instantaneous errors XERR and YERR are both less than the grey thresholds LERRX and YERRX, then no further lengthening of the subsequent periods ΔT occurs. Indeed, the system acts automatically to progressively shorten the subsequent time periods ΔT so as to restore the actual axis velocities back to their programmed values, in a manner which will next be described.

C. A CYCLE FOLLOWING THE ELIMINATION OF A GREY ERROR

Let it be assumed now that one of the interrupt pulses has just occurred on line 55a in 2b and a new cycle of the servo routine represented by FIGS. 5a-5e and Table II is started, —with the number CLBFR having been increased above its normal value of 200 as a consequence of earlier cycles in which lagging grey errors were found on one of the axes. It may be assumed, for example, that the number CLBFR presently has a value of 1000, and that the durations of the periods ΔT, successively being measured off are therefore 10 milliseconds. In the cycle next to be described, it is assumed, however, that the position errors on the X and Y axes are both less than the grey threshold values, having been reduced because the time periods ΔT have been lengthened.

As a cycle begins at step 001, all of the operations described above with reference to a "normal" cycle transpire down to step 037. The subtraction performed during step 037 will, under the assumed conditions, result in a positive answer (indicating no X grey error) so that the system skips to step 043. At step 043 the designated substraction will also result, under the assumed conditions, in a positive answer (indicating no Y grey error) so that the system skips to step 049. When the signal LDT is sensed at step 049 it will be found to have a value of zero (because it was set to zero at step 057 of the previous cycle). Thus, the system will skip from step 049 to step 052 and the number CLMOD will be read into the cleared accumulator of the CPU. Because, under the assumed conditions the number CLMOD now has a value of 800, the answer ANS signaled from the CPU will be found greater than zero and the system will proceed to step 053. In carrying out step 053, the computer decrements and decreases the clock modifier number CLMOD. Specifically, it reads in CLMOD, reads in and subtracts the increment number CLINC, and restores the result as a new value for CLMOD. This is represented by Equations (34) and (35), the latter being based upon the assumption that the constant CLINC is assigned a value of 1.0:

$$CLMOD_i = CLMOD_{i-1} - CLINC \qquad (35)$$

$$CLMOD_{i-1} = CLMOD - 1 \qquad (36)$$

Thus, during every iteration cycle through the servo routine program, when the number CLMOD is found to be greater than zero (indicating that the periods ΔT have been increased above their normal duration), and no lagging grey error is found on either axis, then the number CLMOD is decreased at step 053 during each iteration.

After step 053, the system proceeds to step 054 where the number CLBFR is newly computed to be the value originally determined at step 025 (e.g., 200 if PER is 1.0) plus the recently-decreased value of CLMOD. Therefore, if CLBFR had had a value of 1000 when step 001 was performed during the current iteration, it ends up after step 054 with a value of 999. Expressed as an equation effective for time period shortening:

$$CLBFR_i = CLBFR_{i(025)} + CLMOD_i = \left(\frac{PER}{200}\right)_i + CLMOD_{i-1} - CLINC \qquad (37)$$

Of course, at step 055 CLBFR will not be found as exceeding the upper limit, and the system will proceed to step 057.

Thereafter the remaining sequences of a "normal cycle," as described above, will take place, ending at step 088.

It will be recognized from the foregoing that when, due to the existence of a lagging grey error, the clock buffer number CLBFR is incremented above its normal value of 200/PER (because CLMOD has been incremented to a value higher than zero) and thus the periods ΔT have been lengthened beyond their normal durations, —and after the grey lagging error has been removed—, then during each subsequent iteration of the servo routine within each period ΔT at the number CLBFR will be decremented until CLMOD is restored to its normal value of zero. As a consequence after a series of time periods in which that decrementing occurs, all of the axis velocities will have been increased back to their programmed values, as modified by PER. This is accomplished by means responsive to the signals XERR and CLMOD to decrease the number CLBFR during any period ΔT when CLMOD is not zero and XERR is neither a lagging error nor one which exceeds in magnitude the threshold LERRX.

D. A CYCLE FINDING A MACHINE HOLD

As noted previously, the machine hold signal MH may be changed to a 1 at the machine at any time as a consequence of either the machine operator depressing the swtich 48, or the automatic closure of some other switch in parallel with the switch 48. In keeping with one feature of the present method and apparatus, when a machine hold is called for, this is detected during the next servo routine cycle (which starts no more than forty milliseconds later), and procedures are initiated for bringing both the X and Y axis velocities to zero quickly while nevertheless bringing the controlled member 11 accurately to the last-signaled theoretical positions. As will be seen, the means for accomplishing this may stop the movement of the controlled member 11 part way through the path segment defined by the current block $B_n$.

It will be assumed that at some instant near the very end of the previous cycle through the servo routine that the switch 48 is closed and the signal MH becomes a one. When the next interrupt pulse appears on line 55a in FIG. 2b, and the next cycle of the servo routine thus begins with step 001, the down counter will be preset with the number CLBFR, and the then-existing zero value of the HOLD signal will be transferred to OHOLD. The system will then go to step 003, and proceed to step 004. In the latter step, the 1 value of the MH signal will be transferred to the HOLD storage, making the HOLD signal 1. The system will then proceed through steps 005 and 006, skip to step 023, go through steps 024 and 025 —all as previously described for a normal cycle. However, when step 027 is performed, the signal HOLD will be found to be one, and the signal OHOLD will be found to be zero. Therefore, as indicated by the rectangle for step 027 in FIG. 5b (and step 027 in Table II), the system will at this instant proceed to step 028 (instead of skipping to step 030 as in the normal cycle previously described). At step 028, the HOLD signal will be transferred into OHOLD, so that both now have 1 values. Then, at step 029 the historical values of the terms XBIAS and YBIAS will be set to zero and the program unit 62 will return back to step 015.

In performing step 015, the value of HOLD is sensed. If it is a one (and this is now assumed for the present cycle being described), the system skips to step 017 and transfers the preselected constant values XTRMH and XKBH into the registers for the numbers XTRIM and XKBIAS. The number XTRIM previously used in the equations for step 082 is therefore changed to a higher "holding" value (in comparision to the constant XTRMR to be described below). In other words, the individual gain factor $G_2$ (here called XTRIM) as a multiplier for the error number XERR in step 082 is increased automatically to a new value $G_2'$ whenever the system is placed in a holding status; that is, the value of XTRIM is changed from XTRMR to XTRMH. Furthermore, the substitution of the constant XKBH for the incrementing value XKBIAS increases the rapidity with which the historical bias term XBIAS is increased or decreased in response to the existence of an error at step 081. Thus the X axis servo control number XDAC is computed with a different gain factor for the error trim term and with a historical bias term which changes at a greater rate so long as any X axis error exists.

After step 017, the system skips to step 019 where the HOLD signal is again sensed. Finding HOLD to be 1 (because it was so set as step 004 mentioned above), the system skips to step 021 where the preselected constant YTRMH is transferred into the register YTRIM, and constant YKBH is transferred into the register YKBIAS. The resulting increases of these number YTRIM and YKBIAS (in relation to their previous values) has the same effect on the Y axis servo as described above for the X axis servo.

From step 021, the system skips to step 024, proceeds through step 25 again, and skips to step 027. As the latter step is performed a second time, it will be found that the HOLD and the OHOLD signals are both 1 (because HOLD was previously set to 1 at step 004 and OHOLD was previously set to 1 at step 028) so that the system skips to step 030. At the latter step, the HOLD signal is again sensed and found to be one, whereupon the system skips to step 035a, sets PER = 0, and proceeds to step 036. Therefore steps 034 and 035 are not performed during a cycle when a holding condition exists. Thus, the number NLOOP is not incremented nor are the theoretical position numbers XT and YT incremented with the velocity numbers PRXC and PRYC. This means that the theoretical position numbers remain constant so long as the system is in a holding mode, and the loop count number NLOOP remains constant so that it does not indicate that execution of the block $B_n$ is progressing— even though successive periods ΔT continue to be measured off in actual time and the interrupt pulses continue to cause successive cycles through the servo routine.

After step 035a, the system proceeds to step 036 where the instantaneous position errors XERR and YERR are computed in the fashion previously described. Thus, the error numbers continue to be updated and accurate while the system is in a holding mode.

After step 036, the system proceeds to progress through steps 037 to 043 to 049 to 052, through 057 and 058 to 066— all as previously described for a normal cycle, assuming that no grey or black error exists for neither axis. Further, the system progresses through steps 066, 067 to 080 as previously described for a normal cycle. If any X axis position error exists, the system will proceed to step 081 and the historical terms XBIAS will be increased or decreased by the number XKBIAS —it being recalled that the latter number now has the value of the "holding" constant XKBH given to it at step 017. Since XKBH is selected to be a relatively large constant number, the XBIAS number will increase in magnitude rather rapidly with successive passing ΔT's in the holding mode, thereby to assist in bringing the member 11 exactly to the last-signaled and now constant theoretical position XTC. On the other hand, if no X axis position error exists, the system will proceed directly to step 082.

When step 082 is performed, it will be found that the number PER is zero (from step 035a, above) and thus the XDAC number will be found from the following equation:

$$XDAC = XGAIN [0 + XTRIM \cdot XERR + XBIAS] \qquad (38)$$

In effect, the XDAC number will become zero if the X axis position error XERR is reduced to zero and the XBIAS term is progressively incremented at step 081 to a value of zero. Therefore, when the holding mode is first established and any error exists, the XDAC number is represented principally by the term XTRIM.XERR with the XTRIM number now having a relatively high value (viewable as an increased gain factor $G_2'$ for the XERR number) so that the error is closed to zero rather rapidly. It will be recalled from step 029 that XBIAS was set to zero after the MH signal was detected at the beginning of the cycle so that the incrementing of the XBIAS signal leaves it at a relatively small number unless a position error persists for several cycles.

In summary, therefore, the system here described includes means responsive to a hold-designating signal from any source for changing the magnitude of the signaled speed number XDAC and its analog counterpart $E_x$, including means for reducing the main velocity term PER.PRXC to zero, and means for changing the error term $G_2$.ERRX to have a larger gain factor $G_2'$. If the historical term XBIAS is employed by means to signal XDAC, means are provided to change its incrementing number XKBIAS per ΔT from a first value XKBR to a second value XKBH. At the same time means are responsive to a hold-designating signal to prevent the periodic changing of the theoretical position number XTC.

Similar means are employed and the same operations result for the Y axis as the system proceeds from step 082 through steps 083, 084 and 085. The first term within the brackets of the equation used in step )085 becomes zero because PER is zero, and the YDAC number (together with its corresponding analog voltage $E_y$) remains large and finite so long as any error YERR continues, thereby moving the member to a zero Y axis error, whereupon the number YDAC and the voltage $E_y$ also go to zero.

From the foregoing it will be seen that when a machine HOLD is signaled, the control system here described automatically brings both the X and Y axis velocities to zero, holds the advancement of the theoretical positions XTC and YTC for those axes, and brings the actual positions along the X and Y axes in agreement with the last-signaled theoretical positions so as to make the error zero.

After the first cycle in which the MH signal has been found to be 1, the next cycle of operations will proceed as described immediately above, from 001 to 023, 024, 025 and thence to the step 027 shown by block form in FIG. 5b. At this point, both the HOLD and OHOLD are 1's so the system skips 028 and 029 and does not go through step 015 et seq. a second time. Rather, the system skips directly from step 027 to step 030 where it finds HOLD to be 1, skips to step 035a where PER is set to zero, —and the operations subsequent to that proceed iteratively during each successive ΔT as set out above.

The system restores itself to the running mode automatically if the MH signal from the switch 48 (and any switches in parallel therewith) reverts from 1 to 0 value at any time. After the signal has changed to 0 and the next iteration cycle of the servo routine begins, both the HOLD and OHOLD signals are 1's at the instant step 004 is reached. At this time the zero value for MH is transferred to HOLD, so that after step 004 the HOLD signal 0 and the OHOLD is 1. This iteration proceeds through steps 006, 023, 024, 025 as previously described, but when step 027 is reached, it is found that the HOLD signal is not like the OHOLD signal, so that the system proceeds to step 028 where OHOLD is changed to 0, proceeds to step 029 where the XBIAS and YBIAS numbers are restored to zero, and then goes back to step 015.

At step 015, the HOLD signal is found to be 0, and the system proceeds to step 016 where the number PRXC is found to be other than zero, and thus skips to step 018. At step 018 the preselected constants XTRMR and XKBR are transferred into the registers XTRIM and XKBIAS, respectively. From what has been said above, it will be understood that this changes the individual gain factor $G_2$ represented by the number XTRIM in the equation for step 082 back to a lower preselected "running" value; and it also changes the incrementing number XKBIAS used at step 081 to a lower "running" value XKBR.

From step 018, the system proceeds to steps 019, 020, and 022 where operations for the Y axis are performed similar to those just described for the X axis at steps 015, 016 and 018.

The system then goes through steps 024 and 025 again, and skips to step 027 where it is found that the HOLD and OHOLD signals are now both 0's. Therefore, the system skips to step 030 where it finds HOLD to be 0 and thus proceeds to step 031. The sequential operations which follow during steps 031 onwardly to the exit step 088 are those which have been described above for a "normal" cycle. It will be borne in mind that the theoretical position numbers XT and YT will thus be incremented by the numbers PRXC and PRYC at step 034 and the cycle count number NLOOP will be incremented by 1 at step 035. Moreover, at steps 081 and 084 the incrementing, if any, of the historical terms XBIAS and YBIAS will be by the current value of the incrementing number XKBIAS and YKBIAS which are now the "running" constants XKBR and YKBR. Thus, the historical bias terms will change at a more gradual rate if the X or Y position errors are not zero. Finally, in steps 082 and 085 the number PER (which may be viewed as a gain factor on the quantities PRXC and PYRC) is no longer zero because it was set to agree with FRO at step 005, and was not reset to zero because steps 026a and 035a have been skipped. Thus, the XDAC and YDAC numbers are computed in a normal fashion with the gain factors XTRIM and YTRIM for the numbers XERR and YERR now having preselected "running" values XTRMR and YTRMR.

The system is thus restored to a running mode, after being in a machine hold condition, when the MH signal is at any time restored to a zero value. After the first such restoration iteration as described above, the following iterations are identical in every respect to the "normal" cycles described above.

E. A CYCLE FINDING A BLACK ERROR

Let is be assumed that a grey error has existed on the X or Y axis during several successive ΔT's and that the clock member CLBFR has been increased to lengthen the periods ΔT and reduce the rates of change of the theoretical position numbers XTC and YTC. Assume further that one of the axis position errors then, for any of several possible abnormal conditions, increases above the second threshold value TH2 represented by HERRX or HERRY so that a black error comes into existence.

An iteration cycle just after the black error comes into being will proceed from step 001 to step 038 in the same way as above described for a grey error cycle. At step 038, however, if the X axis error XERR is greater than the second threshold number HERRX, the system will skip to step 059. If not, the system will reach step 043, find a grey error, and go to step 044. If the Y axis error YERR is greater in magnitude than the threshold number HERRY, then the system will skip to step 059. Thus, if a grey error exists on either the X or the Y axis and if a black error also exists on either the X or the Y axis, the system bypasses steps 045 through 058 and skips to step 059.

At steps 059 and 060. the instantaneous error numbers XERR and YERR are compared with the red error threshold values 2HERRX and 2HERRY. It is assumed in the present discussion that neither red error threshold is exceeded, so that after the system executes step 059 it proceeds to step 060 and thence to step 061. At step 061, the HOLD signal is sensed and (assuming this is the first cycle in which a black error has been found) is found to be 0, so that the system proceeds to step 062.

It will be recalled from previous discussions of the operation performed at step 053 of earlier cycles that the register BEKNT has been set to contain a preselected number BEDLAY which may, for example, be 75. Thus, when the system reaches step 062 it reads the number BEKNT into the accumulator, subtracts one, and stores the result as a new value for BEKNT. The number BEKNT is used to create a short delay after the inception of a black error prior to the initiation of responsive action, so that only the momentary existence of the black error will not produce that rather drastic corrective response. For this purpose, the system repeatedly senses the value of the number BEKNT and initiates corrective action only after the latter has been decremented to a value of zero. This explains the decrementing step performed at step 062.

Then at step 063, the number BEKNT is read into the accumulator and if that number is not zero, the system skips to step 066. If the number is zero, the system returns to step 026 in the iteration sequence. But with the assumption that the cycle here described is the first in which a black error has been detected, the number BEKNT at step 063 will be found to have a value of seventy-four (the result of the decrementing at step 062), and thus the system will skip from 063 to 066.

From step 066, the sequence proceeds as described above for a grey error or normal cycle, exiting at step 088.

On the next cycle and during the next period ΔT, the operational sequences will be exactly as those described above for the first cycle in which a black error is detected, except that at step 062 the number BEKNT will be decremented to a still lower value. Therefore, if a black error does arise and remain, 75 succeeding periods ΔT will be measured off (assuming that the constant BEDLAY is chosen to be 75) before, in the last of such cycles, the number BEKNT is found to be zero at step 063. Nominally, this creates a delay of 0.150 seconds from the instant that the black error was first detected. When this occurs, the system returns from step 063 to step 026 so that the indicator HOLD is set to one, and at 026a PER is set to zero. At step 027 the signals HOLD and OHOLD are found respectively to be 1 and 0, so that the system goes through steps 028, 029 and returns to step 015. From step 015 the system operates through sequences previously described for the first cycle after a machine hold has been detected. That is, in summary form, the "holding" values of XTRMH and XKBH are set into XTRIM and XKBIAS at step 017; and similarly the counterpart Y axis holding values are so transferred to YTRIM and YKBIAS at step 021. Then step 024 is performed and because PER - .05 is now negative, the system skips to and re-executes step 027. This time, however, both the HOLD and OHOLD signals are 1's so that the system skips from 027 to step 030 where it finds HOLD to be 1 and thus skips to step 035a where the number PER is set to zero (redundantly in this instance). This results in steps 034 and 035 being skipped, and the system goes to step 036 where it progresses as if in a holding cycle (described above) to step 088. It will thus be understood that after a black error has been detected and a delay interval created by the number BEKNT has elapsed, the entire system is automatically placed in a holding mode.

After the first cycle during which the number BEKNT at step 063 is found to be zero and the signal HOLD is set to one, then when the next succeeding cycle begins, step 001 will be performed in the usual way, step 002 will transfer the 1 value of HOLD into OHOLD, and at step 003 the number BEKNT will be found to be zero. This signifies that the system has been placed into a hold condition because a black position error has been detected and endured for a predetermined interval while the number BEKNT has been incremented down to a value of zero. From step 003, the system skips to step 035a where the number PER is set to zero. From step 035a to 088 the sequences are the same as for a holding cycle. Many iterations of this type can occur successively, with the system holding, if a black error is detected during each such cycle.

After one or more iterations in the holding mode, however, the position errors XERR and YERR will progressively decrease, in the fashion explained above. Thus, during some subsequent period ΔT, the sequences of operations will find that a grey error exists when the operations of steps 037 or 043 are performed, but will not find that a black error exists when the operations at steps 038 or 044 are performed. In consequence, when the holding condition results in the elimination of the black error, the system will find a grey error and at step 049 will find that the LDT signal is one. From that point onward during the remainder of the iteration cycle, the operational sequences will be the same as those described above for a grey error cycle, the signal LDT being set to zero at step 057 and the number BEKNT being set equal to BEDLAY at step 058. The clock buffer number CLBFR will be further increased to further lengthen the periods $\Delta T$ and this will have the effect of tending to reduce the axis position errors.

When the next cycle begins, the new value of CLBFR will be preset into down counter 55 and number BEKNT will be found equal to BEDLAY so the steps 004, 005, 006 will be executed in carrying out a grey error cycle, with skipping from step 006 to step 023. From step 023, the system proceeds to step 024 to find a non-negative answer (because PER is now equal to FRO from step 005), proceeds through step 025, and finds HOLD = 0 and OHOLD = 1 at step 027. Therefore, steps 028 and 029 are performed and the system returns to step 015. Finding that HOLD = 0, the system proceeds to step 016 to find PRXC not zero, skips to step 018 and changes XTRIM and XKBIAS to the "running" values XTRMR and XKBR. These operations are repeated for the Y axis at steps 019, 020, 022 — and the system then goes through step 024 and 025 to step 027. In this execution of step 027, however, both HOLD and OHOLD are 0's, so the system skips to step 030, proceeds to 031 and goes through the rest of the sequences for a grey error cycle.

During the next several $\Delta T$'s, if the system ultimately removes the grey error, the clock buffer number CLBFR will be incrementally reduced, as previously described, until the following error approaches substantially zero.

In review, the normal operation of the present apparatus according to the method here disclosed results in the position errors along the X and Y axes normally being in the "white error range". If a grey error is detected, the durations of the periods $\Delta T$ are lengthened and this tends to reduce the axis velocities called for below those which correspond to programmed values so that the grey errors tend automatically to be eliminated. If, however, due to unusual and abnormal circumstances the grey errors are not eliminated and indeed the position error along either axis increases above the second threshold into the black range, then the system is automatically put into a holding mode. This results in the movements along the X and Y axes "catching up" to reduce the position errors back down below the black error threshold. Having returned the position errors to the grey range, the system then functions in a manner specified for grey error cycles and tends further to eliminate the grey position errors so that any position errors drop into the acceptable or white range.

These results are obtained by means for producing electric signals digitally representing numerical values (for the X axis, by way of example) XGAIN, PER, PRXC, XTRIM, XERR, BIAS, XTC, XIN and HERRX. Means are provided to operate during each time period to change XTC by adding PRXC and to signal the existing error such that XERR = XTC − XIN. Responsive to those changing signals, means are also employed to produce digital signals XDAC equal to XGAIN[PER . PRXC + XTRIM . XERR + BIAS], to convert XDAC into analog counterpart voltage $E_x$, and to apply the latter as the input to the X axis velocity servo 21. And further means are provided to signal during any period that the error XERR exceeds the predetermined threshold HERRX, whereupon the apparatus sets the signal PER to zero, terminates the adding of PRXC to XTC, and changes the value of the gain factor XTRIM — so that a holding condition is obtained. But when the error XERR falls back below HERRX as holding takes place, then the apparatus removes the modifications of signals and return to grey error or normal operation. The threshold value HERRX may be a constant but is preferably a monotonic function of PRXC.

F. A CYCLE FINDING A RED ERROR

If an extremely serious condition arises such as precipitous failure of one of the servo motors or an obstruction physically blocking the movement of the saddle 16 or table 29, the controlled member 11 may fall into a grey error, then almost immediately into a black range error, and thence into a red position error range — along one or more axes. Although a black error holding condition may be created before the red error actually occurs, usually the red error will come into being while the black delay is being measured off by decrementing of the BEKNT number, because the red error is apt to be caused by a precipitous and disastrous condition.

Assuming that the system is running through normal cycles, a grey error condition is then detected during a given cycle, and then on the next cycle a black error condition is detected. The number BEKNT may be decremented for several cycles while the X or Y axis error is in the black range, but that number probably will not reach zero if it is assumed that the error on one or both axes increases above the third threshold TH3 and a red position error thus is created within a few cycles after the black position error appears.

Thus, in one of the black error cycles during which the number BEKNT would normally be decremented, the sequences of steps through the program will be like that described above for a "black error prior to BEKNT = 0" cycle. The operations carried out will proceed through steps 001-006, 023, 024, 025, 027, 030, 031, 034, 035, 036 and 037. Assuming that the red error exists in the X axis, the operation will go from step 037 to step 038 where a black error will be detected, and thus the system skips to step 059. At either of steps 059 or 060, under the conditions here assumed, it will be found that the X or Y error number XERR or YERR is greater than 2HERRX or 2HERRY — signifying that there is a red error condition on at least one axis. Therefore, the system will skip to step 064 which is performed during cycles when a red error exists.

At step 064 the delay count number REDKNT (previously set to the value of a predetermined constant REDLAY, such as twenty-five, as later explained) is decremented by one. The number REDKNT is used to create a delay interval equal to a selected number of periods $\Delta T$ before any response to a red error condition is produced, — just to be certain that a very short and momentary red error condition does not result in unnecessary and strong corrective action to be described.

After the number REDKNT has been decremented at step 064, the system proceeds to step 065 where it is determined that, under the assumed conditions, the number REDKNT is not zero. The red delay thus not have elapsed, the system proceeds to step 066 and there finds that the signal EMHOLD is 0. Thus, the system proceeds to step 067 and it goes on through the rest of the routine to step 088 in the same way as for a normal cycle, as described above.

The next iteration cycle during the succeeding period ΔT will result in exactly the same responses and sequences described immediately above except that the number REDKNT will be decremented to a still lower value during step 064. If it is assumed that the number REDKNT had been preset to a value of 25 prior to the appearance of a red error, 25 such cycles of operation will transpire (producing a delay of approximately 50 milliseconds if the cycle periods are assumed to be 2 milliseconds in duration). On the twenty-fifth such cycle at step 065 in the program, the number REDKNT will be found to have a zero value, and instead of proceeding to step 066, the system will skip to step 069. At step 069 an emergency delay number EMKNT is set to a predetermined low value (here one); and then at step 70 a red error shutdown indicator HALT is set to one. Thereafter, the system skips to step 072, sets the emergency hold indicator EMHOLD to one, and the system then returns back to step 026.

At step 026 (in a sequence which has previously been described) the HOLD signal is set to one, at step 026a PER is set to zero, followed by a finding at step 027 that HOLD is one and OHOLD is zero, so that steps 028 and 029 are performed, after which the system returns to step 015. The sequence of operations from step 015 through 021 when HOLD is a one has been previously treated above. The "holding" constants XTRMH, XKBH, YTRMH and YKBH are transferred into other registers for active use. At step 024 the number PER will be found less than 0.05, and thus operations through steps 026, 026a and 027 will be repeated. In this execution of step 027 it will be found that the HOLD and OHOLD signals are alike. Thus, the system skips to step 030, finds HOLD = 1, sets PER equal to zero at step 035a (skipping steps 034 and 035), and goes on to perform steps 036 and 037.

Because under the postulated conditions there is a red error condition on the X axis, the system will proceed from step 037 and 038 again to step 059 where it will be found that XERR is greater than 2HERRX, so that the system skips to step 064 and again decrements the number REDKNT. Recalling that during the previous iteration REDKNT had a value of zero, this decrementing makes that number a negative one. Thus at step 065 it is found that the number REDKNT is not equal to zero, making the system skip to step 066.

At step 066, the signal EMHOLD (having been set to 1 at step 072) is found to be a one, so operations skip to step 073 where it is found that the number EMKNT is equal to one (having been preset to that value earlier by step 069). Therefore, the system proceeds to step 074 where the number EMKNT is decremented by one so that it takes on a value of zero. At the following step 075, it is found that EMKNT is zero, so that the system skips immediately to step 087 which results in turning off the electrical power for all of the servo systems 21 and 31, totally shutting down the machine tool. At step 088 the system exits from the servo routine and awaits the next interrupt pulse.

Thus, the effect of a red error on either axis which endures for the delay interval created by the number REDKNT results in HALT, HOLD and EMHOLD all being set to one and immediate shutdown of the servo systems. The servo routine continues to cycle through successive iterations but during each (and even though the signal MH is a zero) it will skip from step 006 to 023, find EMHOLD equal to one, skip to step 026 and set HOLD, go to step 027 and find both HOLD and OHOLD to be 1's, skip to step 030 and progress through steps 035a, 037, 038, 059, 064 and 065 to 073. When the number EMKNT is sensed at step 073 it will now be found to be zero, so the system skips to step 076 and finds HALT to be 1, skips to step 087 (performed redundantly since all servo power was previously turned off) and exits at 088 to await the next interrupt pulse. Successive cycles during the many periods which follow will involve those same sequences so long as HALT remains 1, and thus EMHOLD remains 1 and EMKNT remains zero.

The controlled member 11 will not, of course, move so long as the electrical power for the servos 21, 31 is turned off. The red error shutdown indicator HALT may be cleared only by an operator-actuated switch (not shown) after the stop switch contacts 49a have been closed and the operator has found and corrected the condition which originally created the red error, and the operator has manually adjusted the controlled member to a substantially zero error position. Thereafter, the system may be re-started by the operator moving the switch contacts 49a, 49b to the "run" position, as described below.

G. A CYCLE FINDING THAT AN EMERGENCY STOP SIGNAL EXISTS

As noted above, the console 44 associated with the machine tool (FIG. 1) includes a stop-run switch 49a, 49b. In an emergency condition the operator may actuate that switch to close the contacts 49a, thereby making the signal STOP a 1. The signal STOP is sensed during every period ΔT when the EMHOLD signal does not exist, and when STOP is found to exist, an emergency delay is measured off in time after which the machine is totally shut down. These operations will be made clear from the following description of a cycle through the program represented by FIGS. 5a-e with the assumption that the STOP signal is first detected during that cycle.

Assume that a period ΔT has just begun and that the sequence of operations represented in FIGS. 5a-d have progressed according to those of a "normal" cycle down to step 066. At the latter step it will be found that EMHOLD is zero, so the system will proceed to step 067 where it will, for the first time, find STOP = 1. Thus, instead of skipping to step 080, the system proceeds to step 068 where it presets the emergency stop delay number EMKNT to some predetermined constant here shown by way of example as 50. The system then skips to step 072 where the signal EMHOLD is set to one. The system returns to step 026.

As noted above, when the system returns to step 026 and sets HOLD to 1, it thereafter sets PER to zero at step 026a, goes through steps 027, 028, 029 and returns to step 015 in order to progress through steps 017, 021 and 024. With PER now equal to zero, the system repeats steps 026, 026a and 027 — from whence it skips to step 030 where it finds HOLD now one. Both HOLD and OHOLD have now been set to one and the "holding" values of the numbers XTRIM, XKBIAS, YTRIM and YKBIAS have been made active, while PER is presently zero.

From step 030, the system then skips to step 035a where PER is set to zero (redundantly in this instance), and then proceeds through steps 036, 037, 043, 049 (assuming that neither a grey nor black error exists) — and thence from 049 through 052, 057 and 058 to 066.

At step 066 the signal EMHOLD is found to be a one (having been so set at the earlier step 072) so that the system skips to step 073. Because the number EMKNT was originally preset to a value of fifty, its value will not at this instant be zero, and the system will therefore proceed to step 074 where EMKNT is decremented by one. Then, at step 075, the number EMKNT again will not be zero (having just been decremented from its initially set value of fifty to forty-nine), and so the system will skip to step 080 and continue through the sequence of operations as if it were in a holding mode.

When the next period $\Delta T$ begins, and the next cycle through the servo routine starts, the sequences will be the same as for a normal cycle through steps 001, 002, 003, 004, 005 and 006 to step 023. Finding the signal EMHOLD to be 1 at step 023, the system will proceed through steps 026 and 026a, then to step 027, and skip to step 030 because HOLD and OHOLD are now both 1's. At step 030 since HOLD is one, the system continues on as if in a holding status, in the fashion previously described — except at step 066 it finds EMHOLD =1, skips then to step 073 and proceeds to step 074 where EMKNT is again decremented. Thus, when the system reaches step 075 a second time it will find EMKNT equal to 48 and skip to step 080. Operations proceed from that point on to step 088 as if the system were in a holding cycle.

Such cycles continue until fifty $\Delta T$'s have been measured off and in the fiftieth such cycle it is found at step 075 that EMKNT is equal to zero. As a result, the system will skip from 075 to step 087, whereupon the electrical power for the two servo systems will be turned off and the computer will exit from the servo routine at step 088.

The machine tool thus having been shut down in response to actuation of the console "stop" switch, the periods of time $\Delta T$ continue to be measured off and the sequences of operations through successive steps of the servo routine continue to be executed (as just described above for the 50th cycle) down to step 073. When step 073 is reached, however, it is found that EMKNT is zero, so that step 074 is not executed and EMKNT is not decremented below zero. Instead, the system skips from step 073 to 076 where it senses whether or not the HALT signal is zero. If HALT is 1, the system skips immediately to step 087 and exits from the servo routine at 088, since once the HALT signal has been set to a one it can be cleared only by the machine operator after he has corrected the difficulty which created the red error. But if, at step 076, it is found that HALT is 0, this signifies that the system was put into an emergency hold and stopped because of the STOP signal from switch 49a. Therefore, the system proceeds to step 077 where it senses the STOP signal. If the stop signal is still 1, the computer exists from the servo routine through steps 087 and 088. On the other hand, if during one of the many continuing $\Delta T$'s which are measured off following an emergency stop, it is found at step 077 that the operator has restored the switch 49a to an open condition and therefore removed the signal STOP, the system will proceed from step 077 to step 078 where EMHOLD is cleared to zero. Thereafter on step 079 the electrical power for the servos 21 and 31 is turned on, after which the system proceeds through steps 080 to the exit step 088 as if it were in a holding mode.

When the next cycle $\Delta T$ begins to be measured off, the signal HOLD will be set to zero at step 004 (assuming MH is a zero) and the system will sequence through steps 004, 006, 0023, 0024, 0025, 0027, 0028, 0029 and thence back to step 015. Progressing from step 015 through 016, 018, 019, 020 and 022 the system will find HOLD to be zero so that the "running" values of the constants XTRMR, XKBR, YTRMR and YKBR will be transferred into active use as the corresponding active numbers to be used during steps 081, 082, 083 and 084, as previously described. Proceeding through steps 024 and 025 to 027 again, the system will now find both HOLD and OHOLD to be zero, skip to step 030, proceed to step 031 and continue on as if in a normal running cycle.

The foregoing makes it plain that the machine operator by closing the switch 49a may effect an emergency stop in the X and Y axis servos to make the controlled member 11 come to rest at any point midway through execution of a programmed path segment. The operator may, moreover, cause the system to resume its normal operation simply by opening the stop switch 49a. This will be detected in the servo routine and normal running conditions will be resumed.

H. A CYCLE FINDING THAT ACCELERATION OR DECELERATION SHOULD BEGIN

From what has been said above, it is clear that in every period $\Delta T$ when the system is not in a holding mode or stopped condition, the "elapsed cycles" number NLOOP is incremented at step 035 in the servo routine. Likewise, in each such cycle the step 031 is performed in order to determine whether the signal DC is a one; and if so, the step 032 is performed to determine if the number LOOPB is greater than the number NLOOP. If such determination is not affirmative, it means that motion along the path (and thus along both the X and Y axes) has progressed for the current block $B_n$ to that point in distance and time such that the change in velocity from PRXC to the velocity TPRX along the sloped velocity line 82 (FIG. 8) should begin. For this reason, the block 032 in FIG. 5c designates an acceleration/deceleration test performed according to the question of whether NLOOP - LOOPB is negative. A "yes" answer indicates that such point has not been reached at which the velocity change represented by the line 82 should begin. But a "no" answer to that question designates that the velocity should begin changing.

Accordingly, when a "no" answer is obtained for the step 032 as shown in FIG. 5c, the system proceeds to step 033 during which the previously computed incrementing values XINC and YINC are employed to change the existing values of the velocity numbers PRXC and PRYC. As made plain from FIG. 5c and Table II, each time that the step 033 is performed, it produces the operations indicated by the following equations:

$$PRXC_i = PRXC_{i-1} + XINC \qquad (39)$$

$$PRYC_i = PRYC_{i-1} + YINC \qquad (40)$$

It will be recalled that the quantities XINC and YINC have been determined such that the axis which undergoes the largest velocity step change from one block to the next as programmed will have its velocity number changed at a rate A per ΔT which corresponds to the maximum acceleration A of which the servos are capable.

Therefore, once the number NLOOP has been found to equal or exceed the number LOOPB at step 032 in any cycle of the servo routine, it will be found to so exceed in every succeeding cycle for the block represented by the data then in current storage. And in each such cycle the velocity numbers PRXC and PRYC will be changed (either increased or decreased) by incremental amounts. Therefore, once the acceleration or deceleration action begins, the terms PER . PRXC and PER . PRYC for the equations followed during steps 082 and 085 will become progressively different with each passing period ΔT, and thus the X and Y axis velocities will progressively change along substantially straight lines toward the values which they must have by the time the system begins execution of the following commanded path segment.

Except for this incrementing of the velocity numbers PRXC and PRYC, any cycle in which the accelerating or decelerating action is produced proceeds in exactly the same manner as described above for a "normal" cycle.

I. A CYCLE FINDING THE PATH SEGMENT $B_n$ FULLY EXECUTED; TRANSFER OF DATA TO BEGIN EXECUTION OF BLOCK $B_{n+1}$ AS THE NEW BLOCK $B_n$

As shown in FIG. 8, the servo block $B_n$ began at that instance in time when the X axis reached and began running at the constant velocity PRXC indirectly defined by the programmed data for block n. It is at this instant that the number NLOOP is restored to zero, and its dynamically changing value thereafter represents the number of cycles or loops which have elapsed since that point in time. From FIG. 8 it will be clear that when the number NLOOP becomes equal to the number LOOPC, the servo block $B_n$ will have been fully executed, i.e., the X axis motion will have continued at the velocity PRXC over the time span designated as LOOPB, and then will have uniformly decreased along the sloped line 82 to the next block velocity TPRX over a period of time equal to 2PC (in units of ΔT's).

These relationships are employed in order to effect the transfer of block $B_{n+1}$ data into the current storage section 70 when the path segment being executed has been completed.

Let it be assumed that during a given cycle of operation the deceleration action above described has transpired at step 033 in the servo routine, and that the incrementing of the number NLOOP at step 035 makes the latter for the first time equal to the stored number LOOPC. The system will continue on through that cycle of operation and then await the next interrupt pulse. When such next interrupt pulse appears, a new cycle through the servo routine will be started, and steps 001 through 005 will be carried out in the usual fashion. However, when the system reaches step 006, the number LOOPC will be read into the CPU, and the number NLOOP will be read in subtractively, so that the answer ANS appearing in the accumulator will be zero. At step 006 this indication by the answer that NLOOP is equal to LOOPC will cause the system to proceed to step 007 rather than skipping (as heretofore described) to step 023.

At step 007 the system will determine whether or not data has been processed for block $B_{n+1}$ and is "ready" in the intermediate storage section 69 (such processing and readying of data being hereinafter described). If such data is not ready, the signal DRIND will be zero, and thus the system will skip to step 026, set the signal HOLD to one, and go into a holding mode as described above. If, however, the signal DRIND is a one, the system will proceed to step 008 and 009, during which the precomputed numerical values for the block $B_{n+1}$ will be transferred from intermediate storage registers to the appropriate current storage registers. More specifically (as indicated symbolically by dashed lines in FIG. 2b, and set out in both FIG. 5a and Table II), the number LOOPF is taken from its intermediate storage register and inserted into the register LOOPC to become the new value for LOOPC. Likewise, the numbers TPRX and TPRY are transferred to become the new numbers PRXC and PRYC.

Next, at step 010 the number NLOOP is cleared to zero so that the running count of time period ΔT which it represents starts over. Also, because transfer of data has been completed, the data ready indicator DRIND is cleared to zero.

Next, at step 011 (which actually is carried out as a succession of discrete steps within the computer) the new values of the first and second error thresholds are computed as monotonic functions of the velocity numbers for the block of data $B_{n+1}$ which is now being transferred into current storage and designated as block $B_n$. It will be seen from FIG. 5a and from Table II that a value of LERRX is computed according to Equation (24) and then newly stored in register LERRX. In the present example, it is assumed that HERRX is made twice the value of LERRX (see Equation 25), so that the latter may be multiplied by two and then stored as a new value in register HERRX. Similarly, new values of LERRY and HERRY based upon the new and present values of PRYC are computed and stored in their corresponding registers.

At step 012 a preselected constant REDLAY which determines the length of time delay interval between the detection of a red error and corrective action, is transferred into the register REDKNT. In this fashion, REDKNT always has a predetermined value (assumed to be 25 in the foregoing description) unless and until a red error is detected. Also, at step 012 the one-bit indicator DECEL is transferred from the intermediate storage section to the indicator bit storage DC in the current storage section.

It is conceivable that, in the transition from one programmed path segment to the next, the "jumps" in velocity may be so small as to be within the capabilities of the servo systems 21 and 31 to execute without any progressive change in velocity numbers from one block value to the next block value. If this condition exists, it is unnecessary to perform the incrementing of velocity numbers described above with reference to step 033 in the servo routine. Therefore, at step 013 the one-bit indicator DECEL is sensed, it being the same as the indicator DC at this instant, and if it is a zero, the system skips to step 015. On the other hand, if the signal DECEL is a one at step 013, it is necessary to employ the numbers LOOPB and XINC and YINC for deceleration or acceleration purposes at the end of the segment defined by the block of data being transferred. Accordingly, the system proceeds from step 013 to step 014 where the precomputed numbers LOOPS, PRXI and PRYI are respectively transferred to the registers LOOPB, XINC and YINC in the current storage section. After such transfers, the system proceeds to step 015.

The operations which are effected from steps 015 through steps 025 have been described above, and need not be detailed here. In a normal cycle when the transfer of data has been performed by following through steps 008 to reach step 015, the signal HOLD will not be a one, and thus the system will proceed to step 016. It is conceivable that if a programmed block of data defines a path segment lying solely along the Y axis and having no X axis component, then the velocity number PRXC just stored in the current storage section will be zero. Thus, in that event, when the number PRXC is found to be zero at step 016, the system will proceed to step 017 and thereupon transfer the "holding" constants XTRMH and XKPH into their counterpart active registers. But is PRXC is not zero, the system skips from step 016 to step 018 and either newly transfers or simply retransfers the "running" constants XTRMR and YKBR into the actively used registers XTRIM and XKBIAS. The same general operations occur at steps 019 through 022, and the system therefore brings into play either the "holding" or the "running" constants.

Beginning at step 024 in a cycle of operation which involves transfer of new block data to the current storage section by progressing through steps 008 to 015, the sequences proceed as described above for any "normal" cycle. Since these have been set out above, those normal cycle sequences need not be repeated here.

VII. DERIVING AND STORING SIGNALS FROM $B_{n+1}$ COMMAND DATA TO REPRESENT NUMBERS WHICH WILL LATER BE USED IN THE CURRENT STORAGE SECTION

The numbers transferred to the current storage section at the beginning of execution of block $B_{n+1}$ (and after such transfer, called the current data for the new block $B_n$) are TPRX, TPRY, LOOPF, LOOPS, PRXI, PRYI and DECEL — as explained above. It is desirable to have these numbers ready and waiting at the instant the changing number NLOOP for the almost-completed old block $B_n$ becomes equal to LOOPC and the transfer sequences (steps 006, 007 and 008 to 015 in Table II) begin.

In keeping with the present invention these numbers are computed and stored in the form of digital signals by apparatus which functions to carry out a "preparation sub-routine" represented as a flow chart in FIGS. 9a, 9b and as a list of program steps in the following table:

TABLE III

PROGRAM STEPS FOR PREPARING $B_{n+1}$ DATA

| | |
|---|---|
| 1. | Clear accum and read in DRIND<br>If ANS = 0 proceed to step 2<br>If ANS = 1, skip to step 39 |
| 2. | Transfer $X_{n+2}$ into $X_{n+1}$ |
| 3. | Transfer $Y_{n+2}$ into $Y_{n+1}$ |
| 4. | Transfer TPRX' into TPRX |
| 5. | Transfer TPRY' into TPRY |
| 6. | Transfer LOOPP' into LOOPP |
| 7. | Transfer P into PC |
| 8. | Transfer $BX_{n+2}$ into $X_{n+2}$ |
| 9. | Transfer $BY_{n+2}$ into $Y_{n+2}$ |
| 10. | Transfer $BFRN_{n+2}$ into FRN' |
| 11. | Transfer $BX_{n+3}$ into $BX_{n+2}$ |
| 12. | Transfer $BY_{n+3}$ into $BX_{n+2}$ |
| 13. | Transfer $BFRN_{n+3}$ into $BFRN_{n+2}$ |
| 14. | Start tape reader, fill $BX_{n+3}$, $BY_{n+3}$, and $BFRN_{n+3}$ |
| 15. | Clear accum, read in 30,000 and FRN' to compute 30,000/FRN'<br>Store ANS in LOOPP' |
| 16. | Clear accum, read in $X_{n+2}$, $X_{n+1}$, FRN' and .3333 to compute<br>$(X_{n+2}-X_{n+1})(FRN')(.3333)$<br>Store ANS in TPRX' |
| 17. | Clear accum, read in $Y_{n+2}$, $Y_{n+1}$, FRN' and .3333 to compute<br>$(Y_{n+2}-Y_{n+1})(FRN')(.3333)$<br>Store ANS in TPRY' |
| 18. | Clear accum, read in TPRX' and TPRX to compute (TPRX'−TPRX)<br>Store ANS in ΔPRX |
| 19. | Clear accum, read in TPRY' and TPRY to compute (TPRY' − TPRY)<br>Store ANS in ΔPRY |
| 20. | Clear accum, read in absolute values ΔPRX and ΔPRY to compute<br>$\|\Delta PRX\| - \|\Delta PRY\|$<br>If ANS is negative, skip to step 22<br>If ANS is not negative, proceed to step 21 |
| 21. | Clear accum, read in ΔPRX<br>Store ANS in ΔPRfa; skip to step 23 |
| 22. | Clear accum, read in ΔPRY<br>Store ANS in ΔPRfa |
| 23. | Read in K as multiplier to compute (ΔPRfa)(K) = TR<br>If ANS digits to right of dec. point are all zero, skip to step 26<br>If ANS digits to right of dec. point are not all zero, proceed to step 24 |
| 24. | Read in constant 1.0 and add to compute TR + 1 |
| 25. | Clear accum digits to right of dec. point |
| 26. | Read in 2 as a divisor to compute (TR/2) or (TR/2) + ½<br>If ANS tenths digit place is zero, proceed to step 27<br>If ANS tenths digit place is 5, skip to step 28 |
| 27. | Read in .5 and add |
| 28. | Store ANS in P |
| 29. | Read in 2 and multiply to compute 2P<br>Store ANS in 2P. |
| 30. | Clear accum, read in ΔPRX and 2P to compute ΔPRX/2P<br>Store ANS in PRXI |

TABLE III-continued

PROGRAM STEPS FOR PREPARING $B_{n+1}$ DATA

| | |
|---|---|
| 31. | Clear accum, read in ΔPRY and 2P to compute ΔPRY/2P<br>Store ANS in PRYI |
| 32. | Clear accum, read in ΔPRfa, read in A to compute ΔPRfa − A<br>If ANS is negative, proceed to step 33<br>If ANS is not negative, skip to step 35 |
| 33. | Clear accum to zero<br>Store ANS in P, 2P and DECEL<br>Skip to 036 |
| 35. | Clear accum, read in 1<br>Store ANS in DECEL |
| 36. | Clear accum, read in LOOPP, PC and P to compute (LOOPP − PC − P)<br>Store ANS in LOOPS |
| 37. | Read in 2P to compute (LOOPS + 2P)<br>Store ANS in LOOPF |
| 38. | Clear accum, read in 1<br>Store ANS in DRIND |
| 39. | Exit to Supervisory Routine |

From FIGS. 9a and 9b taken conjointly with TAble III, those skilled in the art will fully understand the physical organization of gates and sequencers to be formed within the program unit 62 of the digital computer (FIG. 2b) by transmitting to that program unit a series of instructions entered through the associated keyboard terminal. Such preparation program will be keyed into the supervisory routine of the computer so as to be called up and executed during any of the time intervals which lie between (a) the instant that step 088 is completed for a cycle of the servo routine program defined in Table II, and (b) the instant that the next interrupt pulse appears on line 55a in FIG. 2b. If desired, the preparation sub-routine may be simply a continuation from step 088 onward in the servo routine, since it will be seen that once data for block $B_{n+1}$ is "ready," essentially all of the steps of the preparation sub-routine are skipped.

Let it be assumed that at some instant in time a transfer of $B_{n+1}$ data from intermediate storage 69 to current storage 70 has been completed by a "transfer cycle" of the program described above with reference to FIGS. 5a-5e and Table II. At step 010 within that cycle, the signal DRIND is set to zero.

In consequence, after that cycle of the servo routine is completed, the supervisory routine within the computer will cause the program unit 62 to enter the preparation sub-routine depicted in FIGS. 9a, 9b and defined more explicitly by Table III. A narrative sequence of the operations which follow such entry will make clear both the apparatus and the method by which, in an exemplary embodiment, the precalculations are performed to create digital signals numerically representing the required values of numbers pertaining to the now-designated $B_{n+1}$ path segment.

After entry at step 1 (FIG. 9a and Table III), the signal DRIND is brought into the cleared accumulator of the CPU. If the answer ANS is one, it indicates that the $B_{n+1}$ data have already been prepared and exist in the intermediate storage section 69, so the system skips directly to the exiting step 39. On the other hand, if DRIND is zero, this indicates that the precalculation routine must be fully performed, and so the system proceeds to steps 2–7.

At steps 2 through 7 a series of transferring operations are performed as represented by the dashed lines within the intermediate storage section 69 in FIG. 2b. Specifically, the number $X_{n+2}$ is transferred to the register $X_{n+1}$ to become a new value for the latter coordinate. The number $Y_{n+2}$ is transferred to the register $Y_{n+1}$ to become a new value for the latter coordinate. The number TPRX' (representing the velocity number for the previously-designated block $B_{n+2}$) is transferred into the register TPRX to become the velocity number for the newly and presently-designated block $B_{n+1}$. Similarly, the velocity number TPRY' is transferred into the register TPRY. The number LOOPP' is transferred to the register LOOPP where it represents the programmed time span for the newly designated block $B_{n+1}$. And finally, the number P is transferred to the register PC to represent a time span for the block now newly designated $B_{n+1}$. The numbers prepared during the previous execution of the preparation sub-routine (applicable to what was then designated $B_{n+2}$) are therefore transferred from register shown in the left portion of the intermediate storage 69 to counterpart registers shown in the right portion — where they are applicable to what is presently designated block $B_{n+1}$.

It may be assumed that at this instant the storage registers in the buffer section 68 are full, i.e., that the tape reader 45 was earlier started to read the punched tape data for block $B_{n+3}$, the data numbers thereof having been placed in registers $BX_{n+3}$, $BY_{n+3}$ and $BFRN_{n+3}$ after the corresponding numbers $BX_{n+2}$, $BY_{n+2}$ and $BFRN_{n+2}$ for the preceding block had been transferred into the registers so designated in FIG. 2b. Thus the operations for steps 8–13 involve transfer of numbers (each via the trunk I to the cleared accumulator and from the latter via the trunk O to the receiving register) as follows:

A. From Buffer Registers to Intermediate Registers
The coordinate $BX_{n+2}$ is placed in $X_{n+2}$.
The coordinate $BY_{n+2}$ is placed in $Y_{n+2}$.
The feed rate number $BFRN_{n+2}$ is placed in FRN'.
B. Within the Buffer Section
The coordinate $BX_{n+3}$ is placed into $BX_{n+2}$.
The coordinate $BY_{n+3}$ is placed into $BY_{n+2}$.
The feed rate number $BFRN_{n+3}$ is placed into $BFRN_{n+2}$.

Thereafter at step 14 the tape reader 45 is started to supply successively the three numbers constituting command data for the following block, the tape reader signals being appropriately decoded and supplied via the trunk I and the CPU 62 to a trunk O from which they are routed to the registers labeled $BX_{n+3}$, $BY_{n+3}$ and $BFRN_{n+3}$. When this next block of data has been read from the punched tape, the reader 45 will produce an end-of-block signal EL which will stop the operation of the tape reader by apparatus which is not shown but which is familiar to those skilled in the art.

At this point in time, the stored and signaled numbers FRN', $X_{n+2}$ and $Y_{n+2}$ have been newly received in the intermediate storage section 69, and they may now be used to derive the necessary signals and numbers. From the explanation given above in this specification, it will be seen from FIG. 8 that the number LOOPP for any block of data may be found simply by dividing the feed rate number for that block into the constant 30,000, as indicated by Equation (8), supra. Thus, when the system comes to step 15 of the preparation sub-routine, the accumulator is cleared, the constant 30,000 is read in, the number FRN' is then read in and the resulting quotient of 30,000/FRN' is stored in the register LOOPP'. This represents the number of $\Delta T$ time periods which would elapse if the command data block now designated $B_{n+2}$ were executed with the axis velocities constant at the component values necessary to produce the path velocity designated by the feed rate number FRN'. This quantity LOOPP' is so labeled in FIG. 8.

The system then proceeds to steps 16 and 17 in which the velocity numbers for block $B_{n+2}$ are determined, signaled and stored. As shown by Equation (10) above, if the velocity number for the X axis of block $B_{n+2}$ is designated TPRX', then that value is equal to the product of $(.3333)(FRN')(X_{n+2} - X_{n+1})$. Accordingly, at step 16, the coordinate numbers $X_{n+2}$ and $X_{n+1}$ are read into the computer from the correspondingly labeled registers in the intermediate storage section 69 and their difference is computed and signaled in the accumulator. This difference is thereafter multiplied by the number FRN' brought from the corresponding register, and the resulting product is thereafter multiplied by the constant .3333. The resulting final product is stored in the register TPRX' as the new value of that number.

The system then proceeds to step 17 as shown in FIG. 9a and Table III where similar operations are carried out for the Y axis data in order to compute and store the velocity number TPRY' pertaining to block $B_{n+2}$.

After that, the system proceeds to steps 18 and 19 during which the changes in velocity for the X and Y axes in the transition from block $B_{n+1}$ to block $B_{n+2}$ are determined. As explained above in the derivation of Equations (13) and (14) these respective changes in axis velocities are determined simply by the difference between the first axis velocity, as programmed, and the second axis velocity, as programmed. Thus, at step 18 the number TPRX' is read into the cleared accumulator, the number TPRX is read in subtractively, and the resulting difference is stored in that register designated $\Delta$PRX in FIG. 2b. This velocity "jump" $\Delta$PRX is so labeled in FIG. 8. Similarly, the number $\Delta$PRY is computed and stored in the corresponding register during the operations of step 19.

At step 20 of the preparation sub-routine, it is determined whether the X or the Y axis will undergo the largest velocity change in the transition from block $B_{n+1}$ to block $B_{n+2}$. This is done at step 20 by reading into the cleared accumulator the previously stored number $\Delta$PRX as an absolute value, reading in subtractively the absolute value of the number $\Delta$PRY, so that the answer in the accumulator will be negative if $\Delta$PRY is greater in magnitude than $\Delta$PRX. If the resulting answer is negative, the system skips to step 22; and if it is not negative, the system proceeds to step 21.

If the answer after step 20 is not negative, therefore, the then-existing number $\Delta$PRX is transferred during step 21 into the register $\Delta$PRfa and the system thereafter skips to step 23. On the other hand, if the answer after step 20 is negative, then on step 22 the number $\Delta$PRY is read into the cleared accumulator and thence stored in the register $\Delta$PRfa. Therefore, when the system arrives at step 23 the number $\Delta$PRfa represents the change of the axis velocity component which will undergo the largest change when the operation is converted from data based on block $B_{n+1}$ to data based upon block $B_{n+2}$. As labeled in FIG. 8, it is assumed that $\Delta$PRX is greater than $\Delta$PRY, so $\Delta$PRfa is set equal to $\Delta$PRX.

During steps 23 to 28, the numerical value for the time span P (as labeled in FIG. 8) is determined and stored in the register P. It will be recalled that the number P is equal to one-half of the quantity of time periods $\Delta$TN which will be required for the velocity to change from TPRX to TPRX' along the line 81 having a slope A (assuming that the X axis is the fast axis). As noted by the foregoing Equation (15) and the description which follows it, the exact numerical value for the time span TR is derived from the relation $$TR = (\Delta\, PRFa) \times \frac{1}{A} = (\Delta\, PRFa)(K) \qquad (15)$$

Since $\Delta$PRfa remains in the accumulator at the end of either step 21 or 22, the next step 23 (see Table III) is performed simply by reading in the constant K from its storage register and multiplying, whereupon the number TR then appears in the accumulator. To "round up" this number, the answer digits in the accumulator to the right of the decimal point are sensed; if all have a value of zero, the system will skip to step 26, but if all of these digits are not zero, the signaled number TR is not a whole integer and thus the system proceeds to step 24.

At step 24 (Table III) the value of 1.0 is read into the CPU and added to the number TR then existing in the accumulator to form the sum TR + 1. And at the following step 25 all of the answer digits to the right of the decimal point in the accumulator are cleared or set to zero.

Therefore, the system arrives at step 26 with a hole number signaled on the output lines of the accumulator, such integer being the quantity TR or the quantity TR rounded up to the next higher integer if it was not originally a whole integer. At step 26 the constant "2" is read in as a divisor to divide the number then in the accumulator by two. If that number previously existing in the accumulator was an odd integer, the answer next appearing in the accumulator will contain the integer five in its tenths digit place; but if the original number was an even integer, the new answer will contain the value of zero in its tenths digit place. In executing step 26, the tenths digit place in the accumulator answer is sensed and if it is zero the system proceeds to step 27; otherwise, the system skips to step 28. If step 27 is performed, the quantity of 0.5 is simply read into the CPU and added to the number then existing in the accumulator. Thus when the system arrives at step 28, the answer ANS signaled by the accumulator is one such as xx.5, that is, it is an adjusted or rounded number representing the value of P as labeled in FIG. 8, and such that twice its value is an odd whole number. Thus, at step 28 the answer signaled by the accumulator is simply stored in the P register, as indicated by Table III.

Having computed and stored the value of P (which remains in the accumulator at the end of step 28), the system proceeds to step 29 where the value of 2P is computed and stored. As indicated by Table III and FIG. 9b, it is only necessary to read in the constant "2" as a multiplier whereupon the product 2P appears as the answer in the accumulator, and this answer is stored in the register 2P.

Since the quantity 2P is now available it is possible to determine the incremental amounts by which the X and Y axis velocities must be incrementally changed during each of successive periods $\Delta TN$ if they are to be uniformly changed by the total amounts $\Delta PRX$ and $\Delta PRY$ over a time span of 2P periods. Thus, at step 30 the number $\Delta PRX$ is read into the cleared accumulator and the number 2P is read in from its register as a divisor to compute the ratio $\Delta PRX/2P$ which, according to Equation (16) represents the incrementing number PRXI. This latter number appears in the answer register at the end of step 30 and is routed for storage in the register PRXI.

At step 31, similar operations are carred out to compute the incremental amount PYRI for the changing of the Y axis velocity during those individual time periods which will elapse during the time interval 2P. Therefore, the number PYRI is derived and stored in its register.

At step 32 (Table III and FIG. 9b) a determination is made as to whether there need be a progressive changing of axis velocities over the time span 2P as labeled in FIG. 8, or whether the largest jump in axis velocities in the transition from block $B_{n+1}$ to block $B_{n+2}$ is so small that the servo systems 21 and 31 can effect it without progressive incrementing of the velocity numbers. Merely as an example of such a determination, it is here considered that if the largest lump in axis velocity is less than the velocity change A which can be produced by the servos during one period $\Delta TN$, then progressive incrementing of the velocity numbers is not necessarily and the time span 2P as labeled in FIG. 8 may be viewed as constituting simply a single period $\Delta TN$ in which the largest jump in axis velocity is accomplished during a single time period. Therefore, at step 32 in Table III the number $\Delta PRfa$ is read into the cleared accumulator and the number A is read in subtractively to compute the difference $\Delta PRfa - A$. If the answer is not negative (indicating that $\Delta PRfa$ is greater than A) the system skips to step 35. But if the answer is negative (indicating that $\Delta PRfa$ is less than A) then the system proceeds to step 33.

At step 33, the accumulator is cleared so that the answer ANS signaled therefrom is zero, and that value is stored in the registers P, 2P and DECEL —thus setting all of the corresponding numbers to have a zero value. The system then skips to step 36.

On the other hand, if incrementing action will be required for the velocities during the last portion in the execution of block $B_{n+1}$, the system skips from step 32 to step 35 at which the number 1 is read into the accumulator and stored in the one-bit indicator DECEL. This indicator thus designates that when block $B_{n+1}$ becomes the block $B_n$ in current storage, velocity incrementing must begin when the number of elapsed periods or loops equals the active number LOOPB.

From step 35, the system proceeds to step 36 wherein the accumulator is cleared and the numbers LOOPP, PC and P are read in in order to compute the quantity LOOPS in accordance with Equation (18) supra. The answer is stored in the register LOOPS (and will later become LOOPB after transfer to current storage). The system then proceeds to step 37 where the quantity 2P is read in and added to the existing answer representing LOOPS in the accumulator, the new answer representing the value LOOPF according to Equation (19), this new answer being stored in the register LOOPF. LOOPS and LOOPF as time spans are labeled in FIG. 8.

Having completed these date-preparing operations, the system proceeds to step 38 where the indicator storage bit DRIND is set to one, thereby indicating that the processing of data for block $B_{n+1}$ has been fully completed and is ready within the intermediate storage section 69 to be transferred into the current storage section 70 when the currently executed block $B_n$ is completed. It will be seen, therefore, that whenever the indicator DRIND becomes a zero by virtue of step 010 during a transfer cycle of the servo routine program, the preparation sub-routine is performed and the data ready indicator DRIND is set to 1. Thereafter at step 39 the system exists to the supervisory routine of the computer.

It is appropriate to review the general operational sequences which occur in order to produce the uniform or smooth acceleration and deceleration which may be required at the transitions between any two successive path segments. This has been described previously with reference to FIG. 8, but it will now be apparent that when the path segment $D_n$ is being traveled by the controlled member 11 with the velocities $V_x$ and $V_y$ being equal to the velocity numbers PRXC and PRYC, the number of elapsed periods is dynamically signaled and changed by the number NLOOP described above. When that latter number becomes large enough to equal the previously derived and stored number LOOPB (see FIG. 8), then the servo routine performs step 033 during each succeeding period $\Delta T$. As a consequence, the velocity numbers PRXC and PRYC are incrementally changed during each period $\Delta T$ by the amounts XINC and YINC, so that the velocity numbers and the actual velocities $V_x$ and $V_y$ are reduced in small steps which, for $V_x$, approximate the sloped line 82 in FIG. 8. The valuues of the current incrementing numbers XINC and YINC have been computed (as the previous numbers PRXI and PRYI) in a fashion such that the axis programmed to have the largest step change in velocity actually is given small incremental changes during a succession of periods to change its velocity at a rate A, that value being predetermined and selected to be substantially the maximum acceleration which the axis servo system is capable of faithfully producing. Therefore, neither of the axis servos falls into an excessive error.

It is known that once the incrementing of the velocity numbers begins, the two axis velocities $V_x$ and $V_y$ will reach the values TPRX and TPRY which are required to produce the path velocity $V_{n+1}$ represented by the feed rate number $FRN_{n+1}$ for the next path segment $D_{n+1}$. Since, as shown in FIG. 8, the number LOOPC is equal to LOOPB + 2 PC, it is known that when the dynamically changing number NLOOP becomes equal to the number LOOPC, the execution of the servo block $B_n$ is finished. Therefore, as described above, when NLOOP becomes equal to LOOPC, the servo routine represented by Table II and FIGS. 5a-e goes through those steps designated 007 to 015, and the previously-prepared data for the block $B_{n+1}$ are transferred from the intermediate storage section 69 to the current storage 70. Repeated cycles through the servo routine therefore cause the physical execution of the block $B_{n+1}$ which is now treated as the new block $B_n$. The preparation routine is initiated when the intermediate-to-current storage transfer takes place, thereby to have data for the new block $B_{n+1}$ ready.

AN ALTERNATIVE, EQUIVALENT ANALOG EMBODIMENT

It will be appreciated that the best mode which I contemplate for carrying out the methods and apparatus according to the present invention is reflected in the exemplary embodiment described above with reference to FIGS. 1–9. That embodiment includes a programmed digital computer, as described, in a control system which is digital in nature, i.e., creates and utilizes various changeable digital signals. It is, however, not necessary in the practice of the invention to utilize a digital system, nor is it necessary to utilize a programmed digital computer. One skilled in the art may readily and routinely visualize and construct, from the teachings contained in the disclosure set out above, an "analog equivalent" of the digital system which has been described. To make this abundantly clear, FIGS. 10a through 10d illustrate a suitable analog control system which may be employed to carry out the methods, and to embody the apparatus, of the invention which is defined by the appended claims.

Generally speaking, FIGS. 10a and 10b show analog apparatus for receiving successive blocks of part program data and for deriving the signals required for each block prior to the time that the controlled member is actually moved along the corresponding path segment. FIGS. 10c and 10d, on the other hand, show analog apparatus for accepting the prepared signals (PRXC, XINC, LOOPC, LOOPP, DC, PRYC and YINC) to actively execute a given block of command data. Because the X axis portion (enclosed in a dashed line rectangle in FIGS. 10c and 10d) of the apparatus is identical to the Y axis portion (represented by a smaller dashed line rectangle), the latter has not been duplicated in detail. Of course, that portion of the apparatus which relates to the Y axis controls the Y axis servomotor YM and drives the machine tool member 11 along the Y axis as illustrated in FIG. 2a. The signals which are produced, changed and utilized in the analog system of FIGS. 10a through 10d represent numerical variables in the form of analog dc. voltages, as will be apparent from the description which follows. These signals will be identified by the same symbols employed in the earlier discussion of FIGS. 1 through 9, and where it is appropriate, the same reference characters from FIGS. 1–9 will be utilized in FIGS. 10a through 10d.

In the description which follows, it will be assumed that a command block $B_n$ is being actively executed by the X and Y axis systems shown in FIGS. 10c and 10d, these systems responding to previously established and existing dc. voltage signals which are designated in FIGS. 10b and 10c as PRXC, PRYC, XINC, LOOPC, YINC, LOOPB and DC. The manner in which those signals are established for the block $B_n$ will be explained in the latter portion of the description which follows.

As a means for measuring off successive time periods $\Delta T$ having a normal duration $\Delta TN$ which is adjustable, a dc. motor 100 is energized via an operational amplifier 101 according to the magnitude of an input voltage CLBFR. Feedback from a tachometer 102 to the inverting input of the amplifier makes the motor 100 run at a speed which is proportional to the variable input voltage CLBFR. The motor 100 drives a timing cam 104 which periodically closes timing contacts 105 to pick up a timing relay TIM. The time periods $\Delta T$ measured off between successive, momentary actuations of the relay TIM are thus inversely proportional to the voltage CLBFR, and when the latter has its normal value, such periods will be $\Delta TN$ in duration. The relay TIM has a plurality of contacts disclosed at various locations in FIGS. 10c and 10d, and such contacts are designated by the symbol TIM to which different numerical suffixes are added. The dc. voltage CLBFR in FIG. 10d corresponds to the digital signal CLBFR referred to in connection with FIGS. 1–9, although it may be noted that for simplicity the signal CLBFR in FIG. 10d causes the time periods $\Delta T$ to vary inversely in relation to changes in the voltage CLBFR, whereas in FIG. 2b above, the down counter 56, the oscillator 58 and the zero decoder 55 cause the time periods $\Delta T$ to vary directly in proportion to the changing magnitude of the signal CLBFR.

During the normal execution of a blocking path segment, it may be assumed that a counter 106 (FIG. 10c) has been reset to zero previously, such counter supplying its output through a digital-to-analog converter 108 to produce the signal NLOOPS. During each period $\Delta T$, and in response to momentary closure of the associated relay contacts TIM1, the contents of that counter will be increased by one, so that the voltage NLOOPS progressively increases in steps with time and represents the number of time periods $\Delta T$ which have been measured off since the execution of block $B_n$ began. As shown in FIG. 10c, the signals NLOOPS and LOOPC are supplied to an operational amplifier 109 operating as a saturating comparator and having a diode at its output which thus swings to a positive value only when the signal NLOOPS has increased sufficiently to equal or exceed LOOPC. When that happens (at the end of execution of the active block $B_n$), a positive pulse is applied through a capacitor to a one-shot multivibrator 110 which in turn momentarily energizes a transfer relay TR1. The output of that one-shot also triggers a second one-shot multivibrator 111 so as to momentarily energize a second transfer relay TR2; and this in turn triggers a third one-shot multivibrator 112 which momentarily energizes a transfer relay TR3. These transfer relays are employed to produce a transition from the execution of one block of data into the execution of the succeeding block of data as hereinafter described.

The signal PRXC, which is a dc. voltage representing the commanded X axis velocity in terms of distance per $\Delta T$, enters at the left of FIG. 10c and normally constitutes the only input signal to an operational amplifier 114 because the relay contacts RB1 are normally deactuated and in their illustrated positions. Thus, each time that timing contacts TIM2 close, the signal PRXC is supplied to the input of a sample-and-hold circuit 115 whose output is thus a voltage representing the velocity PRXC. In this mode (with RB1 contacts deactuated), the voltage PRXC at the output of circuit 115 is constant and unchanging. The latter signal is supplied as one input to an operational amplifier 116 which forms a part of an incrementing sub-system. Each time that contacts TIM3 are actuated, the output of amplifier 116 is supplied through normally closed holding relay contacts HR1 to a sample-and-hold circuit 118 whose output is a voltage here labeled XTC (and which corresponds to the previously described signal XTC). The outpu XTC is fed back via normally closed contacts TIM3a to a sample-and-hold circuit 119 having its output leading through normally open contacts TIM3b to the input of the amplifier 116. Thus, normally the output from circuit 119 is the existing value of XTC. When timing contacts TIM3, 3a and 3b actuate momentarily, however, the input to activate the circuit 119 is disconnected and its output is connected to the input of amplifier 116, so that the voltage at the output of the latter becomes PRXC + XTC and this is routed through the timing contacts TIM3 to the input of circuit 118. Therefore, as the timing relay TIM is momentarily actuated during each successive period $\Delta T$, the output voltage is incremented according to the relationship $$XTC_i = XTC_{i+1} + PRXC \qquad (41)$$

It will be recognized that the foregoing expression is fully tantamount to Equation (20) set forth hereinabove and that the incrementing sub-system here shown is a means for producing electric signals XTC representing a theoretical position which member 11 should occupy, and changing such signals once during each period $\Delta T$ by an incremental amount PRXC to represent a periodically advancing theoretical position XTC which the controlled member 11 should occupy.

Incidentally, for the sake of brevity and simplicity, the well-known operational amplifiers shown in FIGS. 10a through 10e have been purposely illustrated with the conventional feedback connections omitted. Since input operational amplifiers are assumed to be connected in the non-inverting mode.

The theoretical position signal XTC is algebraically combined with an actual position voltage XIN in order to produce a signal XERR representing the instantaneous position error of the member 11 along the X axis. For this purpose, the signal XIN is produced as a dc. voltage to represent by its magnitude that instantaneous position. As here shown, the pulse generator XPG supplies up and down count pulses to the reversible counter 40 (FIG. 10d) having its output passed through a digital-to-analog converter 120 which in turn produces a dc. voltage XIN proportional to the actual position of the member 11 as the latter moves back and forth along the X axis in response to rotation of the lead screw 22 driven by the servomotor XM. As shown in FIG. 10c, the two signals XIN and XTC are supplied with opposing polarity inputs to an operational amplifier 121 whose output is an error-representing voltage here labeled XERR.

To form the primary input signal for energizing the servomotor XM, the signal PRXC is supplied as one input to a multiplier circuit 122 (FIG. 10c) which receives as its second input the percent override signal PER and which produces an output voltage representing PER.PRXC. The signal PER comes from FIG 10d and is normally equal to the feed rate override voltage FRO which is selected to represent an adjustable constant by adjustment of a potentiometer 124. So long as the relay contacts labeled HR5 are in their illustrated, deactuated state, the dc. voltage PER is equal to the voltage FRO. Returning to FIG. 10c, the output from the multiplier 122 is passed to one input of a summing operational amplifier 125 in FIG. 10d. The error voltage XERR is normally supplied through normally closed contacts HR4 via an adjustable input resistor XTRMR to the input of this same operational amplifier 125. That input resistor makes the value XTRMR constitute the effective gain factor XTRIM on the input voltage XERR, i.e., makes XTRIM equal to XTRMR where the value of the latter is determined by adjusting the effective value of the resistor. Since the voltage PER.PRXC and the voltage XTRIM.XERR are both supplied to non-inverting inputs of the amplifier 125 which is set to have a gain here designatable as XGAIN, these two input voltages would normally cause the output signal XDAC to be equal to XGAIN [PER.PRXC + XTRIM.XERR].

To produce a "historical bias" input voltage XBIAS to the amplifier 125, two preselectable incrementing constants are represented by voltages XKBR and XKBH which are picked off of adjustable potentiometers 126 and 127 (FIG. 10c). The voltage XKBR is normally passed through the normally closed contacts HR2 to become the input signal XKBIAS to an operational amplifier 128 forming a part of an incrementing sub-system comprising timing contacts TIM4, a gate 129, and sample-and-hold circuits 130 and 131. The output of the sample-and-hold circuit 130 is normally a voltage representing the variable XBIAS. When the contacts TIM4 are actuated momentarily, however, that output is supplied as one input to the amplifier 128 whose responsive output voltage is thus the sum of XBIAS and XKBIAS. The sum is transmitted through the momentarily closed contacts TIM4 and the gate 129 (only if the latter is opened because the controlling voltage XERR applied thereto is greater than a predetermined magnitude, such as zero) and thence to the input of the circuit 130. From what has been said earlier about the incrementing sub-system which includes the sample-and-hold circuit 115, it will be understood that the XBIAS incrementing sub-system functions (if the error signal XERR is greater than zero) to make the XBIAS voltage change in steps such that $$XBIAS_i = XBIAS_{i-1} \pm XKBIAS \qquad (28)$$

Thus, the dc. voltage signal here labeled XBIAS is incrementally changed by the amount XKBIAS during each of successive measured time periods $\Delta T$, —in a fashion which is substantially the same as the incrementing of the digitally represented signal XBIAS described earlier. It is to be noted, however, that the incrementing of the dc. voltage XBIAS occurs only when the error voltage XERR is greater than a predetermined magnitude, e.g., zero. Moreover, the incrementing amount XKBIAS has a first value XKBR (obtained from potentiometer 126) when hold relay contacts HR2 are deactuated; and it has a second value XKBH (obtained from potentiometer 127) when the holding relay contacts are actuated during a holding mode (as hereinafter described).

Whenever the system is either put into or removed from a holding mode (as explained later), the XBIAS voltage is restored to zero and its historical incrementing begins anew. For this purpose, a gate 132 (FIG. 10d) establishes a controlling connection between the input the sample-and-hold circuit 130 and a point of zero voltage, i.e., ground. The gate 132 is momentarily enabled by a voltage pulse supplied thereto from a one-shot multivibrator 134 whose input is disconnected momentarily and then reconnected to a positive voltage each time the contacts HR3 of a holding relay are either actuated or deactuated. Momentary placement of the input to the circuit 130 at zero potential thus restores the dc. voltage XBIAS to a zero value.

As shown in FIG. 10d, the XBIAS signal is applied as an additive input to amplifier 125 and the output of the latter is transmitted to the servomotor XM to form a velocity servomechanism, there being a tachometer 25 driven by the servomotor and supplying its output voltage to an inverting input of that amplifier. The amplifier 125 by its feedback connection (not shown) is arranged to produce an overall gain factor which may be designated XGAIN. Thus, it will be apparent that the dc. output voltage from the amplifier 125, represented by the symbol XDAC and serving to energize the motor XM, varies according to the relation $$XDAC = XGAIN \; [PER.PRXC + XTRIM.XERR + XBIAS] \qquad (29)$$

The gain factor XTRIM within the brackets of the foregoing equation is either the gain XTRMR or XTRMH numerically produced by adjustment of the input resistors correspondingly labeled in FIG. 10d, depending upon whether the relay contacts HR4 are deactuated or actuated when the system is in a non-holding or a holding mode. Moreover, as indicated earlier with respect to the holding relay contacts HR5, the gain factor PER within the brackets of Equation (29) will be equal to the voltage FRO or will be zero, depending upon whether the contacts HR5 are deactuated or actuated when the system is respectively in a non-holding or a holding mode. That is, in the holding mode the signal XDAC will specifically have the value of $$XDAC = XGAIN \; [0 + XTRIM.XERR + XBIAS] \qquad (38)$$

where XTRIM is equal to XTRMH. Thus, the analog apparatus as thus far described will result in servomotor XM driving the controlled member 11 along the X axis at a velocity proportional to XDAC, where XDAC is a voltage made up according to the Equation (29) set out above, but wherein this equation takes on different gain factors shown by Equation (38) when the system is in a holding mode.

In the analog apparatus of FIGS. 10c and 10d, means are provided for lengthening the durations of the successively measured-off time periods $\Delta T$ whenever the position error of the controlled member 11 exceeds a predetermined threshold which is represented by a voltage LERRX, and conversely, means are provided for shortening the periods $\Delta T$ whenever the error threshold is not exceeded and the periods are greater than a predetermined normal minimum value. The threshold voltage LERRX is created so as to vary as a monotonic function of the commanded velocity signal PRXC. For this purposes, the voltage PRXC is supplied to an operational amplifier 136 (FIG. 10c) having an overall gain factor of 4 and having a second input voltage representing the number 8 (the latter voltage coming from a potentiometer 137). Thus, its output voltage is LERRX, where $$LERRX = 4(PRXC + 8) \qquad (24)$$

The threshold voltage LERRX is supplied to an operational amplifier 138 which also receives the error voltage XERR. That operational amplifier is operated in a saturation mode such that whenever the voltage XERR exceeds voltage LERRX, the output of amplifier 138 will become fully positive, and only under these circumstances an output diode will become conductive to energize a relay RA. Thus, if at any time the error XERR exceeds the threshold LERRX, the relay RA will be actuated and its contacts RA1 will transfer to switch a voltage CLINC from an inverting to a non-inverting input of an operational amplifier 140. The voltage CLINC represents a constant, but one which may be adjusted by setting a potentiometer 139 from which it is produced. The amplifier 140 forms a part of an incrementing sub-system which includes timing contacts TIM5 and sample-and-hold circuits 141 and 142. From what has been said above, it will be understood that the output voltage CLMOD from the sample-and-hold circuit 141 will be incremented once during each successive time period $\Delta T$, in response to actuation of the timing contacts TIM5. That output voltage CLMOD will thus change according to the relationship $$CLMOD_i = CLMOD_{i-1} + CLINC \qquad (32)$$

The foregoing Equation (32) with positive incrementing of the quantity CLINC will obtain when relay RA is actuated; but on the other hand, when relay RA1 is deactuated and the voltage CLINC is applied to the inverting input of amplifier 140, then Equation (32) will be converted into a subtractive operation, namely:

$$CLMOD_i = CLMOD_{i-1} - CLINC \qquad (37)$$

A Zener diode 144 at the output of circuit 141 prevents the voltage CLMOD from becoming smaller than zero; and likewise that Zener diode will reversely break down to keep the voltage CLMOD from exceeding a predetermined maximum positive value. Thus, the signal CLMOD is limited such that negative incrementing cannot reduce it below zero and positive incrementing cannot increase it above a predetermined maximum value.

The voltage CLMOD is applied as a subtractive input to an operational amplifier 145 which receives as its main input on a non-inverting terminal a voltage signal representing the value 200.PER, and whose output voltage thus becomes the signal CLBFR which is the command voltage applied to amplifier 101 to determine the speed of the dc. motor 100. Under normal circumstances if the modifying voltage CLMOD is zero, then CLBFR will be proportional and be determined solely by the signal 200.PER (which actually is 200.FRO, where FRO is usually equal to PER). The latter voltage 200.PER is produced by an operational amplifier 146 having a gain of 200 and receiving as its input the voltage FRO representing a selected, adjustable constant picked off from the potentiometer 124. If the voltage CLMOD is zero and the signal FRO is 1.0, CLBFR thus becomes 200 times the gain of the amplifier 145, and that value of CLBFR will cause the motor 100 to run at a speed which makes the $\Delta T$ periods have normal durations $\Delta TN$.

In operation, whenever the error voltage XERR exceeds the threshold level of LERRX and the relay RA is actuated, the voltage CLMOD is incrementally increased by the amount CLINC during each of the successive time periods $\Delta T$ measured off by the timing cam 104. Thus, so long as a "grey error" exists (LERRX > XERR), the relay RA will be actuated by the output voltage from amplifier 138, and the voltage CLMOD will become larger during each period ΔT by implementation of Equation (32). Assuming that the input 200.PER to amplifier 145 remains constant, therefore, the voltage CLBFR will be incrementally reduced during each period ΔT, the motor 100 will run at a slower speed, and the contacts 105 will close less frequently, so that the periods ΔT will be progressively lengthened. During any period ΔT when a grey error exists, and as previously explained, the next and succeeding time periods ΔT will be incrementally increased. On the other hand, if during any period ΔT a grey error does not exist and the relay RA is deactuated so that its contacts RA1 supply the voltage CLINC to a subtractive input of amplifier 140, the voltage CLMOD will be made smaller by the amount CLINC (until and unless CLMOD reaches zero, and is clamped by Zener diode 104 conducting forwardly). Thus, the voltage CLBFR will be made larger, the motor 100 will run faster, the timing contacts 105 will close more frequently, and the subsequent time periods ΔT will be progressively reduced in duration. The apparatus of FIG. 10b therefore provides a means for modifying the operation of the time period measuring apparatus so as to progressively increase the durations of the successively measured time periods whenever the position error signal XERR exceeds a predetermined threshold value LERRX.

The analog apparatus illustrated in FIGS. 10c and 10d also may be put into a holding mode during which operative conditions change to bring the controlled member 11 to rest precisely at the last-signaled theoretical positon represented by the voltage XTC. If a human operator closes a manual hold switch 148 (FIG. 10c) the relay HR will be energized. In consequence, relay contacts HR1 (adjacent the sample-and-hold circuit 118) open so that incremental increasing of the theoretical position voltage XTC is terminated despite continued periodic closing of the contacts TIM3. The normally closed holding relay contacts HR6 (adjacent counter 106) will be opened during a holding mode to prevent periodic increasing of the voltage NLOOPS despite continued periodic closing of the contacts TIM1. The contacts HR3 (shown adjacent the one-shot 134) cause the voltage XBIAS to be restored to zero as a new starting value; and the contacts HR2 transfer so that the incrementing voltage XKBIAS is switched from the running value XKBR from potentiometer 126 to a holding value XKBH picked from potentiometer 127. Thereafter as the timing contacts TIM4 continue to be actuated periodically, and so long as the XERR voltage is greater than zero to open the gate 129, the voltage XBIAS is incremented by the amount XKBH during each period ΔT. Further, the normally closed contacts HR7 (adjacent the amplifier 140 in FIG. 10d) are opened during the holding mode so that the voltage CLMOD ceases to be incremented and the durations of the periods ΔT are frozen at the previously established length during the holding mode. Still further, the contacts HR5 of the holding relay HR will be actuated during holding so that the voltage PER is converted to a zero value, and so that the multiplier 122 causes the signal PER.PRXC to change to a zero value. Finally, the contacts HR4 of momentarily HR (when actuated in a holding mode) switch the resistor XTRMR out of the input circuit for amplifier 125, and substitute the resistor XTRMH in its place. This results in the gain factor supplied to the voltage XERR by the amplifier 125 being changed from a "running value" to a "holding value." The voltage XDAC and the speed of the servomotor XM are thus changed to function according to the formula $$XDAC = XGAIN [0 + XTRIM.XERR + XBIAS] \quad (38)$$

In the foregoing equation, the individual gain factor XTRIM is now XTRMH, rather than XTRMR, where the former is preferably greater than the latter. Thus, the servomotor XM will run until the position of the controlled member 11 agrees exactly with that represented by the now-unchanging voltage XTC, and it will stop the member 11 in that position. When the hold relay HR is again deenergized by the opening of the switch 148, the system will revert to its original running mode, but the XBIAS signal will be restored (by transfer of contacts HR3) to an initial zero starting value.

During normal running of the system, it is possible to have the position error of the controlled member 16 not only exceed the "grey error" threshold LERRX, but also to exceed a second "black error" threshold HERRX. The value of this latter threshold is signaled in FIG. 10c at the output of an amplifier 150 which receives the voltage LERRX and doubles it to produce the second threshold voltage HERRX. Thus, it will be plain that $$HERRX = 8(PRXC + 8) = 2.LERRX \quad (25)$$

The threshold voltage HERRX is compared with the error voltage XERR by an operational amplifier 151 operated in a saturating mode and having a diode in its output circuit such that it energizes the holding relay HR when, and only when, the error XERR exceeds the threshold HERRX. When the relay HR is so energized, the system is automatically placed in a "holding mode" as described above. The timing contacts 105 continue to be closed at measured time intervals ΔT which remain unchanged during the holding mode because the contacts HR7 prevent changing of the modifier voltage CLMOD. The signal NLOOPS remains constant during holding because the contacts HR6 are opened. And the signal XTC remains at the value it acquired prior to energization of the relay HR. Thus, in the fashion described above, the servomotor XM will bring the member 11 to a position at which the error signal XERR is reduced below the "black error" threshold HERRX, whereupon the relay HR will be deenergized and the system will return to its running mode in a "grey error" condition. The periodic incrementing of the signal XTC will occur less and less frequently so long as the grey error threshold is exceeded, and in this fashion the error XERR will be restored to a value below the grey error threshold LERRX. Thus, the system will ultimately restore itself to a normal running mode, during which the voltage CLMOD will be decremented, thereby to shorten the time periods ΔT until they are restored to the normal, minimum value ΔTN.

If the transition from the currently executed path segment $B_n$ to the next succeeding path segment $B_{n+1}$ involves a step change in the value of PRXC which the velocity servomechanism cannot instantaneously accommodate, then the automatic acceleration/deceleration portions of the system will become operative. As shown in FIG. 10c, the voltage LOOPB is supplied through a gate 154 which is opened by the enabling voltage signal DC if such a transition in velocities is required from one block segment to the next. The signal LOOPB passes through the enabled gate 154 to an operational amplifier 155 which acts in a saturating mode as a comparator for the signals NLOOPS and LOOPB. When the former signal equals and exceeds the latter, a diode in the output of amplifier 155 becomes conductive whereby a relay RB is picked up. As a result, the contacts RB1 in FIG. 10c transfer to their actuated positions, whereupon the associated incrementing sub-system (comprising the operational amplifier 114, the sample-and-hold circuit 115, and a sample-and-hold circuit 115a) becomes effective. It will be seen that normally the input and output of circuit 115a is the PRXC voltage which appears at the output of circuit 115. When timing contacts TIM2 actuate, the output PRXC from circuit 115a is supplied as one input to the amplifier 114 and the voltage XINC is supplied as a second input through the actuated RB1 contacts. The sum of the two voltages is thus passed through now-closed contacts TIM2 to the input of the sample-and-hold circuit 115 so that the output of the latter is changed by an incremental amount equal to the voltage XINC. It will be recalled from the description of the preferred embodiment that the signal XINC is the amount by which the velocity of the controlled member along the X axis is to be increased during each of the successive time periods $\Delta T$. Therefore, as successive periods $\Delta T$ are measured off by the timing cam 104 and the timing contacts 105 actuate the relay TIM, the X axis velocity number PRXC is incrementally changed by the amount XINC according to the relationship $$PRXC_i = PRXC_{i-1} + XINC \tag{39}$$

As PRXC incrementally increases or decreases (depending upon whether XINC is positive or negative) during each of the successive periods $\Delta T$, the effect is to increase or decrease the signal PER.PRXC supplied as an input to amplifier 125. Therefore, the velocity of the motor XM and the movable element 11 is progressively increased or decreased. Otherwise, the system functions in the same manner as previously described. In this way, when the system is in an acceleration or deceleration mode because the relay RB is actuated, the velocity of the element 11 will progressively increase or decrease as represented at 81 and 82 in FIG. 8. As hereinafter explained, the relay RB will be dropped out to terminate the acceleration or deceleration mode whenever the total change in velocity results in the X axis velocity of member 11 reaching the value designated by the currently executed block of command data.

The path segment $B_n$ currently being executed by movement of the controlled member 11 is completed when the periodically incremented voltage NLOOPS equals or exceeds the voltage LOOPC, at which time the relays TR1, TR2, TR3 are momentarily actuated in rapidly timed succession as set forth above. When relay TR1 momentarily picks up, its contacts TR1b close to reset the counter 106 to zero and thus to reset the voltage NLOOPS to zero. The counter 106 begins counting anew as soon as the transfer relay TR1 drops out.

The analog apparatus in FIGS. 10a and 10b has (prior to the actuation of transfer relay TR1) produced preparatory signal voltages representing variables to be used in the execution of the succeeding path segment. That is, if block $B_n$ is currently being executed by operation of the apparatus in FIGS. 10c and 10d, then preparatory voltages based on the command data of block $B_{n+1}$ are ready to be used when the execution of block $B_n$ is completed. These preparatory voltages are labeled in FIG. 10b as TPRX, TPRY, PRXI, LOOPF, PRYI, LOOPS and DECEL. When relay TR1 is momentarily actuated, its series of contacts TR1a shown in FIG. 10b momentarily close to transfer such voltages to the inputs of respective sample-and-hold circuits 157 (labeled S&H in FIG. 10b). The outputs of such sample-and-hold circuits thus change from their previous values to new values, and in the terminology which has been employed earlier, the preparatory voltages become new values for the control voltages PRXC, PRYC, XINC, LOOPC, YINC, LOOPB and DC. Thereupon, the apparatus of FIGS. 10 c and 10d will begin and execute the path segment previously designatable as $B_{n+1}$ and which has now become the new active path segment $B_n$.

After the transfer relay TR1 has been momentarily actuated and the apparatus of FIGS. 10c and 10d begins the execution of a new block segment, the signals on the left sides of contacts TR1a (FIG. 10b) are no longer needed since they represent the data for the path segment now being actively executed. Thus, it is desirable that the circuitry establish new values for those signals which will become values for the new block designatable $B_{n+1}$ and which was previously designatable as $B_{n+2}$.

Therefore, as the next operation in point of time, the transfer relay TR2 momentarily picks up, as previously explained. Its contacts TR2$_a$ (FIG. 10a) momentatily close to transfer into sample-and-hold circuits 158 and 159 the then-existing voltages TRPX and TPRY. These voltages represent values for the block now designated $B_n$ (and designated $B_{n+1}$ prior to actuation of relay TR1). Thus when they appear at the outputs of circuits 158 and 159, they are designated PRXC and PRYC, as labeled. Also, the contacts TR2b momentarily close to store a voltage P in a sample-and-hold circuit 160. The voltage P is at this instant a value corresponding to the now-active block $B_n$ (previously block $B_{n+1}$ prior to actuation of relay TR1) so that the output of circuit 160 is labeled PC.

Next in point of time, the transfer relay TR3 momentarily picks up. Its contacts TR3a (FIG. 10a) close to transfer signals from a decoder and buffer storage 161 to intermediate storage registers 162. These signals are command block data in digital form previously read into registers 161 from the tape reader 45 and they correspond to the presently designated block $B_{n+1}$ (previously designated $B_{n+2}$ prior to actuation of relay TR1). The pickup of relay TR3 also closes contacts TR3b (FIG. 10a) to supply a positive voltage pulse through a time delay circuit 164 to the "start" terminal of the tape reader 45. After contacts TR3a reopen, therefore, the tape reader 45 starts and reads in a new block of data to the decoder and buffer storage registers 161. That new block is currently designatable $B_{n+2}$ (previously $B_{n+3}$).

At this point in time (after momentary actuation of the transfer relay TR3), the intermediate storage registers 162 hold digital representations of command data for the block previously designatable $B_{n+2}$ and how designated $B_{n+1}$. These data include digital representations of path velocity V, path segment distance D, and the X and Y axis components DX and DY of that path segment—as explained earlier. These latter signals are passed through respective digital-to-analog converters collectively shown at 165 and which respectively produce dc. voltages corresponding in value. The voltages V and D are both supplied to each of two divider circuits 168 and 169. The divider circuit 169 produces an output signal representing the quotient D/V which is equal to 1/FRN, as explained earlier with reference tp Equations (3) and (4). The signal 1/FRN represents the time which will be required to execute the path segment represented by the $B_{n+1}$ block of data according to the relationship $$T_p = \frac{D}{V} = \frac{1}{FRN} \qquad (4)$$

In order to derive the voltage which represents the total number of time periods $\Delta TN$ which will be required to execute the commanded path segment at the commanded velocity V, the voltage 1/FRN is multiplied by the quantity of 30,000 and this is performed by an amplifier 170 having a gain of $3 \times 10^4$. Thus, the output of amplifier 170 is a voltage representing the quantity LOOPP which is derived according to the relationship specified above in Equation (8), namely:

$$LOOPP = \frac{T_p}{\Delta TN} = \frac{60}{FRN} \times \frac{1}{\Delta TN} = \frac{60}{FRN(.002)} = \frac{30,000}{FRN} \qquad (8)$$

On the other hand, the divider circuit 168 produces a voltage representing the quotient V/D and thus representing the value of FRN as indicated by Equation (3) set out above. The latter voltage is passed through an amplifier 171 having a gain of 0.333 to perform the multiplication (0.333)(FRN). The output from the amplifier 171 is supplied as one input to each of two multiplier circuits 172 and 173 which respectively receive as their other inputs the voltages representing DX and DY produced by the D/A converters 165. Therefore, the output of the multiplier circuit 172 is a voltage representing the value of TPRX, where

TPRX = (0.333)(FRN).DX

The foregoing expression will be seen to be identical to Equation (10) set out above, recalling that DX is equal to $(X_{n+1} - X_n)$. Merely for the sake of brevity, it has been assumed in FIG. 10a that the part program punched tape fed to the tape reader 45 carries block data which includes the X and Y axis components DX and DY rather than the end point coordinates $X_n$, $Y_n$ for each path segment. Thus, it will be understood that the multiplier 172 in FIG. 10a produces an output voltage TPRX representing a velocity command number, expressed in distance per $\Delta T$, for the block now designated $B_{n+1}$.

The multiplier 173 in FIG. 10a similarly produces an output voltage TPRY representing the Y axis velocity number according to the relationship

TPRY = (0.333)(FRN).DY

This value of TPRY is obtained according to the relationship expressed above in Equation (11), and it represents the Y axis velocity for the block presently designatable $B_{n+1}$ (and previously designated $B_{n+2}$ prior to actuation of transfer relay TR1).

Due to the previous closure of contacts TR2a, sample-and-hold circuits 158 and 159 are presently producing output voltages here designated PRXC and PRYC for the currently active block $B_n$. Such signals also represent the signals TPRX and TPRY, respectively, for that block of data which was previously designated $B_{n+1}$. The outputs from circuits 158 and 159 are supplied as respective inputs to operational amplifiers 175 and 176 which function as algebraic adders. The other two respective inputs are the voltages TPRX and TPRY which represent axis velocities for the blocks presently designatable $B_{n+1}$. Thus, the output voltages from amplifiers 175 and 176 are correctly designatable as $\Delta$PRX and $\Delta$PRY according to the relationships $$\Delta PRX = TPRX' - TPRX \qquad (13)$$

$$\Delta PRY = TPRY' - TPRY \qquad (14)$$

It will be recalled from the earlier description that the symbols TPRX and TPRY in the foregoing expressions represent the quantities previously derived for block $B_{n+1}$ and which is now block $B_n$; and that the quantities TPRX' and TPRY' correspond to the signals labeled TPRX and TPRY in FIG. 10a.

As shown in FIGS. 10a and 10b, the voltages $\Delta$PRX and $\Delta$PRY are applied to a "select larger signal" circuit 178 whose output then represents the largest one in magnitude of those two voltages and which is here labeled $\Delta$PRfa. The latter voltage is supplied as one input to a multiplier circuit 179 whose other input is a preselected constant, i.e., a fixed voltage of magnitude 1/A representing an acceleration constant K—this voltage being picked from an adjustable potentiometer 177. The output of the multiplier 179 is therefore a voltage representing the quantity 2P in view of the relationship explained hereinabove to the effect that the quantity TR in Equation (15) is essentially equal to the quantity 2P. Thus, in FIG. 10b the apparatus functions to produce the signal 2P according to the expression $$2P = TR = \frac{\Delta PRfa}{A}$$

The voltage 2P at the output of the multiplier 179 is supplied as one input to each of two divider circuits 180 and 181; these dividers respectively receiving the voltages $\Delta$PRX and $\Delta$PRY as their second inputs. The output voltages from the dividers 180 and 181 thus represent the quantities PRXI and PRYI for the block now designated $B_{n+1}$ and these voltages are routed to contacts TR1a of the transfer relay TR1, where they are ready for transfer into the associated ones of the sample-and-hold circuits 157. The dividers 180 and 181 thus function according to the relationships $$PRXI = \frac{\Delta PRX}{2P} \qquad (16)$$

$$PRYI = \frac{\Delta PRY}{2P} \qquad (17)$$

In addition, the voltage 2P is routed as an input to a divider circuit 182 which simply divides by two to produce an output voltage P. That output voltage is supplied as one input to a summing amplifier 184 which receives as a second input the voltage signal LOOPP created at the output of the amplifier 170. The summing amplifier 184 receives as a third input the voltage PC produced by the sample-and-hold circuit 160. It will be recalled that the voltage PC represents a number applicable to the currently active block $B_n$ and corresponds to the signal P produced when that now-active block $B_n$ was designated as $B_{n+1}$. See FIG. 8 for this relationship. The operational amplifier 184 therefore produces an output voltage representing the quantity LOOPS which in magnitude is $$\text{LOOPS} = \text{LOOPP} - \text{PC} - \text{P} \tag{18}$$

The signal LOOPS is thus ready at the one of the relay contacts TR1a for transfer to the associated one of the sample-and-hold circuits 157.

A voltage variable to represent the quantity LOOPF is to be derived according to the relationship $$\text{LOOPF} = \text{LOOPS} + 2\text{P} \tag{19}$$

For this purpose, the voltage 2P and the voltage LOOPS are supplied as inputs to a summing operational amplifier 185 which produces the output voltage LOOPS and holds it ready for transfer through the contacts TR1a to the associated one of the sample-and-hold circuits 157.

In order to create the signal DECEL which is to exist when the change in axis velocity from block $B_n$ to block $B_{n1}$ exceeds the change in velocity which the X and Y axis servomechanisms can accommodate in one time period ΔT, the voltage ΔPRfa is supplied additively to an operational amplifier 186 which receives a voltage A representing a selectable constant picked off of a potentiometer 188. The voltage A is supplied to the inverting input of the amplifier 186 which operates in a comparing or saturating mode. An output diode for the amplifier 186 will thus become conductive only if ΔPRfa exceeds A and will thus produce a positive voltage on a conductor 189 only in the latter event (and through an inverter 190, a negative voltage at 191). Thus, a flip-flop 192 which receives the voltages on conductors 189 and 191 will be either set or reset when ΔPRfa exceeds or falls below the value of A. Only when the flip-flop 192 is in its set condition, it produces a positive voltage here labeled DECEL. The existence of that positive voltage signifies that the transition from the block now designated $B_n$ to the block $B_{n+1}$ will require automatic acceleration/deceleration action. The signal DECEL will be transferred into an associated sample-and-hold circuit when the relay contacts TR1a are next momentarily actuated, and thus the signal DC will then become a positive voltage (to open the gate 154) if the signal DECEL is positive.

The foregoing makes it clear that after a given block of prepared data (i.e., the signals on the left sides of the relay contacts TR1a in FIG. 10b) have been transferred to the associated sample-and-hold circuits 157 for active execution, the new values of those same signals for the next succeeding block are established on those same terminals, where they are ready for subsequent transfer and usage.

The individual components which are shown throughout FIGS. 10a through 10d (e.g., operational amplifiers, sample-and-hold circuits, multipliers, counters, etc.) are all per se known to those skilled in the art. It is thus unnecessary to describe each of these components in greater detail. Of course, variations of the system shown in FIGS. 10a through 10d may be readily adopted by those skilled in the art; and as one example, the various relays which have been shown and described may be replaced, if desired, by solid state switching devices. It will be seen that the system of FIGS. 10a through 10d functions wholly with analog circuits and analog voltage signals but in a manner which is fully parallel to the operation of the digital system described earlier with reference to FIGS. 1 through 9. Noteworthy is the fact that in both the embodiment of FIGS. 1–9 and the embodiment of FIGS. 10a through 10d, there are means for measuring off successive time periods ΔT in actual time, with a normal duration of ΔTN. Moreover, there are means for creating axis velocity signals PRXC and PRYC, together with means for creating changing theoretical position signals XTC and YTC by periodically incrementing the latter during each period ΔT by the amount PRXC and PRYC. Still further in both embodiments, there are means for creating actual position signals XIN and YIN, together with means for forming position error signals XERR and YERR which are respectively equal to the differences XTC - XIN and YTC - YIN. Finally, in both embodiments there are means for automatically and successively increasing the durations of the time periods ΔTN whenever the position error of either axis exceeds a predetermined threshold value LERRX or LERRY; and there are means for placing the system in a holding mode whenever an axis position error exceeds a second predetermined higher threshold HERRX or HERRY. While the system of FIGS. 10a –10d is not a preferred embodiment because it may involve more manufacturing expense and labor as compared to the embodiment of FIGS. 1–9, the second embodiment of FIGS. 10a through 10d confirms that those skilled in the art may practice both the apparatus and the methods of the present invention with analog components and signals and without employing a programmed digital computer.

RESUME'

The method and apparatus for numerically controlled movements of a member along two or more axes is characterized by the formation and signaling of speed-designating numbers XDAC and YDAC, their conversion into analog counterparts $E_x$ and $E_y$, and the application of the latter as inputs to velocity servos (rather than position servos) which drive the member along the respective axes. Because velocity is directly and accurately controlled, the completion of a path segment $D_n$ represented by a given block of command data $B_n$ is detected by first determining the quantity LOOPC of time periods ΔT required for the member to move the distance designated at the velocity designated by the command data, and then driving the member until such quantity of time periods are measured off in actual time.

The speed representing voltages are formed, however, by the summation of a velocity term (PER.PRXC) and a position error trim term (XTRIM.XERR), with the error from the theoretical position ($XTC_i = XTC_{i-1} + PRXC$) being dynamically recomputed and signaled during each period ΔT. If the error XERR should exceed a predetermined threshold (LERRX), then the time periods ΔT are lengthened, so that all axis actual velocities are reduced from the commanded values and the servos can catch up. This does not destroy the accuracy of the position vs. ΔT relationships but merely results in the system taking slightly more total time to complete a given path segment. When, as a result of lengthening the periods ΔT, the position error is reduced below the grey threshold LERRX, those periods are shortened progressively to their normal duration.

If, on the other hand, a greater predetermined position error threshold (HERRX) is exceeded, the system goes into a holding mode, so that the theoretical position XTC is not advanced and the primary velocity term (PER.PRXC) is made zero. The trim term (XTRIM.XERR) therefore keeps the speed signal $E_x$ at a value to reduce the error below that second threshold and the system restores itself to the running mode.

The speed-representing voltage ($E_x$) for an axis (X) is formed from said summation which preferably includes a third term (XBIAS) incrementally changed during any ΔT period when the position error exceeds a predetermined value (which in the foregoing example is zero). This provides compensation for long term changes in the physical characteristics of the servo system, and causes self-modification of the speed voltage $E_x$ if for any reason the main velocity term (PER.PRXC) does not actually produce the physical velocity called for.

"Holding" of the system is accomplished by setting the velocity term (PER.PRXC) to zero, so that the position term (XTRIM.XERR) brings the member to a stop at the last-signaled theoretical position, and at which the error number (XERR) becomes zero. But when holding begins, the gain factor (XTRIM) for the position error term is changed from its preselected running value (XTRMR) to a higher preselected holding value (XTRMH) so that closing up to zero error is reliably and quickly effected. Moreover, the historical term (XBIAS) is always started over at zero as the system changes from a running to a holding mode, or vice versa, and the per ΔT incrementing number (XKBIAS) for that term is given one predetermined value (XKBR) during running and a different value (XKBH) during holding. The dynamic responses to position errors during the running and holding modes are thus different.

To provide automatic acceleration and deceleration and smooth out the velocity jumps at the transitions between path segments as programmed, the time span 2P in periods ΔT, required to make the largest velocity jump in steps of A per ΔT, is determined —where A is a predetermined maximum acceleration number. The incremental velocity changes ΔPRX/2P and ΔPRY/2P are signaled as numbers XINC and YINC. The path segment is executed at the programmed velocities $V_x$ and $V_y$ (proportional to PRXC and PRYC) until the instant that the number of elapsed periods equals a number LOOPB derived from $P_n$ and $P_{n-1}$, whereupon the velocity numbers PRXC and PRYC are incremented by XINC and YINC during each of the following 2P time periods and until the path segment $D_n$ has been fully traveled. The next segment is immediately started with the $V_x$ and $V_y$ velocities at the required new values.

The method and apparatus are intended and capable of simultaneously controlling 3, 4 or 5 axis motions, although only two axes X and Y have here been treated in the interest of brevity and as an example. Moreover, the method and apparatus in their broader aspects may be viewed as employed to control the distances and velocities of a member moving along a single axis, say X, if one merely considers that the Y axis components for several path segments are zero so that $D_n = DX_n$ and $V_n = V_x$. For this reason, some of the appended claims make reference to only one axis, called for simplicity the X axis. Moreover, while several very advantageous features have here been disclosed in a single embodiment, it will be understood that not all must actually be employed together. For example, the servo input number XDAC might be formed as the sum of PER.PRXC + XTRIM.XERR (rather than PER.PRXC + PRXC + XTRIM.XERR + XBIAS), the historical number signals XBIAS and their incremental changing being omitted in some installations. Thus, some of the appended claims define methods or apparatus with certain features or combinations of features without including or being limited to others of the several features here disclosed in the preferred embodiments.

I claim:

1. The method of controlling the velocity and position of a member movable along an axis X in accordance with a block of command data signals numerically designating a desired velocity V, said method comprising:

a measuring off successive periods ΔT in actual time, b producing first electric signals representing a velocity number PRXC proportional to the desired velocity V, c producing second electric signals and changing them once each period ΔT to represent a periodically advancing theoretical position XTC which said member should occupy.

d producing third electric signals representing during each period ΔT the then-existing numerical error XERR between the theoretical position XTC and the actual position at which the member is located, e applying to a velocity servo which is coupled to said member, an input signal which is proportional to the sum of (a) a first term proportional to the number PRXC, and (b) a second term proportional to the number XERR, and f in response to said signaled error XERR exceeding a predetermined threshold value HERRX during any given period ΔT, foregoing said changing of said second signals in step (c), omitting said step (e), and instead applying to said servo an input signal which is proportional only to the error number XERR.

2. The method of controlling the velocity and position of a member movable along an axis X in accordance with a block of numerical command data designating the desired velocity V, said method comprising:

a measuring off successive time periods in actual time, said periods having a normal duration ΔTN, b deriving from said command data first electric signals representing a velocity number PRXC designating said velocity V in units of distance per ΔTN, c deriving from said command data electrical second signals representing a theoretical position number XTC and changing such signals to increment the represented number by the amount PRXC during each time period, such that $XTC_i = XTC_{i-1} + PRXC$, d sensing the actual instantaneous position XIN of said member, e driving said member along the axis at a velocity which is proportional to the sum of (A) a first term proportional to the number PRXC represented by said first signals and (B) a second term proportional to the difference between the instantaneous theoretical position XTC represented by said second signals and the sensed instantaneous actual position XIN, and f modifying the performance of said steps (c) and (e) to effectively treat the number PXRC as being zero whenever said difference exceeds a predetermined threshold value HERRX.

3. The method defined in claim 2 further characterized in that said step (f) is carried out only whenever said difference exceeds said threshold value for pre-established number of said time periods.

4. The method of controlling the velocity and position of a member movable along an axis in accordance with a block of command data designating the desired velocity V, said method comprising:

a producing from said command data first electric signals representing a velocity number PRXC denoting said velocity V in units of distance per time period $\Delta TN$, where $\Delta TN$ is a preselected normal duration, b measuring off successive time periods $\Delta T$ in actual time with the normal duration of each period being $\Delta TN$, c representing by second electric signals a number XTC designating the theoretical desired position of said member, c1 utilizing said first signals from step (a) to change said second signals to increment the number XTC by the amount PRXC during each time period, d sensing and representing numerically by third electric signals the actual instantaneous position XIN of said member, e computing from said second and third signals and producing fourth electric signals representing the position error $XERR = XTC - XIN$ once during each of the periods $\Delta T$, f utilizing said first and fourth signals during each period $\Delta T$ to produce fifth signals representing a drive speed number $XDAC = G_1.PRXC + G_2.XERR$, where $G_1$ and $G_2$ are selected gain factors, and representing said number XDAC by an analog electric signal $E_x$, g applying said analog signal $E_x$ to a velocity servo having a motor mechanically coupled to said member to drive the latter along the axis at a speed corresponding to said number XDAC, h comparing during each period $\Delta T$ said signals representing said error XERR with a predetermined first threshold value LERR and increasing the durations of the succeeding time periods $\Delta T$ when, in any given period, the error XERR is a lag greater than LERR and decreasing the durations of such succeeding periods when, in any given period, the error XERR is less than LERR and the duration of the given period is greater than $\Delta TN$, i comparing during each period $\Delta T$ said signals representing said error XERR with a predetermined second threshold value HERR which is greater than LERR, and in response to the error XERR exceeding said threshold HERR in any given one of said periods (1) setting said gain factor $G_1$ to zero to make said analog signal $E_x$ substantially proportional only to $G_2.XERR$ in the execution of said steps (f) and (g), and (2) foregoing the execution of said step (c1) to make the represented number XTC remain at the last value thereof.

5. The method set forth in claim 4 further including:

d1 in response to the error XERR exceeding said second threshold value in any given time period, foregoing the execution of said step (h).

6. The method set forth in claim 4 further including:

d1 in response to the error XERR exceeding said second threshold value in any given time period, changing the gain factor $G_2$ from its existing value to a predetermined higher value during that time period, whereby said member holds after moving to the then-signaled theoretical position XTC.

7. In a system for controlling the velocity and position of a member movable along an axis X in accordance with a block of command data signals numerically designating a desired velocity V, said system comprising, in combination 1 means for measuring off successive periods $\Delta T$ in actual time, 2 means responsive to said command data signals for producing first electric signals representing a velocity number PRXC proportional to the desired velocity V, 3 means for producing second electric signals representing a theoretical position XTC which the member should occupy, 4 means coupled to and controlled in part by said means (1) for changing said second signals once each period to make the signaled theoretical position XTC periodically advance, 5 means controlled in part by said means (1) for producing third electric signals representing during each period $\Delta T$ the then-existing error XERR between the theoretical position XTC and the actual position at which the member is located, 6 a velocity servo coupled to drive the member along the axis and means responsive to said first and third signals for energizing such servo in accordance with the sum of (a) a first term proportional to the number PRXC and (b) a second term proportional to the number XERR, and 7 means responsive to said third signals exceeding a predetermined threshold HERRX during any given period $\Delta T$ for (a) disabling said means (4) and (b) modifying the operation of said means (6) to negate said first term.

8. In a system for controlling the velocity and position of a member movable along an axis X according to a block of numerical command data signals designating the desired velocity V, said system comprising in combination:

1 means for measuring off successive periods $\Delta T$ in actual time, with such periods having a normal duration $\Delta TN$, 2 means responsive to said command data signals for producing first electric signals representing a velocity number PRXC designating said velocity V in units of distance per $\Delta TN$, 3 means for producing second electric signals representing a theoretical position number XTC, and means controlled in part by said means (1) responsive to said first signals for changing the second signals to increment the represented number by the amount PRXC once during each time period, such that $XTC_i = XTC_{i-1} + PRXC$, 4 sensing the actual instantaneous position XIN of said member along the axis, 5 a velocity servo responsive to said first and second signals for driving said member along the axis at a velocity which is proportional to the sum of (a) a first term proportional to the number PRXC represented by said first signals, and (b) a second term proportional to the difference between the signaled theoretical position XTC represented by said second signals and the sensed actual position XIN, and 6 means for modifying the operation of said means (3) and (5) whenever said difference exceeds a predetermined threshold value, to effectively cause said number PRXC to be treated as zero.

9. The combination set forth in claim 8 further characterized in that said means (6) includes:

6a means controlled in part by said means (1) for inhibiting the modifying action until said difference has exceeded said threshold value for a pre-established number of the successive time periods.

10. In a system for controlling the velocity and position of a member movable along an axis X according to a block of numerical command data signals designating the desired velocity V, said system comprising in combination:

1 means responsive to said command data signals for producing first electric signals representing a velocity number PRXC which designates said velocity V in dimensions of distance per time period $\Delta TN$, where $\Delta TN$ is a preselected duration, 2 means for measuring off successive periods $\Delta T$ in actual time with such periods having a normal duration of $\Delta TN$, 3 means for producing second electric signals representing a number XTC which designates the instantaneous theoretical desired position of said member, 4 means controlled in part by said means (2) and responsive to said first signals for acting upon said means (3) to increment the signaled number XTC by the amount PRXC once during each time period $\Delta T$, such that $XTC_i = XTC_{i-1} + PRXC$, 5 means coupled to said member for producing third signals numerically representing the actual position XIN of the member along the axis, 6 means controlled in part by said means (2) and responsive to said second and third signals for producing fourth signals which, during each period $\Delta T$, represent the then-existing position error $XERR = XTC - XIN$, 7 means controlled in part by said means (2) and responsive to said first and fourth signals for producing fifth signals which, during each period $\Delta T$, represent a speed number $XDAC = G_1 \cdot PRXC + G_2 \cdot XERR$, where $G_1$ and $G_2$ are preselected gain factors of proportionality, 8 a velocity servo coupled to said member and means responsive to said fifth signals for energizing such servo in accordance with said number XDAC, 9 means responsive to said fourth signals for modifying said means (2) and increasing the durations of the following periods $\Delta T$ when, in any given period $\Delta T$, the error XERR is a lag and exceeds in magnitude a predetermined threshold value LERR, 10 means responsive to said fourth signals for (a) setting said gain factor $G_1$ to zero, and (b) disabling said means (4) when, in any given period $\Delta T$, the error XERR exceeds in magnitude a second predetermined threshold value HERR.

11. The combination set forth in claim 10 further including 11 means responsive to said first signals for making at least one of said threshold values LERRX and HERRX a monotonic function of the velocity number PRXC.

12. The combination set forth in claim 10 further including 11 means responsive to said fourth signals for disabling said means (9).

13. The combination set forth in claim 10 further including 11 means responsive to said fourth signals for changing said gain factor $G_2$ to a higher value $G_2'$ whenever said error XERRX exceeds said secong threshold HERRX, whereby said member holds after moving to the last-signaled theoretical position XTC.

14. The method of controlling the velocity and position of a member movable along an axix X in accordance with a block of numerical command data signals designating the desired velocity V, said method comprising a. measuring off successive periods $\Delta T$ in actual time, with such periods normally having a duration $\Delta TN$, b. deriving from said command data first electric signals numerically representing a velocity number PRXC expressing said velocity V in dimensions of distance per time period $\Delta TN$, c. utilizing said first signals to create second electric signals numerically representing a periodically changing theoretical position XTC to which said member should advance during each time period $\Delta T$, d. utilizing said second signals to create third electric signals numerically representing, during each period $\Delta T$, the error XERR between the theoretical position XTC and the actual position in which said member resides, e. utilizing said first and third signals to create fourth signals proportional to the sum of PRXC and $G_2 \cdot XERR$, where $G_2$ is a predetermined gain factor, f. driving said member along the axis at a velocity which corresponds to the sum represented by said fourth signals, g. creating a HOLD signal when said member is to be stopped, h. and utilizing said HOLD signal to (1) freeze said second signals and the theoretical position number XTC represented thereby, (2) modify said step (e) such that said fourth signals become proportional to $G_2' \cdot XERR$, where $G_2'$ is a predetermined gain factor different from the factor $G_2$.

15. The method of controlling the velocity and the dynamically changing position of a member movable along an axis X in accordance with a block of numerical data designating the desired velocity V, said method comprising:

a. measuring off successive periods $\Delta T$ in actual time, with such periods normally having a duration $\Delta TN$, b. deriving from said command data first electric signals numerically representing a velocity number PRXC expressing said velocity V in dimensions of distance per time period ΔTN, c. creating second electric signals numerically representing the theoretical desired position XTC of said member and utilizing said first signals to change such position signals once during each period ΔT by the amount of the velocity number PRXC, d. creating third electric signals dynamically and numerically representing the actual position XIN of said member as it moves along the axis, e. utilizing said second and third signals to create, by subtraction once during each period ΔT, fourth electric signals dynamically and numerically representing the then-existing error XERR = XTC − XIN between the theoretical and actual positions of said member, f. creating fifth and sixth electric signals numerically representing predetermined gain factors $G_2$ and $G_2'$, where $G_2'$ is greater than $G_2$, g. utilizing said first, fourth and fifth signals to compute, once during each period ΔT, and to produce seventh electric signals numerically representing, the then-existing value of a speed command number XDAC proportional to the sum PRXC + $G_2$ . XERR, h. energizing a velocity servo in accordance with said seventh signals to drive said member physically along the axis at a theoretical velocity corresponding to the value XDAC, i. creating a HOLD signal when said member is purposely or for an abnormal condition to be held from further travel, and j. in response to the presence of said HOLD signal (1) making the effective value of the PRXC signals in said step (g) zero, (2) utilizing said sixth signals instead of the fifth to change the gain factor $G_2$ to $G_2'$ in said step (g), and (3) foreclosing the changing of the XTC signals in step (c); whereupon said signal XDAC becomes equal to $G_2'$. XERR during the periods ΔT in which the HOLD signal exists, and said member comes to rest at the position represented by the then non-changing value XTC of the second signals as the error XERR becomes zero.

16. The method of controlling the velocity and position of a member movable along an axis X in accordance with a block of numerical command data designating a desired velocity V, said method comprising:

a. measuring off successive periods ΔT in actual time, with the duration of the periods normally having a predetermined value ΔTN, b. deriving from said command data first digital signals numerically representing a velocity number PRXC expressing said velocity V in dimensions of distance per time period ΔTN, c. creating second digital signals numerically representing the desired and theoretical position XTC of said member, d. utilizing said first and second signals to change, by algebraic addition once during each period ΔT, the XTC signals such that $XTC_i = XTC_{i-1} + PRXC$ and thus to make the theoretical position change from period to period, e. creating third digital signals numerically representing the instantaneous actual position XIN of said member as it moves along the axis.

f. utilizing said second and third signals to create, by algebraic subtraction once during each period ΔT, fourth digital signals numerically representing the then-existing error XERR = XTC − XIN between the theoretical and actual positions of said member, g. utilizing said first and fourth signals to compute during each period ΔT and, to produce fifth digital signals numerically representing the then-existing value of a speed command number XDAC = $G[G_1$ . PRXC + $G_2$ . XERR], where G, $G_1$ and $G_2$ are selected gain constants of proportionality, h. converting said digital signals XDAC into a corresponding analog signal and applying the latter as the input to a velocity servo mechanically coupled to said member to drive the latter at a velocity nominally corresponding to the analog signal, i. creating a HOLD signal when it is desired to have said member come to a stop at any time it is moving, j. in response to the presence of said HOLD signal, (1) setting said gain factor $G_1$ to zero, (2) increasing said gain factor $G_2$ from its original to a greater value $G_2'$, and (3) preventing the execution of said step (d) during any period ΔT when the hold signal exists, whereby said XDAC signals and analog signals become proportional to $G_2'$.XERR and said member moves until it stops in an actual position XIN equal to the then-signaled theoretical position XTC with the error XERR reduced to zero, and k. in response to the removal of said hold signal restoring said gain factors $G_1$ and $G_2$ to their original values and executing said step (d) during each period ΔT.

17. In apparatus for controlling the velocity and position of a member movable along an axis X in accordance with a block of numerical command data signals designating the desired velocity V, said apparatus comprising in combination:

1 means for measuring off successive periods ΔT in actual time, with such periods normally having a duration ΔTN, 2 means responsive to said command data signals for producing first signals representing a velocity number PRXC expressing said velocity V in dimensions of distance per time period ΔTN, 3 means controlled in part by said means (1) and responsive to said first signals for producing second signals representing a periodically changing theoretical position XTC to which said member should advance during each period ΔT, 4 means controlled in part by said means (1) and responsive to said second signals for producing third signals representing, during each period ΔT, the error XERR between the theoretical position XTC and the actual position in which said member resides, 5 means responsive to said first and third signals for producing fourth signals proportional to the sum of PRXC and $G_2$.XERR, where $G_2$ is a predetermined gain factor, 6 a velocity servo physically coupled to said member, and means responsive to said fourth signals for supplying an input to such servo which is proportional to the value of the fourth signals, 7 means for creating a HOLD signal, and 8 means responsive to said HOLD signal to (a) modify the operation of said means (3) to maintain said second signals and the theoretical position unchanged, (b) modify the operation of said means (5) to make said fourth signals proportional to $G_2'.XERR$, where $G_2'$ is a predetermined gain factor different from said factor $G_2$.

18. In apparatus for controlling the velocity and dynamically changing position of a member movable along an axis X in accordance with a block of numerical command data signals designating the desired velocity V, said apparatus comprising in combination:
1. means for measuring off successive periods $\Delta T$ in actual time, with such periods normally having a duration $\Delta TN$,
2. means responsive to said command data signals for producing first electric signals numerically representing a velocity number PRXC expressing said velocity V in dimensions of distance per time period $\Delta TN$,
3. means for producing second electric signals numerically representing the theoretical desired position XTC of said member, such means including means controlled in part by said means (1) and responsive to said first signals to change the second signals once during each period $\Delta T$ by the amount PRXC,
4. means for producing third electric signals dynamically and numerically representing the actual position XIN of said member during each period $\Delta T$,
5. means controlled in part by said means (1) and responsive to said second and third signals to produce fourth signals which represent, during each period $\Delta T$, the then-existing position error $XERR = XTC - XIN$ between the theoretical and actual positions,
6. means for producing fifth and sixth signals numerically representing predetermined gain factors $G_2$ and $G_2'$, where $G_2'$ is greater than $G_2$,
7. means controlled in part by said means (1) and responsive to said first, fourth and fifth signals for computing, and producing seventh electric signals representing during each time period, the value of a speed number XDAC proportional to the sum $PRXC + G_2.XERR$,
8. a velocity servo coupled to drive said member along the axis, and means responsive to said seventh signals for energizing such servo in accordance with the value of XDAC,
9. means for creating a HOLD signal when said member is purposely as for an abnormal condition to be held from further travel, and
10. means responsive to said HOLD signal for (a) making the effective value of the number PRXC as used by said means (3) and means (7) zero despite the value represented by said fourth signals, and (b) modifying the operation of said means (7) so that it responds to said sixth signals instead of the fifth to make the seventh signals and the XDAC number proportional to $G_2'.XERR$.

19. In apparatus for controlling the velocity, and the dynamically changing position, of a member movable along an axis X in accordance with a block of numerical command data signals designating a desired velocity V, said apparatus comprising in combination:
1. means for measuring off successive time periods $\Delta T$ in actual time, with the durations of such periods normally being $\Delta TN$,
2. means responsive to said command data signals for producing first digital signals representing a velocity number PRXC expressing said velocity V in dimensions of distance per time period $\Delta TN$,
3. means for producing second digital signals representing the theoretical desired position number XTC of said member,
4. means controlled in part by said means (1) and responsive to said first and second signals to change the second signals once during each period $\Delta T$ so as to periodically change in position number such that $XTC_i = XTC_{i-1} + PRXC$,
5. means coupled to said member for producing third digital signals representing a number XIN which designates the actual position which said member occupies,
6. means controlled in part by said means (1) and responsive to said second and third signals to compute, by subtraction once each period $\Delta T$ and to produce fourth digital signals representing, a number $XERR = XTC - XIN$ designating the then-existing error between the theoretical and actual positions,
7. means controlled in part by said means (1) and responsive to said first and fourth signals to compute during each period $\Delta T$ and to produce fifth digital signals representing, a speed command number XDAC, such that $XDAC = G[G_1.PRXC + G_2.XERR]$, where $G$, $G_1$ and $G_2$ are predetermined gain factors,
8. means responsive to said fifth signals for energizing a velocity servo coupled to said member to drive the latter along the axis at a velocity corresponding to the number XDAC,
9. means for creating a HOLD signal when it is desired to have said member come to a stop,
10. means responsive to said HOLD signal for (a) disabling said means (5), and (b) modifying the operation of said means (7) to set said factor $G_1$ to zero and increase said gain factor $G_2$ to a different and higher predetermined value $G_2'$.

20. The method of controlling the velocity and the dynamically changing position of a member movable along an axis X in accordance with a block of numerical command data designating the desired velocity V, wherein said method includes
a. measuring off successive periods $\Delta T$ in actual time with the normal duration of each period being $\Delta TN$,
b. deriving from said command data first digital signals numerically representing a velocity number PRXC expressing said velocity V in dimensions of distance per time period $\Delta TN$,
c. creating second digital signals numerically representing a number XBIAS,
d. computing from said first and second signals, once during each period $\Delta T$, and creating third digital signals numerically representing a speed command number $XDAC = G[PRXC + XBIAS]$, where G is a predetermined gain factor,
e. energizing a velocity servo in accordance with said XDAC signals to drive said member at a velocity theoretically corresponding to the number represented by such signals,
f. sensing and representing by fourth digital signals the numerical value of any error XERR between the theoretical position which the member should occupy during each period $\Delta T$ and the position it actually occupies, and
g. utilizing said fourth signals to cause said second signals to be incrementally changed to increment the number XBIAS by a predetermined amount XKBIAS during any period Δ T when the represent error XERR exceeds a predetermined value, whereby said XBIAS signals progressively change the XDAC signals to bring the position error progressively toward zero if the PRXC signals fail to keep the position error zero; and said method being characterized by h. creating a HOLD signal when said member is to be brought to a stop, i. in response to the presence of said HOLD signal, modifying said step (d) to treat the number PRXC as having an effective value of zero, and j. in response to either the appearance or the disappearance of said HOLD signal, initializing said second signals to restart the XBIAS number at zero.

21. The method of controlling the velocity and the dynamically changing position of a member movable along an axis X in accordance with a block of numerical command data designating the desired velocity V, wherein said method includes a. measuring off successive periods ΔT in actual time with the normal duration of each period being ΔTN, b. deriving from said command data first digital signals numerically representing a velocity number PRXC expressing said velocity V in dimensions of distance per time period ΔTN, c. creating second digital signals numerically representing a number XBIAS, d. computing from said first and second signals, once during each period ΔT, and creating third digital signals numerically representing a speed command number XDAC = G [PRXC + XBIAS], where G is a predetermined gain factor, e. energizing a velocity servo in accordance with said XDAC signals to drive said member at a velocity theoretically corresponding to the number represented by such signals, f. sensing and representing by fourth digital signals the numerical value of any error XERR between the theoretical position which the member should occupy during each period ΔT and the position it actually occupies, g. utilizing said fourth signals to cause said second signals to be incrementally changed to increment the number XBIAS by a predetermined amount XKBIAS during any period ΔT when the represented error exceeds a predetermined value, whereby said XBIAS signals progressively change the XDAC signals to bring the position error progressively toward zero if the PRXC signals fail to keep the position error zero; and said method is characterized in that said step (g) includes:

g1. representing by fifth and sixth digital signals the values of predetermined incrementing numbers XKBH and XKBR, g2. comparing during each period ΔT the error XERR represented by said fourth signals with said predetermined value, g3. during any period ΔT when said signaled number PRXC has an effective value other than zero and said comparison indicates that said error XERR is greater than said predetermined value, changing said second signals incrementally according to said sixth signals, such that $XBIAS_i = XBIAS_{i-1} + XKBR$, and g4. during any period ΔT when said signaled number PRXC has an effective value of zero and said comparison indicates that said error XERR is greater than said predetermined value, changing said second signals incrementally according to said fifth signals, such that $XBIAS_i = XBIAS_{i-1} + XKBH$.

22. The method of controlling the velocity and dynamically changing position of a member movable along an axis X according to a block of command data numerically designating the desired velocity V and distance DX to be traveled, wherein said method includes a. measuring off in actual time successive periods ΔT which normally have a standard duration ΔTN, b. deriving from said command data and producing first digital signals numerically representing a velocity number PRXC expressing said velocity V in dimensions of distance per ΔTN, c. creating second digital signals numerically representing the theoretical instantaneous position XTC of said member, d. utilizing said first and second signals to algebraically add once during each period ΔT to change said second signals and change the position number XTC, such that $XTC_i = XTC_{i-1} + PRXC$, e. creating third digital signals numerically and dynamically representing the changeable actual position XIN of said member, f. utilizing said second and third signals to algebraically subtract once during each period ΔT to produce fourth digital signals numerically representing changing values of a position error number XERR = XTC − XIN, g. creating adjustable fifth signals numerically representing an adjustable feed rate number PER, h. creating sixth and seventh digital signals numerically representing a changeable adjustment number XBIAS and a predetermined increment number XKBIAS, i utilizing said first, fourth, fifth and sixth signals to compute, once during each period ΔT, and produce eighth signals representing a speed number XDAC = G[PER . PRXC + XTRIM . XERR + XBIAS] where G is an overall gain factor and XTRIM is an individual term gain factor, j. energizing a velocity servo in accordance with said XDAC signals to drive said member along the axis theoretically at a speed equal to the XDAC number, k. comparing said fourth signals numerically with a predetermined error threshold value TH1 during each ΔT, and in response to the number XERR representing a lag greater than said threshold, incrementally increasing the duration of the succeeding periods ΔT which are measured off according to step (a), l. comparing said fourth signals with a predetermined constant during each ΔT, and in response to the former exceeding the latter in magnitude, changing said sixth signal by said seventh signals to increment or decrement the signaled number XBIAS, such that $XBIAS_i = XBIAS_{i-1} \pm XKBIAS$, and m. placing the member in holding condition by (1) setting said number PER to zero, and (2) setting said seventh signals and said increment number XKBIAS to a different predetermined value.

23. The method defined by claim 22 further characterized in that said step (m) includes
  m. placing the member in a HOLD condition by
     m1. changing said number PER to zero,
     m2. increasing the value of said individual gain factor XTRIM,
     m3. initializing said signaled number XBIAS to be zero, and
     m4. changing the signaled increment number XKBIAS to a different value.

24. In apparatus for controlling the velocity and dynamically changing position of a member movable along an axis X in accordance with a block of numerical command data signals designating a desired velocity V, said apparatus including
  1 means for measuring off successive periods $\Delta T$ in actual time with the normal duration of each period being $\Delta TN$,
  2 means responsive to said command data signals for producing first digital signals representing a velocity number PRXC expressing said velocity V in dimensions of distance per time period $\Delta TN$,
  3 means for creating second digital signals representing a number XBIAS,
  4 means controlled in part by said means (1) and responsive to said first and second signals, once during each period $\Delta T$, for producing and changing third digital signals representing a speed number XDAC = G[PRXC + XBIAS], where G is a predetermined gain factor,
  5 a velocity servo coupled to drive said member along the axis, and means responsive to said third signals for energizing said servo in accordance with said speed number XDAC,
  6 means for producing fourth digital signals representing the error XERR between the theoretical position which the member should occupy in any period and the position in which it actually resides,
  7 means controlled in part by said means (1) and responsive to said fourth signals for incrementally changing the second signals to increment said second number XBIAS by a predetermined amount XKBIAS during any period $\Delta T$ in which the error XERR exceeds a predetermined value, and said apparatus being characterized by the further inclusion of
  8 means for creating a HOLD signal when said member is to be brought to a stop,
  9 means responsive to the HOLD signal for causing said means (4) to operate as if the number PRXC were zero, and
  10 means responsive to the appearance or disappearance of said HOLD signal for causing said means (4) to intialize the number XBIAS to a zero value from which the incrementing by said means (7) begins.

25. The combination set forth in claim 24 further characterized by and including
  11 means responsive to the presence or absence of a HOLD signal for causing said means (7) to operate respectively with the predetermined amount XKBIAS having first or second preselected values XKBH or XKBR.

26. The combination set forth in claim 24 wherein said means (4) is responsive not only to said first and second signals but also to said fourth signals and said speed number XDAC is equal to G[PRXC + XTRIM . XERR + XBIAS], where XTRIM is a preselected term gain factor;
  and further including
  11 means responsive to the presence or absence of said HOLD signal for causing said means (4) to operate respectively with said term gain factor XTRIM having first or second pre-established values of XTRMH or XTRMR.

27. The combination set forth in claim 24 further including
  11 means for producing fifth digital signals representing an adjustable feed rate override number PER, and
  4a said means (4) is characterized by being responsive not only to said first and second signals but also to said fifth signals to make said speed number XDAC equal to G[PER . PRXC + XBIAS], and
  12 means responsive to (a) the presence or (b) the absence of a HOLD signal for causing said means (4) to operate respectively as if said number PER (a) is zero or (b) is of its previously adjusted value.

28. The method of controlling the velocity and changing position of a member simultaneously movable along two or more axes X and Y in accordance with successive blocks $B_n$, $B_{n+1}$... of numerical command data designating successive path segments $D_n$, $D_{n+1}$... to be traveled at path velocities $V_n$, $V_{n+1}$... having vector components $VX_n$, $VY_n$, $VX_{n+1}$, $VY_{n+1}$..., said method comprising:
  a. measuring off successive periods $\Delta T$ in actual time with such periods normally of duration $\Delta TN$,
  b. producing from said command data first and second sets of signals representing velocity numbers PRXC and PRYC, for each block, to express the respective component velocities VX and VY in dimensions of distance per $\Delta TN$ time,
  c. utilizing said first and second sets of signals for the block $B_n$ to energize X and Y velocity servos and drive said member at axis velocities substantially equal to the signaled numbers $PRXC_n$ and $PRYC_n$ for a first aggregate time consisting of a quantity $LOOPS_n$ of successive time periods $\Delta T$, where the quantity LOOPS is equal to $D_n/V_n.1/\Delta TN - \Delta PRfa_{n-1}/2A - \Delta PRfa_n/2A$ and where A is a predetermined acceleration constant and $\Delta PRfa_n$ is the largest one of the velocity changes between block segments $(PRXC_{n+1} - PRXC_n)$ or $(PRYC_{n+1} - PRYC_n)$,
  d. after said first aggregate time, changing said first and second sets of signals during each period $\Delta T$ to increment the signaled numbers $PRXC_n$ and $PRYC_n$ respectively by amounts $(PRXC_{n+1} - PRXC_n)/A$ and $(PRYC_{n+1} - PRYC_n)/A$ until a second aggregate time consisting of a quantity $\Delta PRfa/A$ of the periods $\Delta T$ has elapsed, and
  e. after said second aggregate time has ended, repeating said steps (c) and (d) with the corresponding numbers for the next block $B_{n+}$.

29. The method of controlling the velocity and changing position of a member simultaneously movable along two or more axes X and Y in accordance with successive blocks $B_n$, $B_{n+1}$, $B_{n+2}$... of command data numerically designating desired path velocities $V_n$, $V_{n+1}$, $V_{n+2}$... and successive path segments $D_n$, $D_{n+1}$, $D_{n+2}$... of travel, said method comprising:
  a. measuring off in actual time successive periods $\Delta T$ normally of durations $\Delta TN$, b. deriving from said command data and producing a first set of signals numerically representing, for each block, the quantity $LOOPP_n$ of time periods $\Delta TN$ which would elapse if the member traveled the commanded segment distance $D_n$ at the commanded velocity $V_n$, c. deriving from said command data and producing second and third sets of digital signals representing, for each block, velocity numbers $PRXC_n$ and $PRYC_n$ expressing distances per $\Delta TN$ to be traveled along the X and Y axes to produce axis velocities $Vx$ and $Vy$ which are the components of a velocity vector $V_n$, d. deriving from said second and third sets of signals and producing a fourth set of signals representing, for each block, a quantity $2PC_n$ of periods $\Delta TN$ which would elapse if the largest difference between the axis velocity numbers for blocks $B_{n+1}$ and $B_n$ were uniformly spanned by changes of A per $\Delta TN$, where A is a predetermined acceleration value, e. deriving from said command data and said fourth signals and producing fifth and sixth sets of signals representing, for each block, increment numbers $XINC_n$ and $YINC_n$ to be imparted to the numbers $PRXC_n$ and $PRYC_n$ in each of $2PC_n$ periods $\Delta T$ in order to change the latter numbers to the corresponding next-block values $PRXC_{n+1}$ and $PRYC_{n+1}$, f. energizing X and Y axis velocity servos in accordance with said second and third sets of signals to drive the member along the X and Y axes at velocities substantially proportional to the instantaneous values of the numbers $PRXC_n$ and $PRYC_n$, g. after the inception of step (f), maintaining the signaled numbers $PRXC_n$ and $PRYC_n$ at the values determined by said step (c) until a quantity of time periods equal to the sum $(LOOPP_n - PC_{n-1} - PC_n)$ have elapsed in actual time, and in each subsequent period $\Delta T$ changing said second and third signals by use of said fifth and sixth signals to increment said numbers $PRXC_n$ and $PRYC_n$ by the respective amounts $XINC_n$ and $YINC_n$, and h. when the number of periods $\Delta T$ actually elapsed in time after the inception of said step (f) reaches the sum $(LOOPP_n - PC_{n-1} + PC_n)$, (1) replacing as the new values for $LOOPP_n$, $PRXC_n$, $PRYC_n$, $PC_n$, $PC_{n-1}$, $XINC_n$, $YINC_n$ the signaled numbers which respectively correspond but which are relevant to the block $B_{n+1}$, and (2) continuing the execution of said steps (f), (g) and (h).

30. The method of controlling the velocity and changing positions of a member simultaneously movable along two or more axes X and Y in accordance with successive blocks $B_n$, $B_{n+1}$, $B_{n+2}$. . . of command data numerically designating desired path velocities $V_n$, $V_{n+1}$, $V_{n+2}$. . . and successive path segments $D_n$, $D_{n+1}$, $D_{n+2}$. . . of travel, said method comprising:

a. measuring off in actual time successive periods $\Delta T$ nominally of durations $\Delta TN$, b. deriving from said command data and producing a first set of digital signals representing for each block, a quantity $LOOPP_n$ of time periods which would elapse if said member traveled the commanded segment at the commanded path velocity, such that $LOOPP_n = D_n/V_n \cdot 1/\Delta TN$, c. deriving from said command data and producing second and third sets of digital signals representing, for each block, velocity numbers PRXC and PRYC expressing distances per $\Delta TN$ to be traveled along the X and Y axes to produce axis velocities $V_x$ and $V_y$ which are the orthogonal vector components of the command path velocity, such that $$PRXC_n = \frac{DX_n}{LOOPP_n}$$

$$PRYC_n = \frac{DY_n}{LOOPP_n}$$

where $DX_n$ and $DY_n$ are the orthogonal components of the segment $D_n$, deriving from said second and third sets of signals and producing a fourth set of digital signals representing, for each block, a quantity $2PC_n$ of time periods $\Delta TN$ which would elapse if the velocity of the member were changed by a predetermined amount A during each such period from a starting value of $PRfa_n$ to an ending value $PRfa_{n+1}$, such that $$2PC_n = \frac{\Delta PRfa}{A} = \frac{PRfa_{n+1} - PRfa_n}{A}$$

where $\Delta PRfa$ is the larger one of the axis velocity changes $(PRXC_{n+1} - PRXC_n)$ and $(PRYC_{n+1} - PRYC_n)$ commanded for the transition between $B_n$ and $B_{n+1}$, e. deriving from said command data and producing fifth and sixth sets of digital signals representing, for each block, the velocity increments $XINC_n$ and $YINC_n$ to be imparted to the velocities $PRXC_n$ and $PRYC_n$ during each of $2PC_n$ successive periods to make them arrive at the next block values $PRXC_{n+1}$ and $PRYC_{n+1}$, such that $$XINC_n = \frac{PRXC_{n+1} - PRXC_n}{2PC_n}$$

$$YINC_n = \frac{PRYC_{n+1} - PRYC_n}{2PC_n}$$

f. energizing X and Y velocity servos in accordance with said second and third sets of signals to drive said member along the X and Y axes respectively at velocities which correspond substantially to the instantaneous values of the number $PRXC_n$ and $PRYC_n$, thereby to move the member along the path segment $D_n$, g. beginning with the inception of said step (f) counting and representing by a seventh set of digital signals the number NLOOP of periods $\Delta T$ which have actually elapsed, h. after the signaled number NLOOP reaches the value of $LOOPP_n - PC_{n-1} - PC_n$, changing said second and third sets of signals to increment the numbers PRXC and PRYC by the amounts XINC and YINC during each of the following periods $\Delta T$, such that $$PRXC_{n(i)} = PRXC_{n(i-1)} = XINC_n$$

$$PRYC_{n(i)} = PRYC_{n(i-1)} = YINC_n, \text{ and}$$

i. after the signaled number NLOOP reaches the value $LOOP_n - PC_{n-1} + PC_n$, terminating the incrementing of step (h), changing said seventh signals to restore the number NLOOP to zero; replacing as the new values for $LOOPP_n$, $PRXC_n$, $PRYC_n$, $PC_n$, $PC_{n-1}$, $XINC_n$, $YINC_n$ the signaled numbers $LOOPP_{n+1}$, $PRXY_{n+1}$, $PRYC_{n+1}$, $PC_{n+1}$, $PC_n$, $XINC_{n+1}$, $YINC_{n+1}$; and continuing the execution of said steps (f), (g), (h) and (i).

31. The method of controlling the velocity and changing position of a member movable along an axis X in accordance with successive blocks $B_n$, $B_{n+1}$, $B_{n+2}$... of command data numerically designating desired velocities $VX_n$, $VX_{n+1}$, $VX_{n+2}$... and successive desired distances $DX_n$, $DX_{n+1}$, $DX_{n+2}$... of travel, said method comprising:
   a. measuring off in actual time successive periods $\Delta T$ each having a nominal duration $\Delta TN$,
   b. deriving from said command data and producing digital signals for each block numerically representing the quantity LOOPP of periods $\Delta TN$ which would elapse while the member traveled the distance DX at the velocity VX, such that $LOOPP_n = DX_n/V_n \cdot 1/\Delta TN$,
   c. deriving from said command data and producing digital signals numerically representing velocity numbers PRXC for each block, such that $PRXC_n = DX_n/LOOPP_n$ expressed in distance per $\Delta TN$ time,
   d. deriving from said command data and producing digital electrical signals numerically representing for each block substantially the quantity $2PC_n$ of periods $\Delta TN$ which for each block would elapse if the member were changed in velocity from a first value $PRXC_n$ to a second value $PRXC_{n+1}$ at a pre-established acceleration expressed in dimensions of PRX per $\Delta TN$ per $\Delta TN$,
   e. deriving from said command data and producing digital signals numerically representing increment numbers $XINC_n$ for each block, such that $XINC_n = PRXC_{n+1} - PRXC_n/2PC_n$,
   f. energizing a velocity servo in accordance with the signals $PRXC_n$ to drive said member at a velocity substantially proportional to the numerical value instantaneously represented by such signals along the distance segment $DX_n$,
   g. beginning with the application of the signals $PRXC_n$ for block $B_n$ in said step (f), counting and representing by digital signals the quantity NLOOP of elapsed time periods $\Delta T$,
   h. after the signaled quantity NLOOP reaches the value of $LOOPP_n - PC_{n-1} - PC_n$ in a given period $\Delta T$ (where $PC_n = 2PC_n/2$), incrementing the value of the signaled number $PRXC_n$ during each succeeding period $\Delta T$ by the amount of the signaled number $XINC_n$ such that $PRXC_{n(i)} = PRXC_{n(i-1)} + XINC_n$,
   i. after the signaled quantity NLOOP reaches the value of $LOOPP_n - PC_{n-1} + PC_n$, terminating the periodic incrementing defined in step (h), restoring the signaled quantity NLOOP to zero, and replacing as new values for $LOOPP_n$, $PRXC_n$ and $P_n$ the numbers $LOOPP_{n+1}$, $PRXC_{n+1}$ and $P_{n+1}$ in the execution of said steps (f), (g), (h) and (i).

32. The method of controlling the velocity and position of a member movable along an axis X in accordance with successive blocks $B_n$, $B_{n+1}$, $B_{n+2}$... of command data designating desired velocities $VX_n$, $VX_{n+1}$, $VX_{n+2}$... and successive desired distances $DX_n$, $DX_{n+1}$, $DX_{n+2}$..., said method comprising:
   a. measuring off in actual time successive time periods $\Delta T$ which have normal durations $\Delta TN$,
   b. for each block, deriving from said command data and producing digital signals numerically representing the nominally required number LOOPP of periods $\Delta TN$ for the member to travel the designated distance DX at the designated velocity VX, such that $LOOPP_n = D_n/V_n, 1/\Delta TN$,
   c. for each block, deriving from said command data and producing digital signals numerically representing a velocity number PRXC such that $PRXC_n = DX_n/LOOPP_n$,
   d. for each block, deriving from said command data and digital signals numerically representing the change $\Delta PRX$ in the PRXC number at the end of that block distance $DX_n$ to change from one designated velocity to the next, such that $\Delta PRX_n = PRXC_{n+1} - PRXC_n$,
   e. for each block, deriving from said command data and producing digital signals numerically representing a quantity $PC_n$ equal approximately to one-half the number $2PC_n$ of time periods $\Delta TN$ which must elapse if the member is changed in velocity by the amount $\Delta PRX$ at a predetermined acceleration A expressed in dimensions of PR per $\Delta TN$ per $\Delta TN$, such that $PC_n = \Delta PRX_n/2A$,
   f. for each block, deriving from said command data and producing digital signals numerically representing increments of velocity change $XINC_n$ to be effected in causing said member to change from velocity $VX_n$ to velocity $VX_{n+1}$ in each of a number $2PC_n$ of time periods, such that $XINC_n = \Delta PRX_n/2PC_n$,
   g. for each block, deriving from said command data and producing digital signals numerically representing the number $LOOPB_n$ of periods $\Delta T$ which must elapse with the member traveling at velocity $PRXC_n$ before its velocity must begin to change, such that $LOOPB_n = LOOPP_n - PC_{n-1} - PC_n$,
   h. for each block, deriving from said command data and producing digital signals numerically representing the number $LOOPC_n$ of time periods $\Delta TN$ which must elapse from the member to travel at the velocity $PRXC_n$ and then change its velocity to the next value $PRXC_{n+1}$ at a rate of $XINC_n$ per period $\Delta TN$, such that $LOOPC_n = LOOPS_n + 2PC_{n+1}$,
   i. energizing a velocity servo in accordance with the signaled number $PRXC_n$ to drive said member at the corresponding velocity,
   j. counting and producing digital signals numerically representing the number NLOOP of periods $\Delta T$ as they elapse after said signaled number $PRXC_n$ begins to be used in said step (i),
   k. after said signaled number NLOOP becomes equal to said signaled number LOOPB in any given period $\Delta T$, incrementing said number $PRXC_n$ during each succeeding period such that $PRXC_{n(i)} = PRXC_{n(i-1)} + XINC_n$ until the signaled number NLOOP becomes equal to the signaled number LOOPC, and
   l. after said signaled number NLOOP equals the signaled number LOOPC, resetting the signaled number NLOOP to zero and substituting the next block velocity numbers $PRXC_{n+1}$, $LOOPB_{n+1}$, $LOOPC_{n+1}$, and $XINC_{n+1}$ as the active numbers in carrying out steps (i), (j) and (k) to effect execution of the command block $B_{n+1}$.

33. In apparatus for controlling the velocity and changing position of a member simultaneously movable along two or more axes X and Y in accordance with successive blocks $B_n$, $B_{n+1}$... of numerical command data designating successive path segments $D_n$, $D_{n+1}$... to be traveled at path velocities $V_n$, $V_{n+1}$... having vector components $VX_n$, $VY_n$, $VX_{n+1}$, $VY_{n+1}$..., said apparatus comprising in combination:

1. means responsive to said command data for each block for producing first and second sets of digital signals representing velocity numbers PRXC, PRYC expressing the respective component velocities VX and VY in dimensions of distance per unit $\Delta TN$ of time,
2. means for measuring off successive periods $\Delta T$ in actual time, with such periods normally of duration $\Delta TN$,
3. means responsive to said means (2) and to said first and second sets of signals for the block $B_n$ and representing the velocity numbers $PRXC_n$ and $PRYC_n$ to drive said member at axis velocities corresponding to such numbers for an aggregate quantity $LOOPS_n$ of time periods $\Delta T$ as measured off by said means (2), where $LOOPS_n$ is equal to $Dn/Vn.1/\Delta TN - \Delta PRfa_{n-1}/2A - \Delta PRfa_n/2A$, and where A is a predetermined acceleration constant and $\Delta PRfa_n$ is the largest one of the velocity changes between segments $(PRXC_{n+1} - PRXC_n)$ or $(PRYC_{n+1} - PRYC_n)$,
4. means controlled in part by said means (2) for changing said first and second sets of signals for the block $B_n$, after said aggregate quantity $LOOPS_n$ of time periods has elapsed, to increment the signaled numbers $PRXC_n$ and $PRYC_n$ once during each successive period $\Delta T$ respectively by amounts $PRXC_{n+1} - PRXC_n/A$ and $PRYC_{n+1} - PRYC_n/A$ until a second aggregate quantity $\Delta PRfa_n/A$ of the periods $\Delta T$ as measured off by said means (2) has elapsed.

34. In apparatus for controlling the velocity and changing position of a member simultaneously movable along two or more axes X and Y in accordance with successive blocks $B_n$, $B_{n+1}$... of numerically signaled command data designating successive path segments $D_n$, $D_{n+1}$... and desired path velocities $V_n$, $V_{n+1}$..., said apparatus comprising in combination:

1. means responsive to said signaled command data for producing, for each block, a first set of digital signals numerically representing the quantity LOOPP of time periods of duration $\Delta TN$ which would elapse if the member traveled the block segment at the block velocity, such that $LOOPP_n = Dn/Vn.1/\Delta TN$,
2. means responsive to said signaled command data for producing second and third sets of digital signals numerically representing, for each block, velocity numbers PRXC and PRYC expressing distances per $\Delta TN$ to be traveled along the X and Y axes to produce velocity components $V_x$ and $V_y$ whose vector sum is the block velocity V,
3. means responsive to said second and third sets of signals for producing a fourth set of digital signals representing, for each block, a quantity 2PC of periods $\Delta TN$ which would elapse if the largest difference between the said axis velocity numbers for that block and the next block were uniformly spanned by changes of A per $\Delta TN$, where A is a predetermined acceleration value,
4. means responsive to said command data and said fourth signals for producing fifth and sixth sets of digital signals representing, for each block, increment numbers XINC and YINC to be imparted to the velocity numbers PRXC and PRYC in each of 2PC periods $\Delta T$ to change those velocity numbers to the values applicable for the next block,
5. means for measuring off successive periods $\Delta T$ in actual time with the durations of the periods normally being $\Delta TN$,
6. X and Y axis velocity servos respectively coupled to drive said number along the X and Y axes, and means responsive to said second and third sets of signals for energizing said servos respectively in accordance with the numbers instantaneous values of the represented numbers $PRXC_n$ and $PRYC_n$,
7. means responsive to said means (5) and to said fifth and sixth signals, and operative after a quantity $(LOOPP_n - PC_{n-1} - PC_n)$ of time periods $\Delta T$ have actually elapsed following the initial energization of said servos according to the numbers $PRXC_n$ and $PRYC_n$, for changing said second and third sets of signals in each subsequent period $\Delta T$ to increment said numbers $PRXC_n$ and $PRYC_n$ respectively be amounts $XINC_n$ and $YINC_n$, and
8. means responsive to said means (5) after a quantity $(LOOPP_n - PC_{n-1} + PC_n)$ of periods $\Delta T$ have actually elapsed following the initial energization of said servos according to the numbers $PRXC_n$ and $PRYC_n$, for causing said means (6) and (7) to operate with the signaled numbers $LOOPP_{n+1}$, $PRXC_{n+1}$, $PRYC_{n+1}$, $PC_n$, $PC_{n+1}$, $XINC_{n+1}$ and YINC $n+1$ applicable for the block $B_{n+1}$ in lieu of the corresponding ones applicable for the block $B_n$.

35. In a system for controlling the velocity and changing positions of a member simultaneously movable along two or more axes X and Y in accordance with successive blocks $B_n$, $B_{n+1}$... of numerically signaled command data designating successive path segments $D_n$, $D_{n+1}$... and desired velocities $V_n$, $V_{n+1}$..., said system comprising, in combination:

1. means responsive to said signaled command data, for each block, producing a first set of digital signals representing a quantity LOOPP of time periods which would elapse if the member traveled the commanded segment D at the commanded velocity V, such that $LOOPP_n = Dn/Vn.1/\Delta TN$, where $\Delta TN$ is a constant representing a predetermined time period duration,
2. means responsive to said signaled command data and said first signals for producing second and third sets of digital signals representing, for each block, velocity numbers PRXC and PRYC expressing in dimensions of distances per $\Delta TN$ the axis velocities $V_x$ and $V_y$ which are the vector components of the commanded velocity V, such that $$PRXC_n = \frac{DX_n}{LOOPP_n}$$

$$PRYC_n = \frac{DY_n}{LOOPP_n}$$

where $DX_n$ and $DY_n$ are the orthogonal components of the segment $D_n$, 3. means responsive to said second and third signals for producing a fourth set of digital signals representing, for each block, a quantity 2PC of time periods $\Delta TN$ which would elapse if an axis velocity were changed by a predetermined amount A during each of such periods from a starting value of $PRfa_n$ to an ending value of $PRfa_{n+1}$, such that $$2PC_n = \frac{\Delta PRfa}{A} = \frac{PRfa_{n+1} - PRFa_n}{A}$$

where $\Delta PRfa$ is the larger one of the axis velocity changes $(PRXC_{n+1} - PRXC_n)$ or $(PRYC_{n+1} - PRYC_n)$ commanded for the transition between blocks $B_n$ and $B_{n+1}$, 4. means responsive to said second, third and fourth signals for producing fifth and sixth sets of digital signals representing, for each block, increment XINC and YINC to the velocity numbers PRXC and PRYC to make them arrive at the next block values after a quantity of 2PC incrementings, such that $$XINC_n = \frac{PRXC_{n+1} - PRXC_n}{2PC_n}$$

$$YINC_n = \frac{PRYC_{n+1} - PRYC_n}{2PC_n},$$

5. means for measuring off successive periods $\Delta T$ in actual time, with the durations of such periods normally being $\Delta TN$,
6. means responsive to said second and third signals for respectively driving said member along the X and Y axes at velocities which instantaneously correspond to the signaled numbers $PRXC_n$ and $PRYC_n$,
7. means responsive to said means (5) for producing a seventh set of digital signals a number NLOOP representing the number of periods $\Delta T$ actually measured off by said means (5) following the inception of operation of said means (6) with signals for a given block $B_n$,
8. means responsive to said means (5) and said seventh, second, third, fifth and sixth signals for changing the second and third signals incrementally during each period $\Delta T$ after the signaled number NLOOP becomes equal to $LOOPP_n - PC_{n-1} - PC_n$, such that $$PRXC_{n(i)} = PRXC_{n(i-1)} + XINC_n$$

$$PRYC_{n(i)} = PRYC_{n(i-1)} + YINC_n, \text{ and}$$

9. means responsive to said seventh signals for (a) terminating the operation of said means (8) after the signaled number NLOOP becomes equal to $LOOP_n - PC_{n-1} + PC$, (b) changing said seventh signals to restart the number NLOOP at zero, and (c) initiating the operation of the system with the corresponding signaled values applicable to the next block $B_{n+1}$ of command data.

36. In a system for controlling the velocity and changing position of a member movable along an axis X in accordance with successive blocks $B_n$, $B_{n+1}$... of numerically signaled command data designating successive distances $DX_n$, $DX_{n+1}$... and successive velocities $VX_n$, $VX_{n+1}$..., said system comprising in combination:

1. means for measuring off successive periods $\Delta T$ in actual time, with such periods normally having a predetermined duration $\Delta TN$,
2. means responsive to said signaled command data for each block for producing a first digital signal representing a number LOOPP which expresses the quantity of time periods $\Delta TN$ required for the member to travel the distance DX at the velocity VX, such that $$LOOPP_n = \frac{DX_n}{VX_n} \cdot \frac{1}{\Delta TN},$$

3. means responsive to said signaled command data and said first signals for producing second digital signals numerically representing, for each block, a velocity number PRXC having dimensions of distance per $\Delta TN$, such that $$PRXC_n = \frac{DX_n}{LOOPP_n}$$

4. means responsive to said signaled command data for producing third digital signals representing, for each block, the quantity 2PC of periods $\Delta TN$ which would elapse if the velocity number $PRXC_n$ were changed to the next block value $PRXC_{n+1}$ at a rate of A per $\Delta TN$, where A is a predetermined acceleration constant,
5. means responsive to said second and third signals for producing fourth digital signals representing, for each block, an increment number XINC, such that $$XINC_n = \frac{PRXC_{n+1} - PRXC_n}{2PC_n}$$

6. means responsive to said second signals for driving said member along the axis at a velocity corresponding to the signaled number $PRXC_n$,
7. means for counting the time periods $\Delta T$ actually measured off by said means (1) following the inception of operation of said means (6) according to the block velocity number $PRXC_n$,
8. means controlled by said means (7) and responsive to said second and fourth signals after the counted periods $\Delta T$ become equal to $LOOP_n - PC_{n-1} - PC_n$, for changing said second signals to increment the number $PRXC_n$ in each period $\Delta T$, such that $PRXC_{n(i)} = PRXC_{n(i-1)} + XINC_n$, and
9. means controlled by said means (7) after the counted periods $\Delta T$ become equal to $LOOPP_n - PC_{n+1} + PC_n$, for (a) terminating the operation of said means (8), (b) restarting the count of said means (7) at zero, and (c) replacing in the operation of the means (6), (8) and (9) the signals representing the new values $LOOPP_{n+1}$, $PRXC_{n+1}$, $PC_n$, $PC_{n+1}$ applicable to the block $B_{n+1}$.

* * * * *